(12) United States Patent
Hao

(10) Patent No.: US 11,611,701 B2
(45) Date of Patent: Mar. 21, 2023

(54) METHOD AND APPARATUS FOR VIDEO SHOOTING, TERMINAL DEVICE AND STORAGE MEDIUM

(71) Applicant: BEIJING MICROLIVE VISION TECHNOLOGY CO., LTD, Beijing (CN)

(72) Inventor: Yipeng Hao, Beijing (CN)

(73) Assignee: BEIJING MICROLIVE VISION TECHNOLOGY CO., LTD, Beijing (CN)

( * ) Notice: Subject to any disclaimer, the term of this patent is extended or adjusted under 35 U.S.C. 154(b) by 24 days.

(21) Appl. No.: 17/249,709

(22) Filed: Mar. 10, 2021

(65) Prior Publication Data

US 2021/0218893 A1    Jul. 15, 2021

Related U.S. Application Data

(60) Division of application No. 17/020,104, filed on Sep. 14, 2020, which is a continuation of application No. PCT/CN2018/124756, filed on Dec. 28, 2018.

(30) Foreign Application Priority Data

Jul. 19, 2018 (CN) .......................... 201810799343.7

(51) Int. Cl.
*H04N 5/232* (2006.01)
*G11B 27/031* (2006.01)
*H04N 5/262* (2006.01)

(52) U.S. Cl.
CPC ....... *H04N 5/23245* (2013.01); *G11B 27/031* (2013.01); *H04N 5/23216* (2013.01);
(Continued)

(58) Field of Classification Search
CPC .......... H04N 5/23245; H04N 5/23216; H04N 5/23229; H04N 5/232939; H04N 5/2621; H04N 5/76; H04N 5/91; G11B 27/031
(Continued)

(56) References Cited

U.S. PATENT DOCUMENTS 10,360,945 B2 * 7/2019 Moore ................ G11B 27/036
10,542,199 B2   1/2020 Tanaka et al.
(Continued)

FOREIGN PATENT DOCUMENTS

CN    103702041 A    4/2014
CN    104519262 A    4/2015
(Continued)

OTHER PUBLICATIONS

International Patent Application No. PCT/CN2018/124756; Int'l Search Report; dated Mar. 21, 2019; 12 pages.

*Primary Examiner* — Thai Q Tran
*Assistant Examiner* — Stephen R Smith
(74) *Attorney, Agent, or Firm* — BakerHostetler

(57) ABSTRACT

Techniques for video shooting are provided by the present disclosure, which comprising: detecting a user's selection on a video shooting mode control on a target interface and a triggering on a video shooting control on the target interface; obtaining a video segment corresponding to the selected video shooting mode; in response to a determination that the user's triggering operation on a next step control on the target interface is not detected, repeatedly detecting the selection on the video shooting mode control, the triggering on the video shooting control and a release operation on the video shooting control to obtain corresponding video segments until the user's triggering operation on the next step control on the target interface is detected; and displaying, on (Continued)

the video storage interface, a result of synthetizing video segments to obtain a target video.

15 Claims, 36 Drawing Sheets

(52) U.S. Cl.
CPC ... *H04N 5/23229* (2013.01); *H04N 5/232939* (2018.08); *H04N 5/2621* (2013.01)

(58) Field of Classification Search
USPC .................................. 386/224, 278; 716/765
See application file for complete search history.

(56) References Cited

U.S. PATENT DOCUMENTS

| | | | |
|---|---|---|---|
| 2009/0142030 A1* | 6/2009 | Lee .................. | H04N 5/232939 348/222.1 |
| 2010/0260472 A1 | 10/2010 | Okada et al. | |
| 2012/0050556 A1* | 3/2012 | Hamada ............. | H04N 5/23245 348/220.1 |
| 2012/0057843 A1 | 3/2012 | Otani et al. | |
| 2012/0308209 A1* | 12/2012 | Zaletel .................. | G11B 27/34 386/E5.028 |
| 2015/0156552 A1 | 6/2015 | Wayans et al. | |
| 2015/0242105 A1* | 8/2015 | Shin ................... | H04N 5/23218 715/765 |
| 2015/0318020 A1* | 11/2015 | Pribula .............. | H04N 21/2743 386/290 |
| 2016/0044235 A1* | 2/2016 | Cho .................... | H04M 1/0264 348/333.05 |
| 2016/0073018 A1 | 3/2016 | Ikeda | |
| 2016/0105388 A1* | 4/2016 | Bin Mahfooz .......... | H04N 5/77 709/206 |
| 2016/0173810 A1 | 6/2016 | Nakagawa | |
| 2017/0025152 A1 | 1/2017 | Jaime et al. | |
| 2017/0257414 A1 | 9/2017 | Zaletel et al. | |
| 2017/0357324 A1* | 12/2017 | Chaudhri .......... | H04M 1/72439 |
| 2018/0122419 A1 | 5/2018 | Wayans et al. | |
| 2019/0199913 A1* | 6/2019 | Ueno ............... | H04N 5/232945 |
| 2019/0199934 A1* | 6/2019 | Funatsu ............. | H04N 5/22525 |
| 2019/0237104 A1 | 8/2019 | Jeon et al. | |
| 2019/0265875 A1* | 8/2019 | Park ..................... | G06F 3/04847 |
| 2019/0379822 A1* | 12/2019 | Leong .................. | G06F 1/1626 |

FOREIGN PATENT DOCUMENTS

| | | |
|---|---|---|
| CN | 105812665 A | 7/2016 |
| CN | 106254776 A | 12/2016 |
| CN | 106303238 A | 1/2017 |
| CN | 107155068 A | 9/2017 |
| CN | 107171945 A | 9/2017 |
| CN | 107864334 A | 3/2018 |
| CN | 108200477 A | 6/2018 |
| CN | 108616696 A | 10/2018 |
| JP | 2011-009970 A | 1/2011 |
| JP | 2011-087032 A | 4/2011 |
| JP | 2012-095137 A | 5/2012 |
| KR | 2014-0123280 A | 10/2014 |

* cited by examiner

METHOD AND APPARATUS FOR VIDEO SHOOTING, TERMINAL DEVICE AND STORAGE MEDIUM

CROSS-REFERENCE TO RELATED APPLICATIONS

The present application is a divisional of U.S. application Ser. No. 17/020,104 filed on Sep. 14, 2020, which is a continuation of International Patent Application No. PCT/CN2018/124756 filed on Dec. 28, 2018, which claims priority to Chinese Patent Application No. 201810799343.7, filed on Jul. 19, 2018 with the Chinese Patent Office, all of which are incorporated herein by reference in their entireties.

FIELD OF THE INVENTION

Embodiments of the present disclosure relate to the field of communication technology, for example, to a method and an apparatus for video shooting, a terminal device and a storage medium.

BACKGROUND OF THE INVENTION

With the development of communication technology and terminal devices, one or more kinds of terminal devices such as mobile phones and tablet computers have become indispensable parts of people's work. Moreover, with the increasing popularity of terminal devices, a video shooting function provided by them also brings great convenience to users.

At present, terminal devices are used for video shooting, and the video obtained from one time of shooting is one complete video. If the user wants to splice or clip videos obtained from multiple times of shooting, dedicated video processing software is required to be used for processing. Moreover, all the videos are shot at normal speeds. If the user wants to obtain a video shot at an accelerated speed or a decelerated speed, the video shot at a normal speed has to be post-processed, for example, also processed by dedicated video processing software. For the above reason, there is a higher technical threshold in operation, which is not advantageous for daily use by the user and affects the user experience.

SUMMARY OF THE INVENTION

Embodiments of the present disclosure provide a method and an apparatus for video shooting, a terminal device and a storage medium, with the purpose of increasing the flexibility in shooting and processing a video by a user and improving the user experience.

In an embodiment, a method for shooting a video is provided by the present disclosure, which includes:

acquiring a video shooting mode instruction, wherein the video shooting mode instruction includes a shooting speed, and different video shooting modes have different shooting speeds;

after a video shooting instruction is obtained, shooting a video on a target scene according to the shooting speed until a video shooting pause instruction is acquired, thereby obtaining a video segment between the video shooting instruction and the video shooting pause instruction;

determining whether a video generation instruction is obtained;

if the video generation instruction is not obtained, repeating acquiring the video shooting mode instruction, the video shooting instruction and the video shooting pause instruction to obtain corresponding video segments until the video generation instruction is obtained; and generating a target video according to existing video segments based on the video generation instruction.

In an embodiment, a method for shooting a video is further provided by the present disclosure, which includes:

detecting a user's selection operation on a video shooting mode control on a target interface and a triggering operation on a video shooting control on the target interface;

displaying a shot target scene on the target interface until a release operation on the video shooting control is detected, thereby obtaining a video segment corresponding to the video shooting mode selected by the user and displaying the video shooting mode control and the video shooting control on the target interface;

determining whether a user's triggering operation on a next step control on the target interface is detected;

if the user's triggering operation on the next step control on the target interface is not detected, repeating detecting the selection operation on the video shooting mode control, the triggering operation on the video shooting control and the release operation on the video shooting control to obtain corresponding video segments until the user's triggering operation on the next step control on the target interface is detected; and jumping from the target interface to a video storage interface according to the triggering operation on the next step control, and displaying, on the video storage interface, a result of synthetizing existing video segments to obtain a target video.

In an embodiment, an apparatus for shooting a video is provided by the present disclosure, which includes:

a video shooting mode instruction acquisition module, configured to acquire a video shooting mode instruction, wherein the video shooting mode instruction includes a shooting speed, and different video shooting modes have different shooting speeds;

a video segment generation module configured to, after the video shooting instruction is obtained, shoot a video on a target scene according to the shooting speed until a video shooting pause instruction is obtained, thereby obtaining a video segment between the video shooting instruction and the video shooting pause instruction;

a video generation instruction determination module, configured to determine whether a video generation instruction is obtained;

a video generation instruction obtaining module configured to, if the video generation instruction is not obtained, repeat acquiring the video shooting mode instruction, the video shooting instruction and the video shooting pause instruction to obtain corresponding video segments until the video generation instruction is obtained; and a target video generation module, configured to generate a target video according to existing video segments based on the video generation instruction.

In an embodiment, an apparatus for shooting a video is further provided by the present disclosure, which includes:

a selection operation and triggering operation detection module, configured to detect a user's selection operation on a video shooting mode control on a target interface and a triggering operation on a video shooting control on the target interface;

a video segment storage module, configured to display a shot target scene on the target interface until a release operation on the video shooting control is detected, thereby obtaining a video segment corresponding to the video shooting mode selected by the user, and to display the video shooting mode control and the video shooting control on the target interface;

a next step control triggering determination module, configured to determine whether a user's triggering operation a next step control on the target interface is detected;

a next step control triggering detection module configured to, if the user's triggering operation on the next step control on the target interface is not detected, repeat detecting the selection operation on the video shooting mode control, the triggering operation on the video shooting control and the release operation on the video shooting control to obtain corresponding video segments until the user's triggering operation on the next step control on the target interface is detected; and a target video generation module, configured to jump from the target interface to a video storage interface according to the triggering operation on the next step control, and display, on the video storage interface, a result of synthetizing existing video segments to obtain a target video.

In an embodiment, a terminal device is further provided by the present disclosure, which includes:

one or more processors; and a memory configured to store one or more programs;

wherein when the one or more programs are executed by the one or more processors, the one or more processors are caused to implement the method provided by any of the embodiments of the present disclosure.

An embodiment of the present disclosure further provides a computer readable storage medium having a computer program stored thereon, wherein when the computer program is executed by a processor, the method provided by any of the embodiments of the present disclosure is implemented.

DETAILED DESCRIPTION OF THE EMBODIMENT(S) OF THE INVENTION

Figure 1:
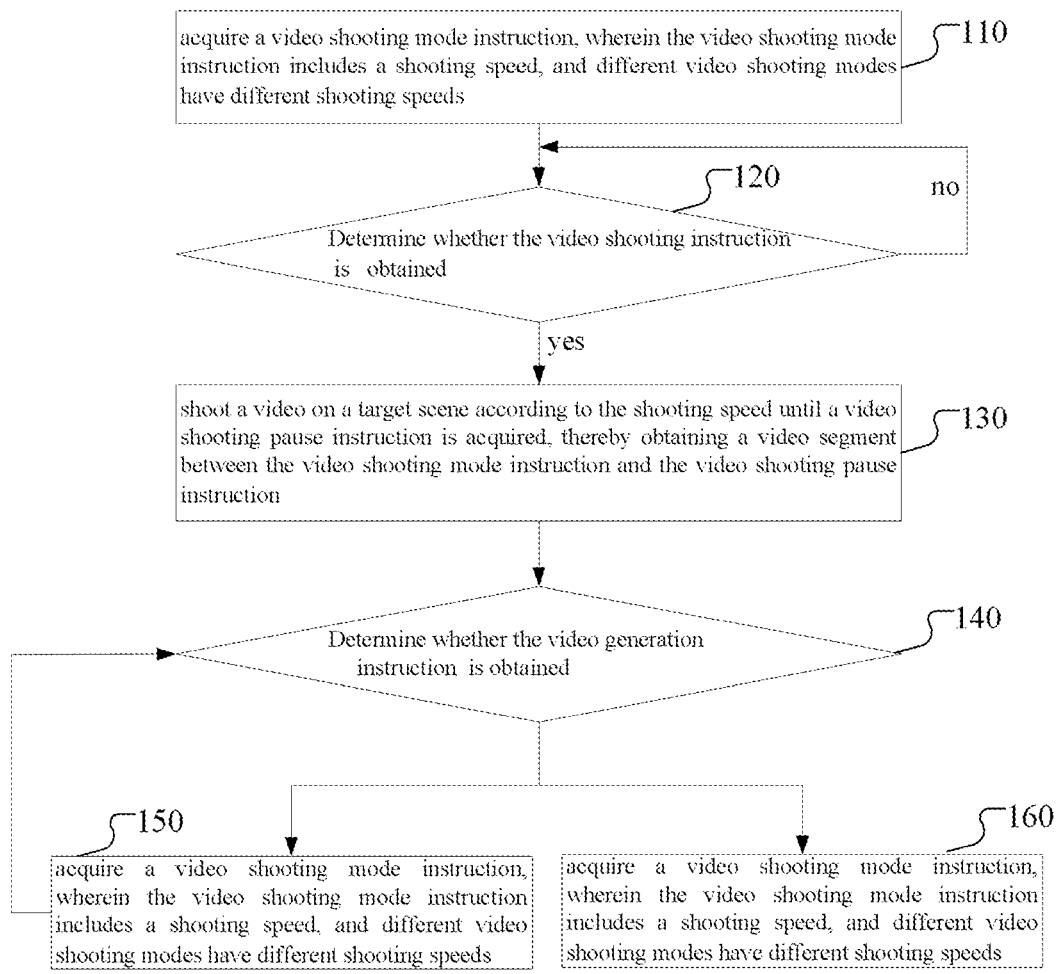
FIG. 1 is a flow chart of a method for video shooting according to an embodiment of the present disclosure.

The present disclosure will be described below in combination with the accompanying drawings and embodiments. The specific embodiments described herein are merely illustrative of the present disclosure, and are not intended to limit the present disclosure. In addition, for the convenience of description, only some of the structures that are related to the present disclosure, not all the structures, are shown in the drawings.

First Embodiment

FIG. 1 is a flow chart of a method for video shooting according to an embodiment of the present disclosure. The present embodiment is applicable to a situation of reducing the difficulty of video processing. The method may be performed by an apparatus for shooting a video, and the apparatus may be implemented by software and/or hardware. The apparatus may be configured in a terminal device, which is typically for example a mobile phone and/or a tablet computer, and the like. As shown in FIG. 1, the method includes steps 110 to 160.

In step 110: a video shooting mode instruction is acquired, wherein the video shooting mode instruction includes a shooting speed, and different video shooting modes have different shooting speeds.

In the embodiment of the present disclosure, a complete video may be formed by synthetizing a plurality of video segments. The target scenes shot in various video segments may be different, or for the same shot target scene, the time sequence may also be varied. In an embodiment, in order to present a better shooting effect, it may be necessary to set a corresponding shooting speed for each video segment, so that the final synthetized video can present a better shooting effect. In an embodiment, a video shooting mode instruction has to be acquired before shooting a target scene. The video shooting mode instruction may be configured to determine a corresponding shooting speed. In an embodiment, the video shooting mode instruction may include a shooting speed, and the shooting speeds corresponding to different video shooting modes are different. The shooting speed may refer to the number of video frames shot in unit time. In an embodiment, the video shooting mode instruction may include a normal shooting speed, a fast shooting speed, and a slow shooting speed. The fast shooting may further include a 2-time (2×) fast shooting, a 3-time (3×) fast shooting or a 4-time (4×) fast shooting, etc., and the slow shooting may further include a ½ slow shooting, a ⅓ slow shooting, or a ¼ slow shooting, etc. In an embodiment, the playing speeds of the video segments obtained by shooting under different video shooting mode instructions are the same. In an embodiment, the playing durations of the video segments shot in unit time are different. The fast shooting speed and the slow shooting speed are defined relative to the normal shooting speed. Exemplarily, if the shooting speed=the normal shooting speed/times of the normal shoot speed, the times may be an integer greater than 1, such as 2, 3 or 4, or also be a fraction less than 1, such as ½, ⅓, or ¼. If the times is an integer greater than 1, the number of video frames shot in unit time is small as compared with the number of video frames shot at the normal shooting speed, and the shooting speed is a fast shooting speed; and if the times is a fraction less than 1, the number of video frames shot in unit time is large as compared with the number of video frames shot at the normal shooting speed, and the shooting speed is a slow shooting speed. Now assume that the normal shooting speed is 60 frames/s, so the 2-time fast shooting speed is 30 frames/s, and the ½ slow shooting speed is 120 frames/s. In an embodiment, the playing durations of video segments shot in unit time are illustrated below: the playing duration of a video segment shot at a normal shooting speed is 1 s, the playing duration of a video segment shot at a 2-time fast shooting speed is 0.5 s, and the playing duration of a video segment shot at a ½ slow shooting speed is 2 s.

In an embodiment, the shooting speeds of different video shooting modes are different, so the performance requirements on hardware devices that perform shooting, including but not limited to video recorders or cameras, are higher. In an embodiment, the hardware devices that perform shooting support a plurality of shooting speeds.

In step 120: it is determined whether the video shooting instruction is obtained; if yes, step 130 is executed; and if no, step 120 is executed again.

In step 130: a video is shot on a target scene according to the shooting speed until a video shooting pause instruction is acquired, thereby obtaining a video segment between the video shooting instruction and the video shooting pause instruction.

In the embodiment of the present disclosure, the video shooting instruction may be configured to start a current shooting process. If the video shooting instruction is obtained, it indicates that the current shooting process is started, and a video may be shot on the target scene according to the shooting speed until a video shooting pause instruction is acquired. Then, the current shooting process may be ended to obtain a video segment between the video shooting instruction and the video shooting pause instruction. The target scene may refer to an object that the user desires to shoot and the surrounding environment. The video shooting pause instruction may be configured to end the shooting of the current video segment.

In step 140: it is determined whether a video generation instruction is obtained; if yes, step 160 is executed; and if no, step 150 is executed.

In step 150: acquiring the video shooting mode instruction, the video shooting instruction, and the video shooting pause instruction is repeated to obtain corresponding video segments, and then the process returns to step 140.

In step 160: a target video is generated according to existing video segments based on the video generation instruction.

In the embodiment of the present disclosure, the video generation instruction may be configured to synthetize existing video segments to obtain a target video. That is, if the video generation instruction is obtained, it indicates that the current entire video shooting process may be ended without shooting the next video segment, and the target video may be generated according to existing video segments; and if the video generation instruction is not obtained, it indicates that the current entire video shooting process is not ended, and a shooting of the next video segment has to be performed; that is, acquiring the video shooting mode instruction, the video shooting instruction and the video shooting pause instruction is repeated to obtain corresponding video segments until the video generation instruction is obtained; then, the target video is generated according to existing video segments; that is, each time step 150 is executed, a corresponding video segment can be obtained. In an embodiment, since the shooting speeds of different video shooting modes are different, the corresponding shooting speeds of the obtained multiple video segments may be the same or may be different. If the set video shooting mode instructions are the same, then the shooting speeds corresponding to different video segments are the same; and if the set video shooting mode instructions are different, then the shooting speeds corresponding to different video segments are different. In an embodiment, the target scenes corresponding to various video segments may be the same or different, and may be determined according to the actual situation, which is not specifically limited herein. In an embodiment, the number of existing video segments may be one or at least two, and the number of video segments is related to the timing of acquiring the video generation instruction. That is, if the video generation instruction is obtained right after the first video segment is obtained, then it indicates that the current entire video shooting process may be ended, and a target video is generated based on existing video segments. At this point, the number of video segments is one. If the video generation instruction is not obtained after the first video segment is obtained, it indicates that the current entire video shooting process is not ended, and a shooting of the next video segment has to be performed. At this point, the number of video segments is at least two. Exemplarily, three video segments are currently obtained, and the target scenes corresponding to the three video segments are the same, that is, they are all the same corner of a classroom. The three video segments are video segment 1, video segment 2 and video segment 3 respectively. The video shooting mode instruction obtained when shooting video segment 1 is the normal shooting speed, the video shooting mode instruction obtained when shooting video segment 2 is 2-time (2×) fast shooting speed, and the video shooting mode instruction obtained when shooting video segment 3 is ½ slow shooting speed. In an embodiment, the target video may be obtained by splicing and synthetizing existing video segments according to a chronological order of the generation thereof. Exemplarily, the three video segments as described above, i.e., video segment 1, video segment 2, and video segment 3, are sequentially generated in a chronological order. If the video generation instruction is obtained after video segment 3 is obtained, it indicates that the current entire video shooting process may be ended, and the existing video segment 1, video segment 2, and video segment 3 may be synthetized to obtain the target video.

In an embodiment, the above video shooting mode instruction and video shooting instruction may be generated by the user triggering or selecting corresponding controls on a shooting interface of a terminal; the video shooting pause instruction and video generation instruction may be generated by the user releasing or triggering corresponding controls on the shooting interface of the terminal, and the video shooting pause instruction and video generation instruction may also be generated by detecting that a shooting time length reaches a predetermined shooting time threshold. The predetermined shooting time threshold may be set according to the actual situation, and is not specifically limited herein. Exemplarily, the video shooting mode instruction is generated by the user's selection operation on a video shooting mode control, the video shooting instruction is generated by the user's triggering operation on a video shooting control, and the video shooting pause instruction is generated by the user's release operation on the video shooting control.

In the following, certain video sharing software in the terminal will be used as an example for description. In an embodiment, when the user needs to shoot a video, by clicking an icon of the video sharing software on a display screen of the terminal, the application of the video sharing software is launched, and an initial shooting interface is entered. A video shooting mode control and a video shooting control are set on the initial shooting interface. When a video segment is obtained by shooting, in addition to the video shooting mode control and the video shooting control displayed simultaneously on the shooting interface, a video generation control will also be displayed. The number of video shooting mode controls is at least one, each video shooting mode control corresponds to one video shooting mode, and accordingly corresponds to one shooting speed. The video shooting mode controls may include a normal shooting speed control, a fast shooting speed control, and a slow shooting speed control.

Example 1: The video shooting mode instruction, the video shooting instruction, the video shooting pause instruction, and the video generation instruction are generated by the user triggering, selecting, or releasing corresponding controls on the shooting interface of the terminal. The video shooting mode control and the video shooting control are displayed on the current initial shooting interface. The user triggers the normal shooting speed control according to the actual situation to select the normal shooting speed as the shooting speed, and triggers the video shooting control. In this case, a camera starts to shoot a video on a target scene until the user releases the video shooting control, and then the shooting of the current video segment is ended to obtain video segment 1; at the same time, the video shooting mode control and the video shooting control will be displayed again simultaneously on the shooting interface, and the video generation control will also be displayed. The user triggers the fast shooting speed control according to the actual situation again to select the fast shooting speed as the shooting speed, and triggers the video shooting control again. In this case, the camera starts to shoot a video on the target scene again until the user releases the video shooting control again, and then the shooting of the current video segment is ended to obtain video segment 2; at the same time, the video shooting mode control and the video shooting control will be displayed simultaneously on the shooting interface for the third time, and the video generation control will be displayed for the second time. The user triggers the slow shooting speed control according to the actual situation at this third time so that the slow shooting speed is selected as the shooting speed, and the user triggers the video shooting control for the third time. In this case, the camera starts to shoot a video on the target scene for the third time until the user releases the video shooting control for the third time, and then the shooting of the current video segment is ended to obtain video segment 3; at the same time, the video shooting mode control and the video shooting control will be displayed simultaneously on the shooting interface for the fourth time, and the video generation control will be displayed for the third time; the user triggers the video generation control, then the current entire video shooting is ended, and the existing video segment 1, video segment 2, and video segment 3 are synthetized to obtain the target video.

Example 2: The video shooting mode instruction and the video shooting instruction are generated by the user triggering or selecting the corresponding controls on the shooting interface of the terminal; the video shooting pause instruction before the shooting time length is detected to have reached a predetermined shooting time threshold is generated by the user by triggering a corresponding control on the shooting interface of the terminal, and when it is detected that the shooting time length has reached the predetermined shooting time threshold, the user does not need to release the corresponding control on the shooting interface of the terminal to generate the video shooting pause instruction, and the video shooting pause instruction is automatically generated. Moreover, the user does not need to trigger a corresponding control on the shooting interface of the terminal to generate the video generation instruction, and the video generation instruction is automatically generated at the same time. The process is the same as the process in Example 1 in which video segment 1, video segment 2, and video segment 3 are obtained, except that after video segment 3 is shot, the sum of the shooting time lengths of video segment 1, video segment 2 and video segment 3 is equal to the predetermined shooting time threshold. At this point, video segment 3 can be obtained without ending the shooting of the current video segment by the user releasing the video shooting control; at the same time, it is also not necessary to end the current entire video shooting by the user triggering the video generation control, and the existing video segment 1, video segment 2 and video segment 3 may be automatically synthetized to obtain the target video.

In an embodiment, the triggering of the video shooting control described herein may refer to long-pressing the video shooting control, and when the video shooting control is released, it is determined that the shooting of the current video segment is ended.

In the technical solution of this embodiment, a video shooting mode instruction is acquired, wherein the video shooting mode instruction includes a shooting speed, and different video shooting modes have different shooting speeds; after a video shooting instruction is obtained, a video is shot on a target scene according to the shooting speed until a video shooting pause instruction is acquired, thereby obtaining a video segment between the video shooting instruction and the video shooting pause instruction; it is determined whether a video generation instruction is obtained; if the video generation instruction is not obtained, acquiring the video shooting mode instruction, the video shooting instruction and the video shooting pause instruction is repeated to obtain corresponding video segments until the video generation instruction is obtained; and a target video is generated according to existing video segments. During the video shooting process, the processing of the fast-speed and/or slow-speed video segments is completed, and the solution is quick and convenient, which improves the flexibility in shooting and processing videos by the user and improves the user experience.

In an embodiment, the video shooting pause instruction may be triggered by a user, or may be triggered by determining whether a shooting time length reaches a predetermined shooting time threshold.

In the embodiment of the present disclosure, the video shooting pause instruction may be generated by being triggered by the user, or may be triggered and generated by determining whether a shooting time length reaches a predetermined shooting time threshold, wherein generating the video shooting pause instruction by the user triggering is applicable to a situation in which the shooting time length does not reach the predetermined shooting time threshold, and generating the video shooting pause instruction by determining whether the shooting time length reaches the predetermined shooting time threshold is applicable to a situation in which the shooting time length reaches the predetermined shooting time threshold. Exemplarily, the predetermined shooting time length threshold may be 15 seconds, and video segment 1 and video segment 2 have been currently obtained, wherein video segment 1 has a shooting time length of 3 seconds and video segment 2 has a shooting time length of 8 seconds. Since the shooting time length of shooting video segment 1 is 3 seconds, which does not reach the 15 seconds set by the predetermined shooting time threshold, the video shooting pause instruction corresponding to video segment 1 is generated by being triggered by the user. Since the shooting time length of shooting video segment 2 is 8 seconds, and a sum of it and the shooting time length of video segment 1 is 11 seconds, which also does not reach the 15 seconds set by the predetermined shooting time threshold, the video shooting pause instruction corresponding to video segment 2 is also generated by being triggered by the user. Now, the next video segment is shot. When the shooting time length of this video segment reaches 4 seconds, the sum of it and the shooting time lengths of video segment 1 and video segment 2 is equal to 15 seconds, which reaches the 15 seconds set by the predetermined shooting time threshold; therefore, the video shooting pause instruction can be automatically generated without being triggered by the user, and video segment 3 is obtained correspondingly.

In an embodiment, the video generation instruction may be generated by being triggered by the user, or may be triggered and generated by determining whether the shooting time length reaches the predetermined shooting time threshold, wherein generating the video generation instruction by the user triggering is applicable to a situation in which the shooting time length does not reach the predetermined shooting time threshold, and generating the video generation instruction by determining whether the shooting time length reaches the predetermined shooting time threshold is applicable to a situation in which the shooting time length reaches the predetermined shooting time threshold. Exemplarily, the predetermined shooting time threshold may be 15 seconds, and video segment 1 and video segment 2 have been currently obtained, wherein video segment 1 has a shooting time length of 3 seconds and video segment 2 has a shooting time length of 8 seconds. At this point, the video generation instruction is obtained, which was generated by being triggered by the user. This is because a sum of the shooting time length of shooting video segment 1 and the shooting time length of shooting video segment 2 is 11 seconds, which does not reach the 15 seconds set by the predetermined shooting time threshold. Now, the next video segment is shot. When the shooting time length of this video segment reaches 4 seconds, the sum of it and the shooting time lengths of video segment 1 and video segment 2 is equal to 15 seconds, which reaches the 15 seconds set by the predetermined shooting time threshold; therefore, at the same time the video shooting pause instruction is automatically generated, the video generation instruction is also automatically generated without being triggered by the user.

It can be known from the above that when it is determined that the shooting time length reaches the predetermined shooting time threshold, the video generation instruction may also be generated without being triggered by the user at the same time the video shooting pause instruction is generated.

In an embodiment, the video shooting pause instruction is triggered by determining whether the shooting time length reaches the predetermined shooting time threshold. In an embodiment, it is determined whether the shooting time length reaches the predetermined shooting time threshold. If it has reached the threshold, the video shooting pause instruction is triggered. The length of shot video (or the shooting time length) may include the shooting time length of one video segment or a total shooting time length of at least two video segments.

In the embodiment of the present disclosure, the video shooting pause instruction is triggered by determining whether the time length reaches the predetermined shooting time threshold. In an embodiment, it is determined whether the shooting time length reaches the predetermined shooting time threshold. If the shooting time length reaches the predetermined shooting time threshold, the video shooting pause instruction may be triggered without being triggered by the user; and if the shooting time length does not reach the predetermined shooting time threshold, the video shooting pause instruction is triggered by the user. In an embodiment, the length of shot video (or the shooting time length) may include the shooting time length of one video segment or a total shooting time length of at least two video segment. In an embodiment, when the shooting time length includes the shooting time length of one video segment, it indicates that the shooting time length of the piece of shot video reaches the predetermined shooting time threshold; and when the shooting time length includes a total shooting time length of at least two segments, it indicates that the total shooting time length of several pieces of shot videos reaches the predetermined shooting time threshold.

Exemplarily, the predetermined shooting time threshold is 15 seconds, and it is now assumed that video segment 1 already exists, wherein the video length of video segment 1 is 15 seconds. Since the video length of video segment 1 is 15 seconds, which has reached the 15 seconds set by the predetermined shooting time threshold, the shooting time length is the shooting time of video segment 1. Now it is also assumed that video segment 1 and video segment 2 already exist, wherein the video length of video segment 1 is 7 seconds, and the video length of video segment 2 is 8 seconds. Since the total shooting time length of video segment 1 and video segment 2 is 15 seconds, the shooting time length is the total shooting time length of video segment 1 and video segment 2.

In an embodiment, the triggering the video generation instruction by determining whether the shooting time length reaches the predetermined shooting time threshold may include: determining whether the shooting time length reaches the predetermined shooting time threshold, and if it has reached the threshold, triggering the video generation instruction, wherein the length of shot video (or shooting time length) may include the shooting time length of one piece of shot video or a total shooting time length of several pieces of shot videos.

Based on the two different ways of triggering the video shooting pause instruction and the video generation instruction, the technical solutions of the embodiments of the present disclosure are described as follows:

Case 1: It is determined that the shooting time length has not reached the predetermined shooting time threshold. Correspondingly, both the video shooting pause instruction and the video generation instruction can be generated only by being triggered by the user, that is, if the user does not trigger, the video shooting pause instruction and the video generation instruction will not be generated. That is:

a video shooting mode instruction is acquired, wherein the video shooting mode instruction includes a shooting speed, and different video shooting modes have different shooting speeds; after a video shooting instruction is obtained, a video is shot on a target scene according to the shooting speed until a video shooting pause instruction is acquired by the user triggering, thereby obtaining a video segment between the video shooting instruction and the video shooting pause instruction; it is determined whether a video generation instruction generated by the user triggering is obtained; if the video shooting pause instruction generated by the user triggering is not obtained, acquiring the video shooting mode instruction, the video shooting instruction and the video shooting pause instruction generated by the user triggering is repeated to obtain corresponding video segments until the video generation instruction generated by the user triggering is obtained, and then a target video is obtained by synthetizing existing video segments.

Case 2: It is determined that the shooting time length has reached the predetermined shooting time threshold. A situation in which the target video includes only one video segment and a situation in which the target video includes at least two video segments will be described separately, that is:

1. The target video includes only one video segment, that is, the shooting time length of one video segment obtained by shooting has reached the predetermined shooting time threshold. A video shooting mode instruction is acquired, wherein the video shooting mode instruction includes a shooting speed, and different video shooting modes have different shooting speeds; after a video shooting instruction is obtained, a video is shot on a target scene according to the shooting speed until a video shooting pause instruction triggered and generated when the shooting time length has reached the predetermined shooting time threshold is acquired, thereby obtaining a video segment between the video shooting instruction and the video shooting pause instruction. At the same time, a video generation instruction triggered and generated when the shooting time length has reached the predetermined shooting time threshold is also acquired, and a target video is obtained by synthetizing existing video segments.

2. The target video includes at least two video segments, that is, the sum of the shooting time lengths of multiple video segments obtained by shooting reaches the predetermined shooting time threshold. The video shooting pause instruction and the video generation instruction corresponding to the last video segment of the multiple video segments are both generated when the shooting time length reaches the predetermined shooting time threshold. A video shooting mode instruction is acquired, wherein the video shooting mode instruction includes a shooting speed, and different video shooting modes have different shooting speeds; after a video shooting instruction is obtained, a video is shot on a target scene according to the shooting speed until a video shooting pause instruction generated by the user triggering is acquired, thereby obtaining a video segment between the video shooting instruction and the video shooting pause instruction; it is determined whether a video shooting pause instruction generated when the shooting time length has reached the predetermined shooting time threshold is obtained; if the video shooting pause instruction generated when the shooting time length has reached the predetermined shooting time threshold is not obtained, acquiring the video shooting mode instruction, the video shooting instruction and the video shooting pause instruction generated by the user triggering is repeated to obtain corresponding video segments until the video shooting pause instruction generated when the shooting time length has reached the predetermined shooting time threshold is acquired, thereby obtaining the last video segment. At the same time, a video generation instruction generated when the shooting time length has reached the predetermined shooting time threshold is acquired, and a target video is obtained by synthetizing existing video segments. In an embodiment, the video shooting pause instruction corresponding to the last video segment is generated when the shooting time length has reached the predetermined shooting time threshold, and the video generation instruction is also generated when the shooting time length has reached the predetermined shooting time threshold.

In an embodiment, before obtaining the video segment between the video shooting instruction and the video shooting pause instruction by shooting a video on the target scene according to the shooting speed until the video shooting pause instruction is obtained after the video shooting instruction is obtained, the method may include: determining whether a first special effect instruction is obtained. Correspondingly, the obtaining the video segment between the video shooting instruction and the video shooting pause instruction by shooting a video on the target scene according to the shooting speed until the video shooting pause instruction is obtained after the video shooting instruction is obtained may include: if the first special effect instruction is obtained, when a video shooting instruction is obtained, shooting a video on the target scene according to the first special effect instruction and the shooting speed until a video shooting pause instruction is obtained, thereby obtaining the video segment between the video shooting instruction and the video shooting pause instruction.

In the embodiment of the present disclosure, in order to present a better video shooting effect, a shooting special effect may be set before shooting a video on the target scene. Based on the above description, before shooting a video on the target scene according to the shooting speed, it is determined whether a first special effect instruction is obtained, wherein the first special effect instruction may include at least one of a beautification instruction, a prop instruction, or a countdown instruction, the beautification instruction may include at least one of a filter instruction, a dermabrasion instruction, or a big-eye thin-face instruction; the prop instruction may include a variety of props; the filter instruction may include normal, Japanese style, old time, or innocence, etc., and the dermabrasion instruction and the big-eye thin-face instruction are characterized by numerical values such as 0, 1, or 2.

If the first special effect instruction is obtained, a video may be shot on the target scene according to the first special effect instruction and the shooting speed, that is, the special effect corresponding to the first special effect instruction is added to the video shooting process, so that a better video shooting effect can be presented. During the above video shooting process, when the video shooting pause instruction is acquired, the shooting of the current video segment can be ended to obtain a corresponding video segment.

Exemplarily, before a video is shot on the target scene, it is determined that the first special effect instruction is obtained, wherein the first special effect instruction includes the beautification instruction and the prop instruction, and it is determined to start a shooting process of video shooting on the target scene according to the obtained video shooting instruction, and to shoot a video on the current target scene according to the first special effect instruction and the shooting speed; when the video shooting pause instruction is obtained, the shooting of the current video segment may be ended to obtain the video segment between the video shooting instruction and the video shooting pause instruction. Correspondingly, the obtained corresponding video segment includes the effect that can be achieved by the first special effect instruction.

In an embodiment, after the target video is generated according to the existing video segments, the method may further include: determining whether an editing instruction is obtained. If the editing instruction is obtained, the target video is processed according to the editing instruction to obtain a processed target video.

In the embodiment of the present disclosure, in order to present a better video shooting effect, the target video may be edited after the target video is generated according to the existing video segments. Based on the above description, after the target video is generated according to the existing video segments, it is determined whether an editing instruction is obtained. The editing instruction may include at least one of a music cutting instruction, a music selection instruction, or a cover selection instruction. In an embodiment, the editing instruction may further include a second special effect instruction and a filter instruction, wherein the second special effect instruction may include a filter special effect instruction or a time special effect instruction, the filter special effect instruction may include freeing soul from body, illusion, or jitter, etc., and the time special effect instruction may include time elapsing, flashing, or slow motion. In an embodiment, the filter instruction described herein is the same as the filter instruction in the beautification instruction described above. In an embodiment, since the second special effect instruction may include a filter special effect instruction and a time special effect instruction, and the first special effect instruction may include a beautification instruction, a prop instruction, and a countdown instruction, the contents of the two are not the same. In addition, the second special effect instruction described herein is for the post-editing processing of the synthetized target video. The second special effect instruction may be applied to a specific moment selected in the target video.

If the editing instruction is obtained, the target video is processed according to the editing instruction to obtain a processed target video, that is, the target video is subjected to the post-editing processing, so that a better video shooting effect can be presented.

In an embodiment, after the target video is processed according to an editing instruction to obtain the processed target video if the editing instruction is obtained, the method may further include: determining whether a storage mode instruction is obtained, wherein the storage mode instruction includes a draft box instruction or a release instruction. If the storage mode instruction is obtained, the processed target video is stored according to the storage mode instruction.

In the embodiment of the present disclosure, the storage mode instruction may refer to a storage form of the target video, and may include a draft box instruction or a release instruction. If the selected storage mode instruction is a draft box instruction, the target video will be saved to the draft box, and the target video in the box can only be seen by the current user; and if the selected storage mode instruction is a release instruction, the target video will be uploaded to the network so that the target video can also be seen by other users.

When the processed target video is obtained, it is determined whether a storage mode instruction is obtained. If the storage mode instruction is obtained, the processed target video may be correspondingly stored according to the storage mode instruction. In this way, the user may select a suitable storage form of the target video according to the actual situation.

In an embodiment, after the processed target video is stored according to the storage mode instruction if the storage mode instruction is obtained, the method may further include: determining whether a video playing instruction is obtained. If the video playing instruction is obtained, the processed target video is played according to the video playing instruction.

In the embodiment of the present disclosure, after the processed target video is correspondingly stored according to the storage mode instruction, it can be determined whether a video playing instruction is obtained, and if the video playing instruction is obtained, the processed target video may be played according to the video playing instruction.

In an embodiment, since the target video is obtained by synthesizing at least one video segment, wherein each video segment has its corresponding shooting speed when being shot, the target video can directly present the corresponding shooting effect when it is played. That is, a video segment with a normal shooting speed may be presented in the target video, a video segment with a fast shooting speed may be presented, and a video segment with a slow shooting speed may also be presented. That is, the target video may have multiple effects presented when being played, rather than only a single effect presented.

In an embodiment, in addition to the video shooting mode instruction, the video shooting instruction, the video shooting pause instruction and the video generation instruction described above that may be generated by triggering, selecting, or releasing corresponding controls on the shooting interface of the terminal, the first special effect instruction, the editing instruction, the storage mode instruction and the playing instruction may also be generated by triggering or selecting corresponding controls on the target interface.

In an embodiment, during the process of shooting a video segment, a deletion operation may be performed on the obtained video segment, which may be: determining whether a deletion instruction is obtained. If the deletion instruction is obtained, the corresponding obtained video segment is deleted according to the deletion instruction. This applies to a case where the user is not satisfied with a certain shot video segment, and the corresponding video segment may be deleted by the deletion instruction. The video segment to be deleted may be a preceding video segment of the current video segment, or several preceding video segments of the current video segment, which may be determined according to the actual situation and is not specifically limited herein.

Second Embodiment

Figure 2:
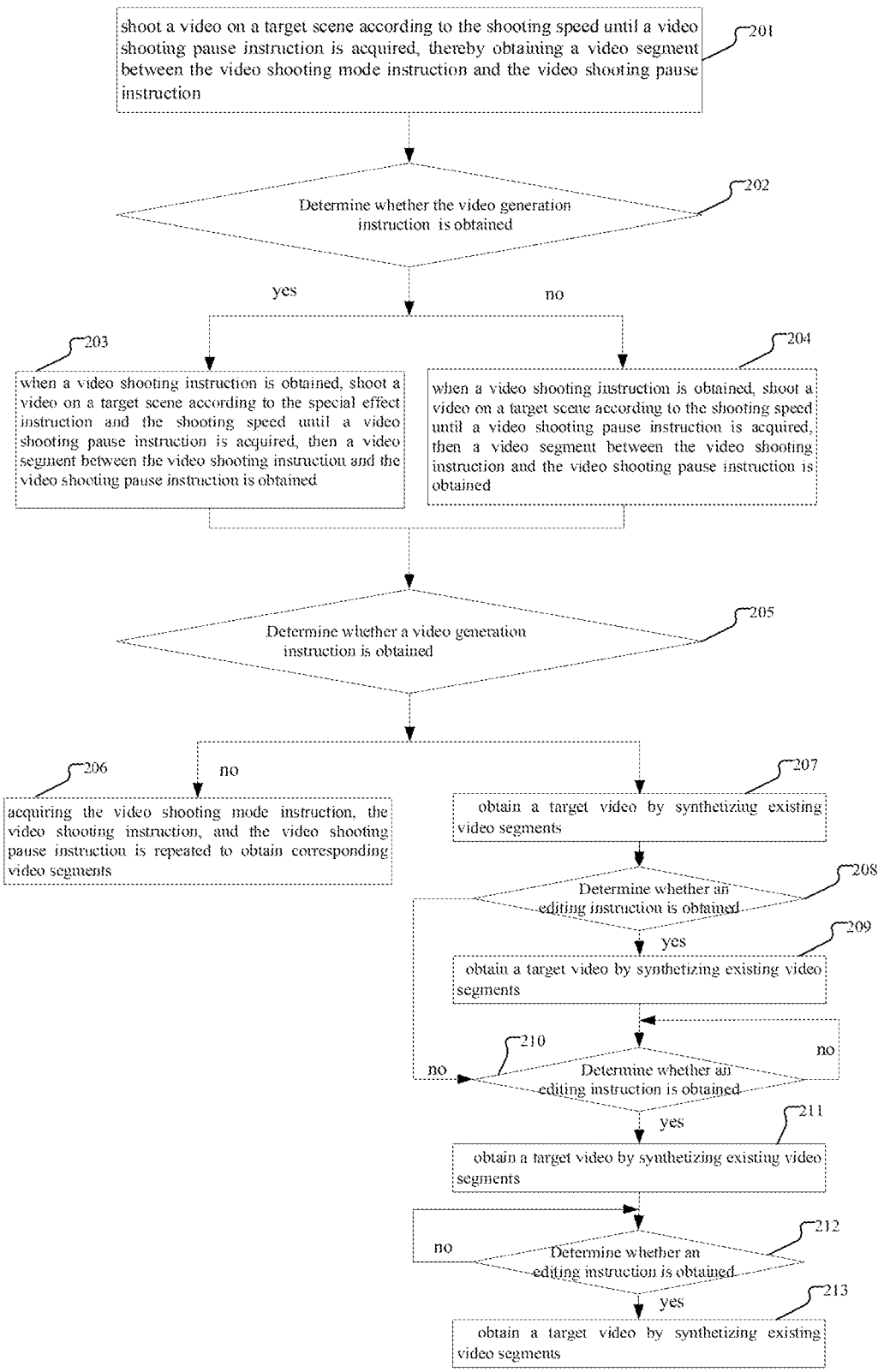
FIG. 2 is a flow chart of another method for video shooting according to an embodiment of the present disclosure.

FIG. 2 is a flow chart of another method for video shooting according to an embodiment of the present disclosure. The present embodiment is applicable to a situation of reducing the difficulty of video processing. The method may be performed by an apparatus for shooting a video, and the apparatus may be implemented by software and/or hardware. The apparatus may be configured in a terminal device, which is typically for example a mobile phone and/or a tablet computer, and the like. As shown in FIG. 2, the method includes steps 201 to 213.

In step 201, a video shooting mode instruction is acquired, wherein the video shooting mode instruction includes a shooting speed, and different video shooting modes have different shooting speeds.

In step 202, it is determined whether a special effect instruction is obtained; if yes, step 203 is executed; and if not, step 204 is executed.

In step 203, when a video shooting instruction is obtained, a video is shot on a target scene according to the special effect instruction and the shooting speed until a video shooting pause instruction is acquired, then a video segment between the video shooting instruction and the video shooting pause instruction is obtained, and the method proceeds to step 205.

In step 204, when a video shooting instruction is obtained, a video is shot on a target scene according to the shooting speed until a video shooting pause instruction is acquired, then a video segment between the video shooting instruction and the video shooting pause instruction is obtained, and the method proceeds to step 205.

In step 205, it is determined whether a video generation instruction is obtained; if yes, step 207 is executed; and if not, step 206 is executed.

In step 206, acquiring the video shooting mode instruction, the video shooting instruction, and the video shooting pause instruction is repeated to obtain corresponding video segments, and then the process returns to step 205.

In step 207, a target video is obtained by synthesizing existing video segments.

In step 208, it is determined whether an editing instruction is obtained; if yes, step 209 is executed; and if not, step 210 is executed.

In step 209, the target video is processed according to the editing instruction to obtain a processed target video.

In step 210, it is determined whether a storage mode instruction is obtained; if yes, step 211 is executed; and if not, step 210 is executed again.

In step 211, the target video or the processed target video is stored according to the storage mode instruction.

In step 212, it is determined whether a video playing instruction is obtained; if yes, step 213 is executed; and if not, the process returns to step 212.

In step 213, the target video or the processed target video is played according to the video playing instruction.

In the embodiment of the present disclosure, the special effect instruction may include at least one of a beautification instruction, a prop instruction, or a countdown instruction; the editing instruction may include at least one of a music cutting instruction, a music selection instruction, or a cover selection instruction; and the storage mode instruction may include a draft box instruction or a release instruction.

In the technical solution of this embodiment, a video shooting mode instruction is acquired, wherein the video shooting mode instruction includes a shooting speed, and different video shooting modes have different shooting speeds; after a video shooting instruction is obtained, a video is shot on a target scene according to the shooting speed until a video shooting pause instruction is acquired, thereby obtaining a video segment between the video shooting instruction and the video shooting pause instruction; it is determined whether a video generation instruction is obtained; if the video generation instruction is not obtained, acquiring the video shooting mode instruction, the video shooting instruction and the video shooting pause instruction is repeated to obtain corresponding video segments until the video generation instruction is obtained; a target video is generated according to existing video segments, and the target video is processed according to an obtained editing instruction. During the video shooting process, the processing of the fast-speed and/or slow-speed video segments is completed, and the solution is quick and convenient, which improves the flexibility in shooting and processing videos by the user and improves the user experience.

Third Embodiment

Figure 3:
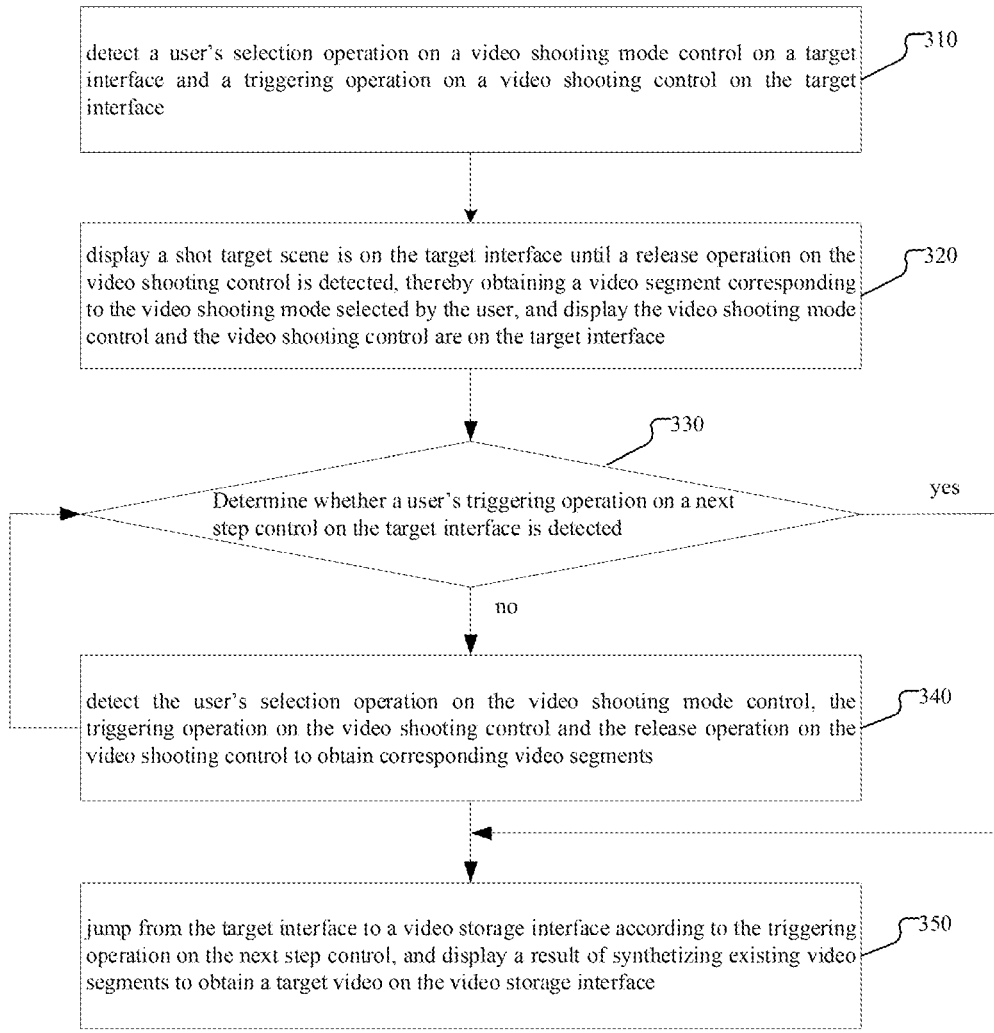
FIG. 3 is a flow chart of still another method for shooting a video according to an embodiment of the present disclosure.

FIG. 3 is a flow chart of still another method for video shooting according to an embodiment of the present disclosure. The present embodiment is applicable to a situation of reducing the difficulty of video processing. As shown in FIG. 3, the method includes steps 310 to 350.

In step 310, a user's selection operation on a video shooting mode control on a target interface and a triggering operation on a video shooting control on the target interface are detected.

In step 320, a shot target scene is displayed on the target interface until a release operation on the video shooting control is detected, thereby obtaining a video segment corresponding to the video shooting mode selected by the user, and the video shooting mode control and the video shooting control are displayed on the target interface.

In step 330, it is determined whether a user's triggering operation on a next step control on the target interface is detected; if yes, the method proceeds to step 350; and if not, the method proceeds to step 340.

In step 340, the user's selection operation on the video shooting mode control, the triggering operation on the video shooting control and the release operation on the video shooting control are detected to obtain corresponding video segments, and then the process returns to step 330.

In step 350, the interface jumps from the target interface to a video storage interface according to the triggering operation on the next step control, and a result of synthetizing existing video segments to obtain a target video is displayed on the video storage interface.

In the embodiment of the present disclosure, the video shooting process may be implemented by the user's operations on relevant controls on a target interface, wherein the target interface may refer to a shooting interface on which the user may operate. In an embodiment, a user's selection operation on a video shooting mode control on a target interface and a triggering operation on a video shooting control on the target interface are detected, wherein the user's selection operation on the video shooting mode control on the target interface may be configured to select a corresponding video shooting mode, and the video shooting mode corresponds to a shooting speed; the user's triggering operation on the video shooting control on the target interface may be configured to start the current video shooting process; the user's release operation on the video shooting control on the target interface may be configured to end the shooting of the current video segment; and the user's triggering operation on the next step control on the target interface may be configured to end the current video shooting and trigger the synthetizing of the existing video segments to obtain the target video. In an embodiment, the number of video shooting mode controls is at least two. The video shooting mode controls may include a fast-lens control, a normal control, and a slow-lens control. In an embodiment, if the user selects the fast-lens control in the video shooting mode control, it indicates that the shooting speed corresponding to video shooting of the target scene is fast-lens shooting speed; if the user selects the normal control in the video shooting mode control, it indicates that the shooting speed corresponding to video shooting of the target scene is normal shooting speed; and if the user selects the slow-lens control in the video shooting mode control, it indicates that the shooting speed corresponding to video shooting of the target scene is slow-lens shooting speed. In order to meet the requirements of users so as to present a better video shooting effect, more video shooting mode controls may be set on the target interface, such as a 2-time (2×) fast-lens control or a ½ slow-lens control, etc., which may be set according to the actual situation and is not specifically limited herein.

When the user's selection operation on the video shooting mode control on the target interface is detected, the corresponding shooting speed is determined, and when the user's triggering operation on the video shooting control on the target interface is detected, it is determined that a shooting process of video shooting of the target scene displayed in the target interface is started. A video is shot on the target scene at the shooting speed until the user's release operation on the video shooting control is detected, and then the shooting of the current video segment can be ended to obtain the corresponding video segment and the video segment is stored; at the same time, the video shooting mode control and the video shooting control will be displayed on the target interface again to facilitate the shooting of the next video segment. It is determined whether the user's triggering operation on the next step control on the target interface is detected. If the user's triggering operation on the next step control on the target interface is not detected, the detection of the user's selection operation on the video shooting mode control on the target interface and the user's triggering operation on the video shooting control on the target interface are repeated. The corresponding shooting speed is determined according to the user's selection operation on the video shooting mode control on the target interface, and a shooting process of video shooting of the target scene displayed in the target interface is determined to start according to the user's triggering operation on the video shooting control on the target interface. A video is shot on the target scene at the shooting speed until the user's release operation on the video shooting control is detected, and then the shooting of the current video segment can be ended to obtain the corresponding video segment and the video segment is stored; at the same time, the video shooting mode control and the video shooting control will be displayed on the target interface again to facilitate the shooting of the next video segment. If the user's triggering operation on the next step control on the target interface is not detected, then each time step 340 is executed, a corresponding video segment can be obtained, and each video segment has its own corresponding shooting speed. After the user's triggering operation on the next step control on the target interface is detected, the entire current video shooting process can be ended, and the existing video segments can be synthetized to obtain the target video. At the same time, the interface will jump to the video storage interface and display a result of synthetizing existing video segments to obtain the target video. In an embodiment, the target video may be obtained by splicing and synthetizing existing video segments according to a chronological order of the generation thereof.

In the technical solution of this embodiment, a user's selection operation on a video shooting mode control on a target interface and a triggering operation on a video shooting control on the target interface are detected; a target scene is displayed on the target interface until a user's release operation on the video shooting control is detected, thereby obtaining a corresponding video segment, and the video shooting mode control and the video shooting control are displayed on the target interface; it is determined whether a user's triggering operation on a next step control on the target interface is detected; if the user's triggering operation on the next step control on the target interface is not detected, the detection of the user's selection operation on the video shooting mode control, the triggering operation on the video shooting control and the release operation on the video shooting control are repeated to obtain corresponding video segments until the user's triggering operation on the next step control on the target interface is detected; the interface jumps to a video storage interface and displays a result of synthetizing existing video segments to obtain the target video. During the video shooting process, the processing of the fast-speed and/or slow-speed video segments is completed, and the solution is quick and convenient, which improves the flexibility in shooting and processing videos by the user and improves the user experience.

In an embodiment, the method may further include displaying a progress bar at the same time the target scene is displayed on the target interface. If it is detected that the progress bar is displayed completely, the interface jumps from the target interface to the video storage interface and a result of synthetizing existing video segments to obtain the target video is displayed on the video storage interface.

In the embodiment of the present disclosure, the progress bar is also displayed at the same time the target scene is displayed on the target interface, and the progress bar may characterize the shooting time length, that is, as the video shooting progresses, the length of the progress bar is extended accordingly. If the progress bar is displayed completely, it may indicate that the shooting time length has reached a predetermined shooting time threshold. That is, at this point, the user is not required to generate a video shooting pause instruction by releasing the video shooting control or to generate a video generation instruction by triggering the next step control, and the video generation instruction may be automatically generated at the same time the video shooting pause instruction is automatically generated, whereby the interface jumps to the video storage interface and displays a result of synthetizing existing video segments to obtain the target video.

In an embodiment, if the video shooting pause instruction is generated by the user releasing the video shooting control, and at the same time the video generation instruction is generated by the user triggering the next step control, then it may indicate that the progress bar is not displayed completely, so correspondingly, the video shooting pause instruction and the video generation instruction will not be automatically generated, and the interface jumps to the video storage interface and displays a result of synthetizing existing video segments to obtain the target video. If the progress bar is displayed completely, only the way of acquiring the video shooting pause instruction corresponding to the last video segment is different from the way of acquiring the video shooting pause instructions corresponding to preceding existing video segments. At the same time, the way of acquiring the video generation instruction is different from that in the case where the progress bar is not displayed completely. For the case where the progress bar is displayed completely, in an embodiment, the user's selection operation on the video shooting mode control on the target interface and the triggering operation on the video shooting control are detected, and the target scene is displayed on the target interface until the user's release operation on the video shooting control is detected; then the corresponding video segment is obtained and the video shooting mode control and video shooting control are displayed on the target interface. Detection of the user's selection operation on the video shooting mode control on the target interface, the triggering operation on the video shooting control and the release operation on the video shooting control is continued to obtain corresponding video segments (for all the video segments before the last video segment); alternatively, after detecting the user's last selection operation on the video shooting mode control on the target interface and the triggering operation on the video shooting control, when it is detected that the progress bar is displayed completely (at this point, the video shooting pause instruction is obtained), the interface will jump to the video storage interface and display a result of synthetizing existing video segments to obtain the target video.

In an embodiment, before the user's triggering operation on the video shooting control is detected, the method may further include: detecting the user's selection operation on the first special effect control on the target interface. Correspondingly, displaying the target scene on the target interface may include: displaying the target scene superimposed with the first special effect control selected by the user on the target interface.

In the embodiment of the present disclosure, in order to present a better video shooting effect, a shooting special effect may be set before shooting a video on the target scene. In an embodiment, it may be implemented by a user's triggering operation on the first special effect control on the target interface. Based on the above description, before the user's triggering operation on the video shooting control is detected, the user's selection operation on the first special effect control on the target interface is detected, wherein the first special effect control may include at least two of a beautification control, a prop control, or a countdown control, the beautification control may include at least one of a filter control, a dermabrasion control, or a big-eye thin-face control; the prop control may include a variety of props; the filter instruction may include normal, Japanese style, old time, or innocence, etc., and the dermabrasion instruction and the big-eye thin-face instruction are characterized by numerical values such as 0, 1, or 2. In an embodiment, if the user's selection operation on the first special effect control on the target interface is detected, during the shooting of the video segment of the target scene, a corresponding special effect is superimposed, that is, the corresponding special effect is contained in the corresponding obtained video segment. In an embodiment, the target scene is displayed on the target interface until the user's release operation of the video shooting control is detected, then the corresponding video segment is obtained and the first special effect control will also be displayed on the target interface in addition to the video shooting mode control and the video shooting control displayed on the target interface.

In an embodiment, after jumping to the video storage interface and displaying the result of synthetizing existing video segments to obtain the target video, the method may further include: jumping to a video editing interface, wherein the video editing interface includes an editing control and a next step control. If a user's selection operation on the editing control is detected and a user's triggering operation on the next step control on the video editing interface is detected, the interface jumps from the video editing interface to a video storage mode interface; wherein the video storage mode interface includes a storage mode control.

In the embodiment of the present disclosure, in order to present a better video shooting effect, the target video may be edited. In an embodiment, after jumping to the video storage interface and displaying the result of synthetizing existing video segments to obtain the target video, the interface may jump to the video editing interface. The video editing interface may include an editing control and a next step control, wherein the editing control may include at least two of a music cutting control, a music selection, and a cover selection control or a filter control. In an embodiment, the editing control may further include a second special effect control and a filter control, the second special effect control may include a filter special effect control or a time special effect control. The filter special effect control may include controls such as freeing soul from body, illusion, or jitter, etc., and the time special effect control may include controls such as time elapsing, flashing, or slow motion. The user's triggering operation on the next step control on the video editing interface may be configured to jump from the video editing interface to the video storage mode interface. In an embodiment, the filter control in the editing control described herein is the same as the filter control in the beautification control described above. In an embodiment, the second special effect control described herein aims at a target video that was synthetized but has not been subjected to editing processing, and performs post-editing processing on it. The target video is edited by the user's selection operation on the editing control on the video editing interface. Based on the above, if the user's selection operation on the editing control is detected, the target video will be edited according to the selected editing control, and at the same time, if the user's triggering operation on the next step control on the editing interface is detected, the interface will jump to the video storage mode interface. The video storage mode interface may include a storage mode control, and the user may select a suitable storage form of the target video through a selection operation on the storage mode control.

It can be known from the above description that there is also a next step control on the target interface. For the user's triggering operations on the two next step controls: the user's triggering operation on the next step control on the target interface may be configured to indicate the end of the current entire video shooting, trigger the synthetizing of existing video segments, and jump from the target interface to the video storage interface to display the result of obtaining the target video, whereas the user's triggering operation on the next step control on the video editing interface may be configured to indicate that the interface jumps from the video editing interface to the video storage mode interface.

In an embodiment, both the second special effect control and the first special effect control in the embodiment of the present disclosure described above can play a role of adding special effects, but the second special effect control includes a filter special effect control or a time special effect control, whereas the first special effect control includes at least two of a beautification control, a prop control, or a countdown control, and the contents of the two controls are different.

In an embodiment, after the interface jumps to the video storage mode interface which includes the storage mode control, the method may further include: if a user's selection operation on the storage mode control is detected, jumping from the video storage mode interface to a video presentation mode interface and displaying a storage result of the target video corresponding to the selection operation on the storage mode control on the video presentation mode interface; wherein the storage mode control includes a draft box control and a release control.

In the embodiment of the present disclosure, the user may select a suitable storage form of the target video through the selection operation on the storage mode control. If the user's selection operation on the storage mode control on the video storage interface is detected, the interface will jump to the video presentation mode interface and display the storage result of the target video, wherein the storage mode control may include a draft box control and a release control. If the selected storage mode control is the draft box control, the target video will be saved to the draft box, and the target video in the draft box can only be seen by the current user; and if the selected storage mode control is the release control, the target video will be uploaded to the network so that it can also be seen by other users. In an embodiment, the target video described herein refers to a target video after editing processing. If the target video has not been edited, the target video refers to a video obtained by direct synthetizing. In an embodiment, the method may further include: if a triggering operation on a works control on a user homepage interface is detected, jumping to a video playing interface and playing the target video on the video playing interface.

In the embodiment of the present disclosure, the user homepage interface usually displays user's basic information and user's works information, and the above information may be used to perform relevant operations through corresponding controls on the user homepage interface, such as modifying the user's basic information, and playing the user's works, etc. When the user is watching the target video, it can be achieved by triggering the works control on the user homepage interface. In an embodiment, if the user's triggering operation on the works control on the user homepage interface is detected, the interface jumps to the video playing interface to play the target video. In addition, the video playing interface also displays a sharing control, a like control, and a comment control. For example, the user may trigger the sharing control to share the target video to other application software. The user may give a like to the target video by triggering the like control. The user may comment on the target video by triggering the comment control and entering corresponding texts or expressions.

In an embodiment, after the first video segment is obtained, at the same time the video shooting mode control and the video shooting control are displayed on the target interface, a deletion control may also be displayed. Triggering the deletion control may be used to delete the obtained video segment. The deleted video segment may be a preceding video segment of the current video segment, or may be several preceding video segments of the current video segment, which may be determined according to the actual condition and is not specifically limited herein. The above operation is applicable to a case where the user is not satisfied with a certain shot video segment, and the corresponding video segment may be deleted by triggering the deletion control on the target interface.

Fourth Embodiment

Figure 4:
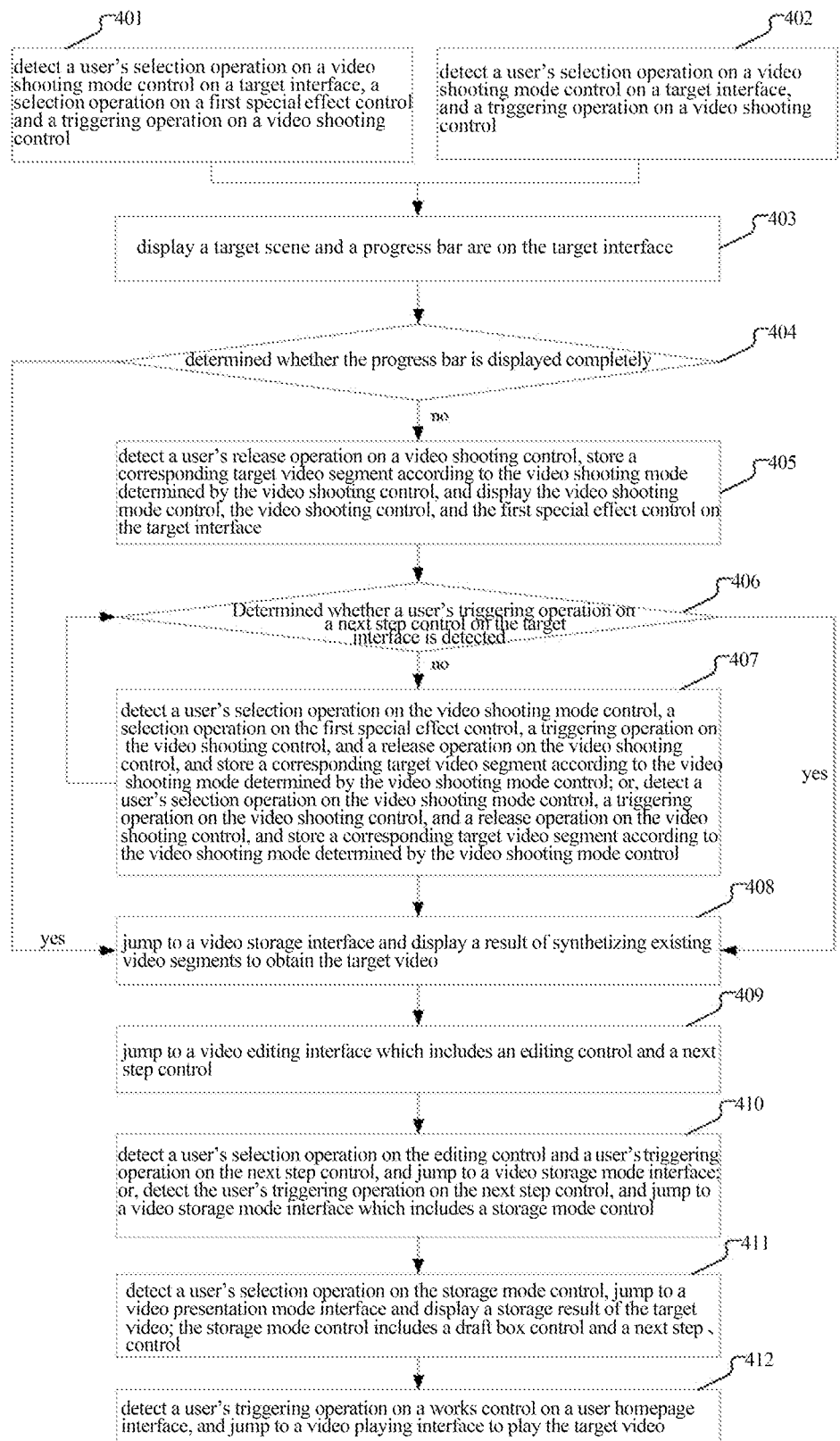
FIG. 4 is a flow chart of further another method for video shooting according to an embodiment of the present disclosure.

FIG. 4 is a flow chart of further another method for video shooting according to an embodiment of the present disclosure. The present embodiment is applicable to a situation of reducing the difficulty of video processing. As shown in FIG. 4, the method includes steps 401 to 412.

In step 401, a user's triggering operation on a video shooting mode control on a target interface and a selection operation on a first special effect control on the target interface are detected, and the method proceeds to step 403.

In step 402, the user's triggering operation on the video shooting module control on the target interface is detected, and the method proceeds to step 403.

In step 403, a target scene and a progress bar are displayed on the target interface.

In step 404, it is determined whether the progress bar is displayed completely; if yes, the method proceeds to step 408; and if not, step 405 is executed.

In step 405, a user's release operation on a video shooting control is detected, so that a corresponding video segment is obtained and the video shooting mode control, the video shooting control, and the first special effect control are displayed on the target interface.

In step 406, it is determined whether a user's triggering operation on a next step control on the target interface is detected; if yes, the method proceeds to step 408; and if not, step 407 is executed.

In step 407, a user's selection operation on the video shooting mode control, a selection operation on the first special effect control, a triggering operation on the video shooting control, and a release operation on the video shooting control are detected to obtain a corresponding video segment; or, a user's selection operation on the video shooting mode control, a triggering operation on the video shooting control, and a release operation on the video shooting control are detected to obtain a corresponding video segment, and then the method returns to step 406.

In step 408, the interface jumps to a video storage interface and displays a result of synthetizing existing video segments to obtain the target video.

In step 409, the interface jumps to a video editing interface which includes an editing control and a next step control.

In step 410, when a user's selection operation on the editing control is detected and a user's triggering operation on the next step control is detected, the interface jumps to a video storage mode interface; or, when the user's triggering operation on the next step control is detected, the interface jumps to a video storage mode interface; the video storage mode interface includes a storage mode control.

In step 411, when a user's selection operation on the storage mode control is detected, the interface jumps to a video presentation mode interface and displays a storage result of the target video; the storage mode control includes a draft box control and a next step control.

In step 412, when a user's triggering operation on a works control on a user homepage interface is detected, the interface jumps to a video playing interface to play the target video.

Figure 5:
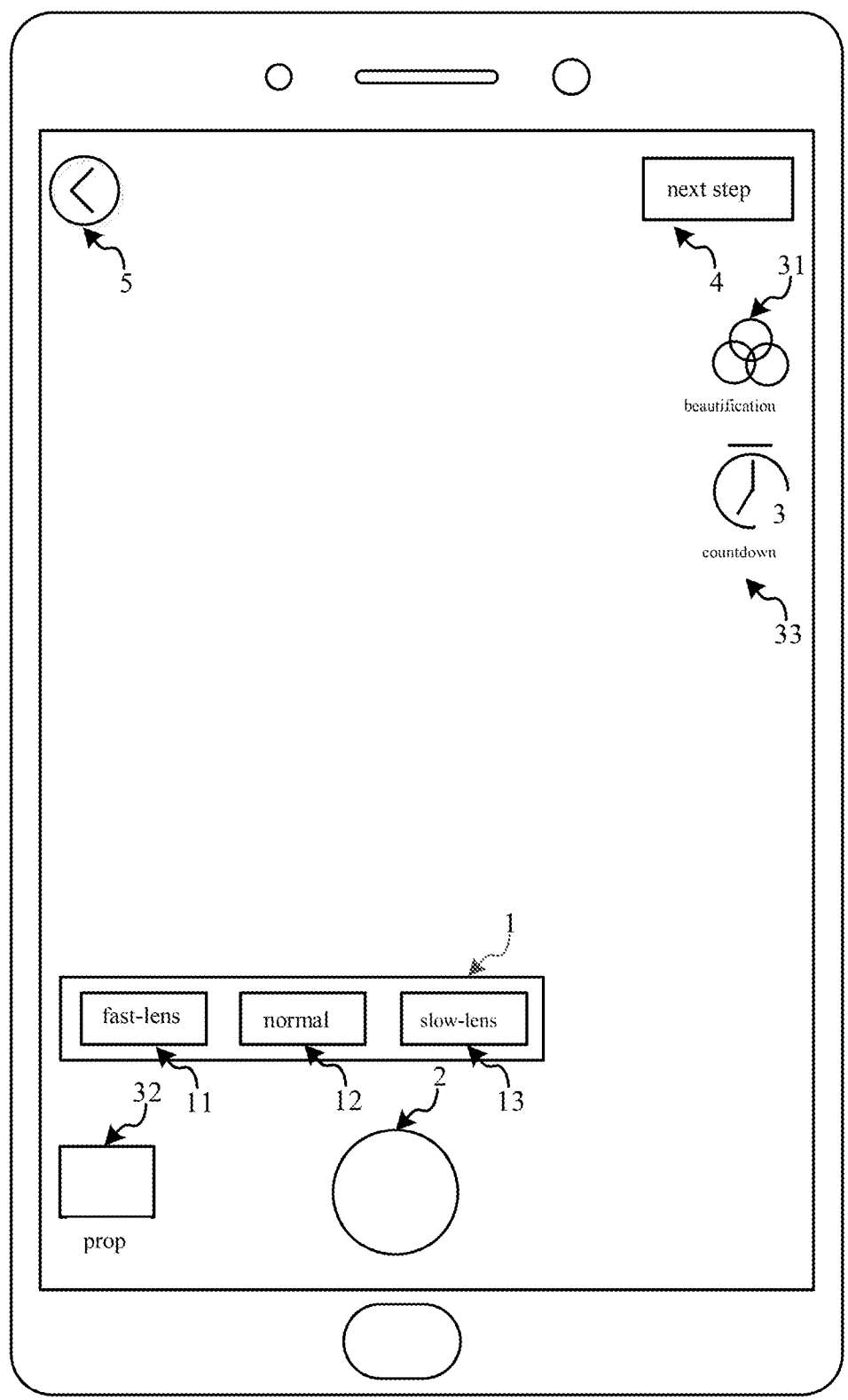
FIG. 5 is a schematic structural view of an initial target interface according to an embodiment of the present disclosure.

In the embodiment of the present disclosure, a certain video sharing software on a terminal is taken as an example for description below:

As shown in FIG. 5, a structure view of an initial target interface is presented, that is, the video shooting is not yet performed. The initial target interface may include: a video shooting mode control 1, a video shooting control 2, a first special effect control 3 ((not shown in the figure), a next step control 4, and a return control 5, wherein the video shooting mode control 1 may include a fast-lens control 11, a normal control 12 and a slow-lens control 13. In an embodiment, the number of the video shooting mode controls is more than one, and is not limited to that shown in FIG. 5. The first special effect control 3 may include a beautification control 31, a prop control 32, and a countdown control 33. When the user shoots a video on a target scene, it can be implemented by operating relevant controls on the initial target interface. During the video shooting process, the initial target interface will change accordingly. In the following, multiple processes involved in video shooting will be described in a manner in which the user manipulates controls on a target interface.

Figure 6:
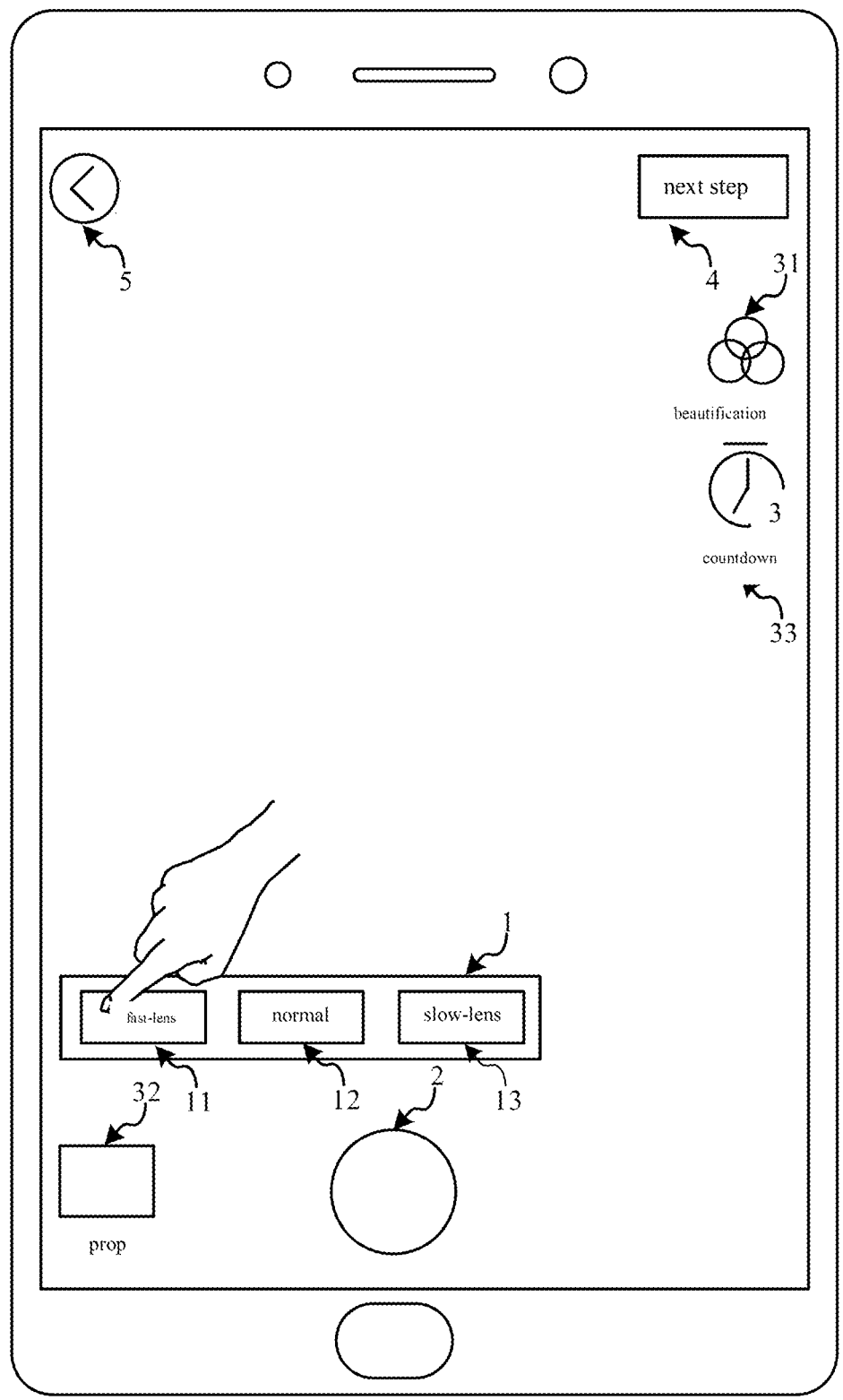
FIG. 6 is a schematic structural view of another initial target interface according to an embodiment of the present disclosure.
Figure 7:
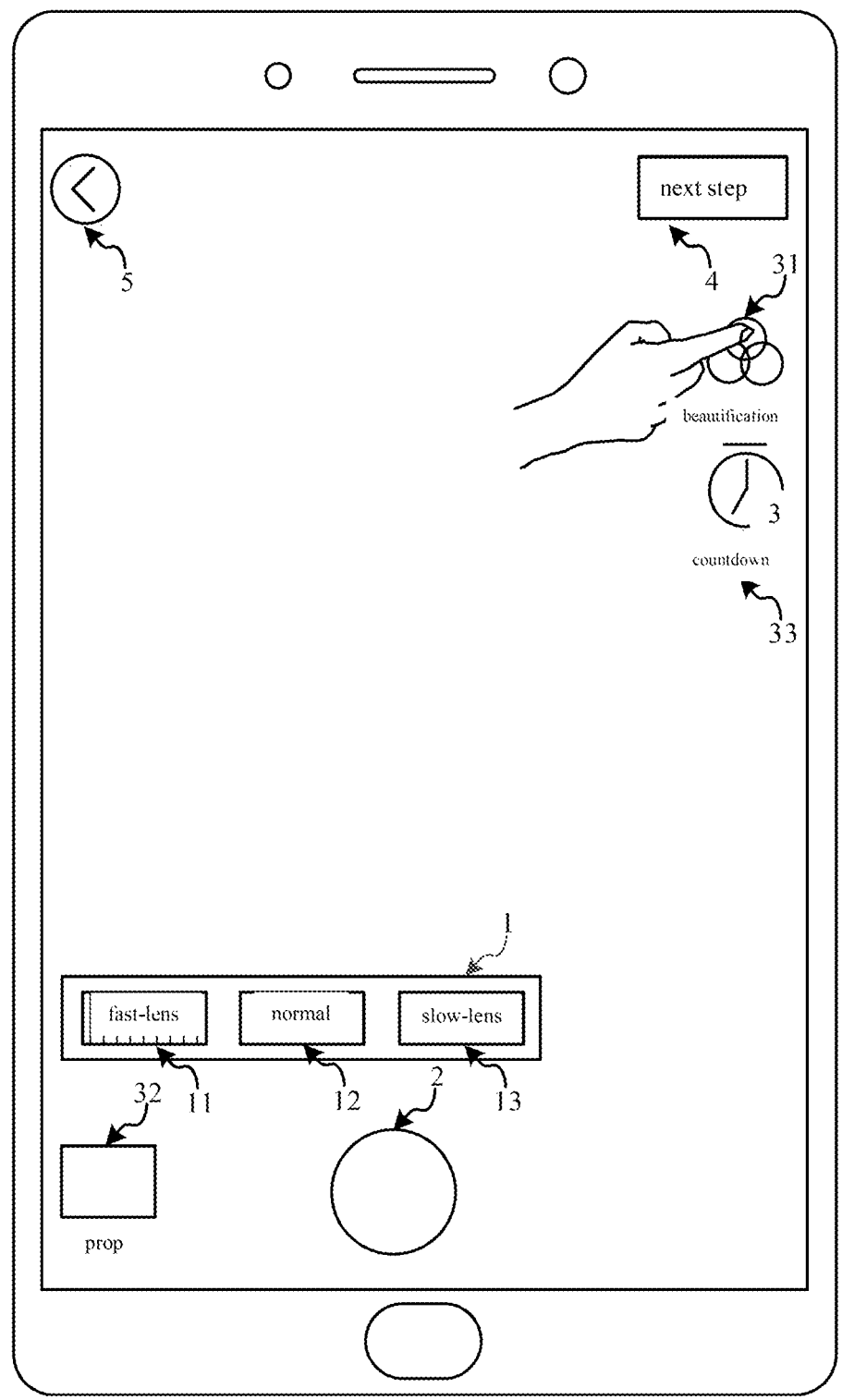
FIG. 7 is a schematic structural view of still another initial target interface according to an embodiment of the present disclosure.
Figure 8:
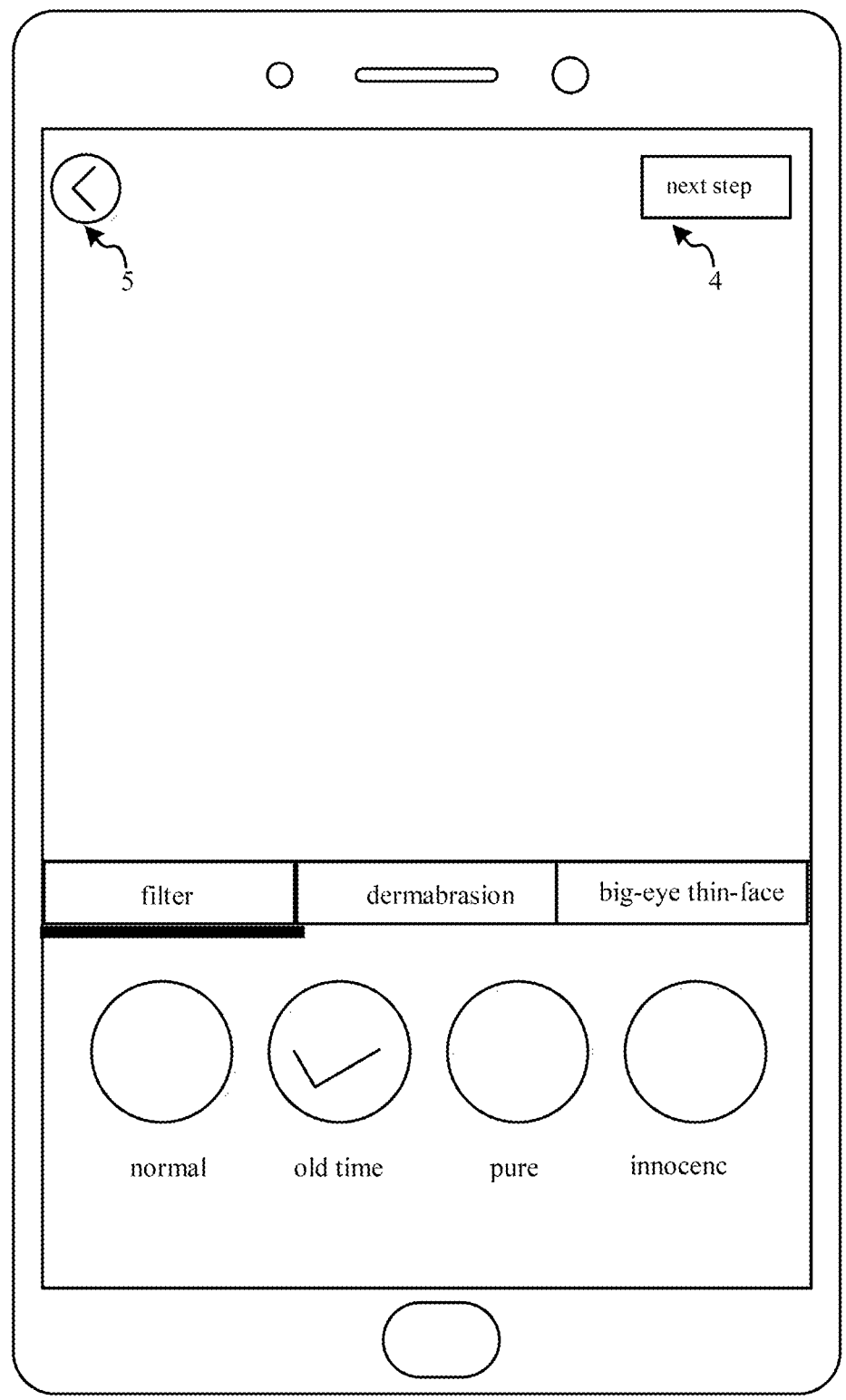
FIG. 8 is a schematic structural view of a special effect selection interface according to an embodiment of the present disclosure.
Figure 9:
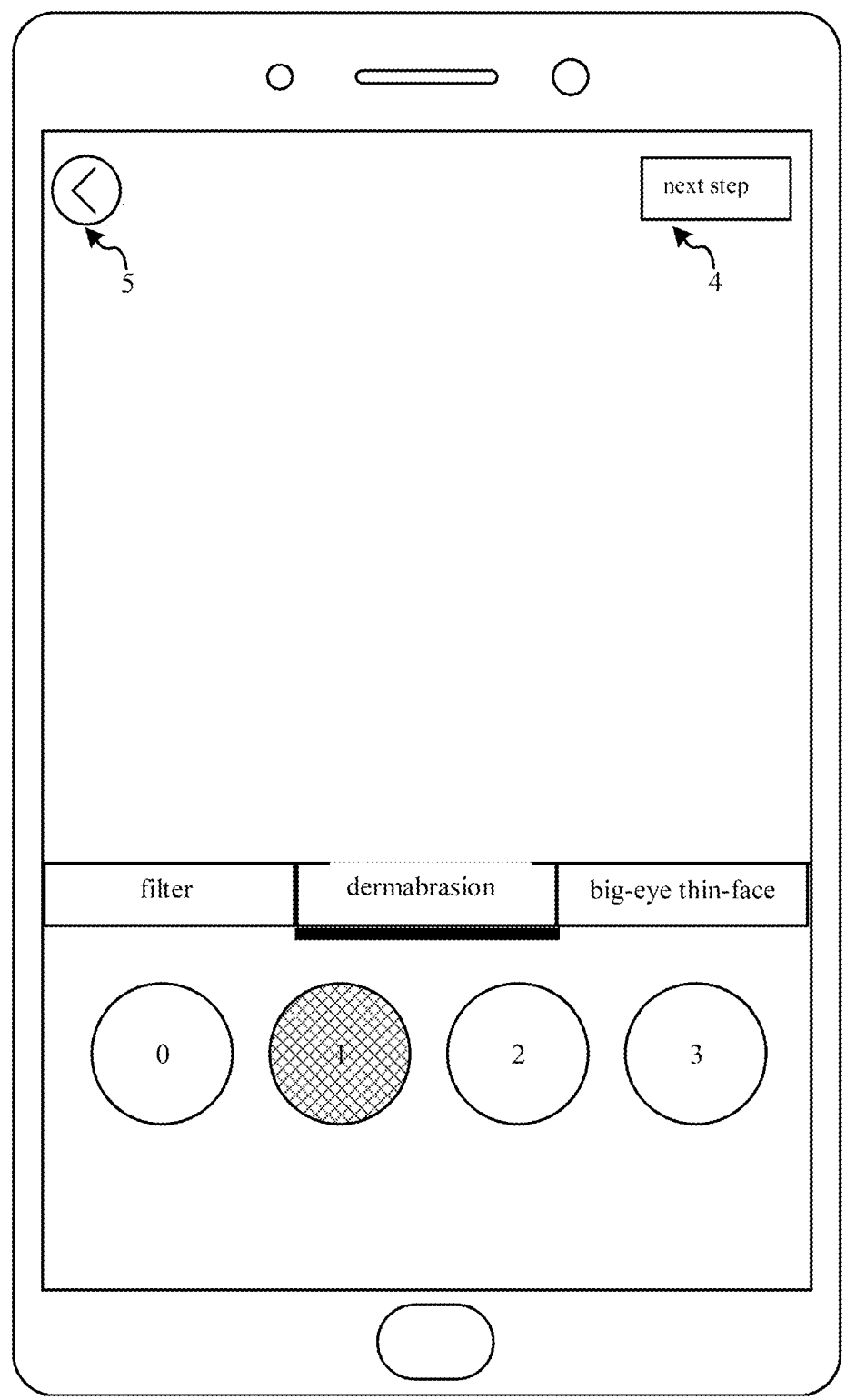
FIG. 9 is a schematic structural view of another special effect selection interface according to an embodiment of the present disclosure.
Figure 10:
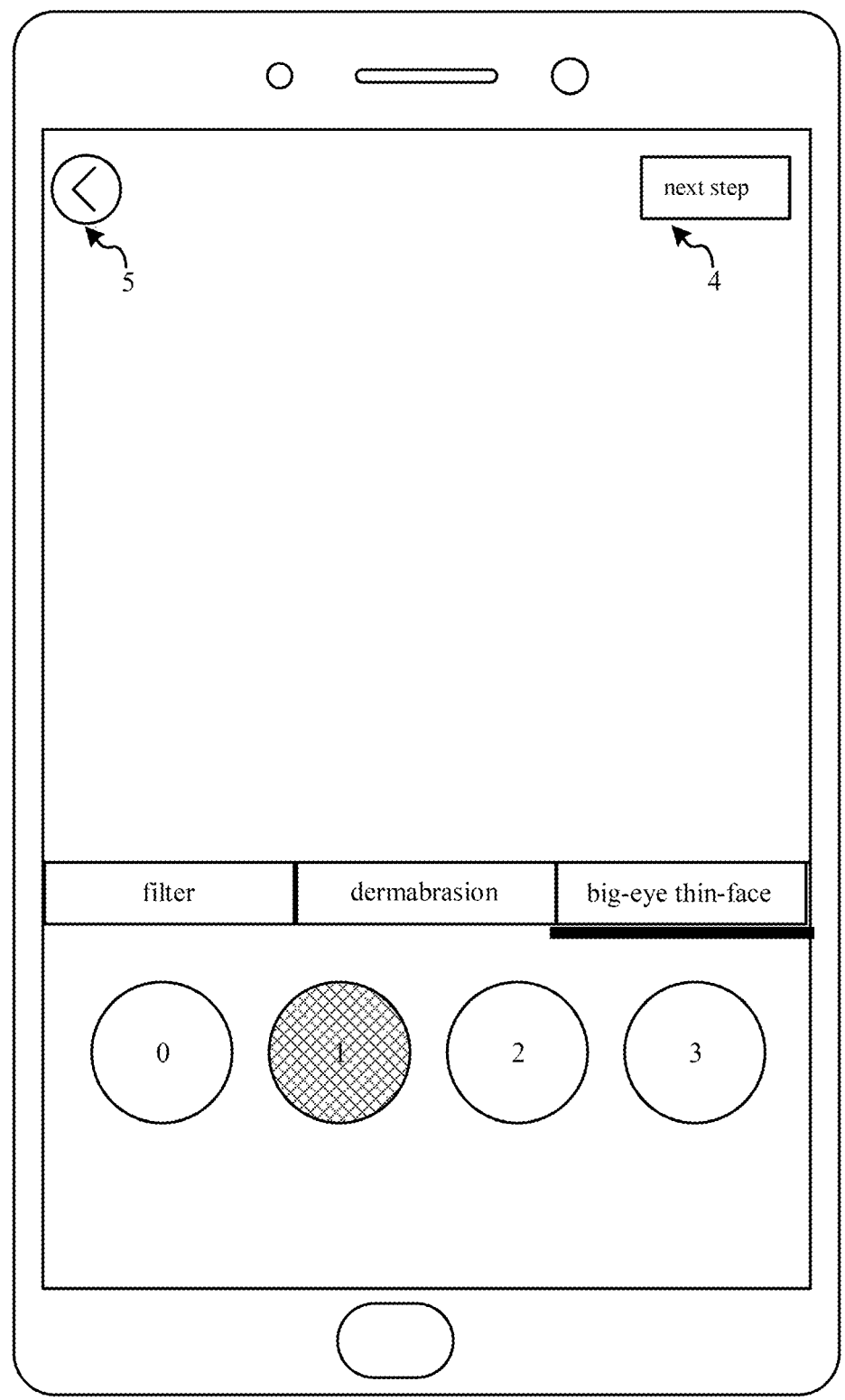
FIG. 10 is a schematic structural view of still another special effect selection interface according to an embodiment of the present disclosure.
Figure 11:
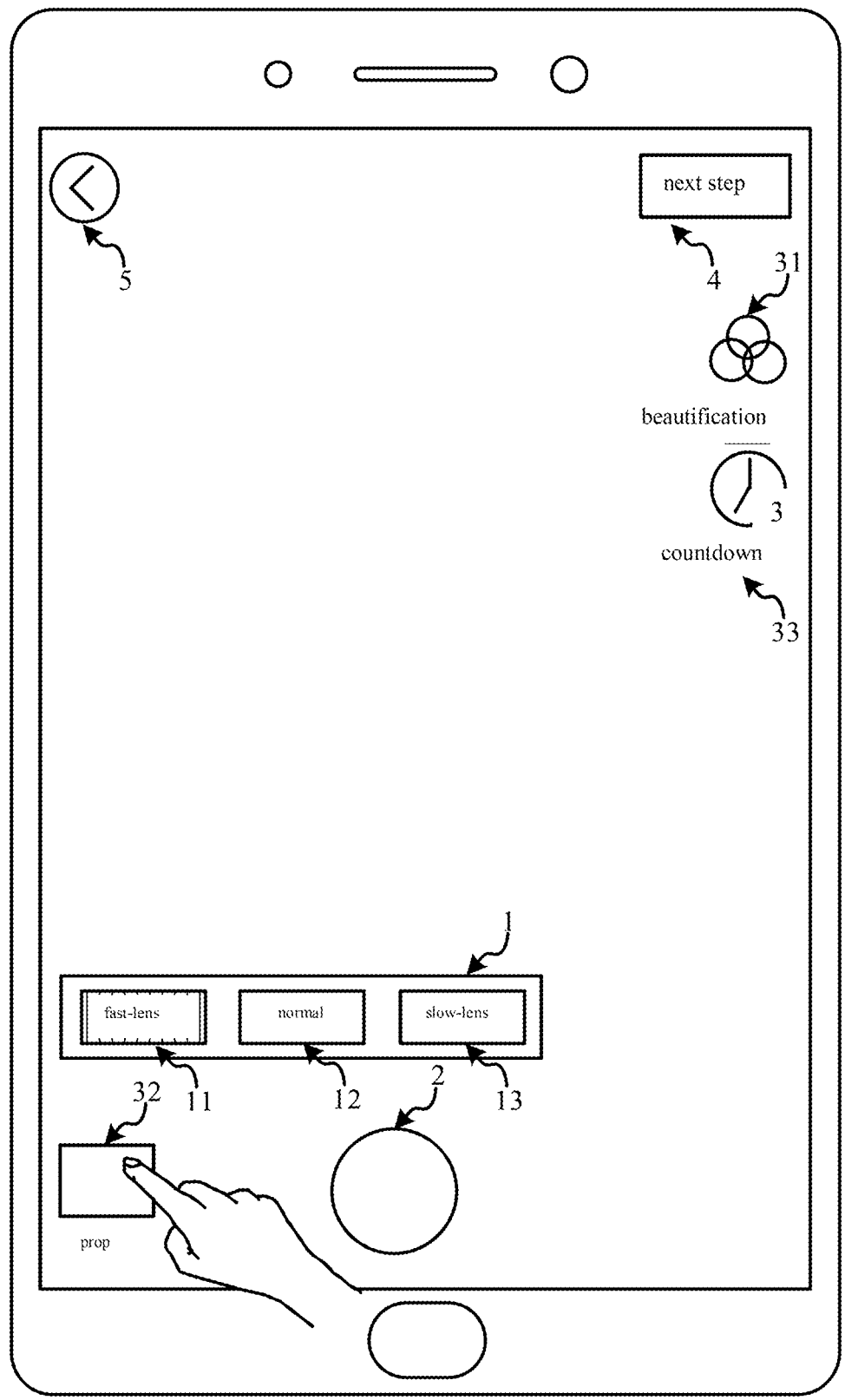
FIG. 11 is a schematic structural view of further another special effect selection interface according to an embodiment of the present disclosure.
Figure 12:
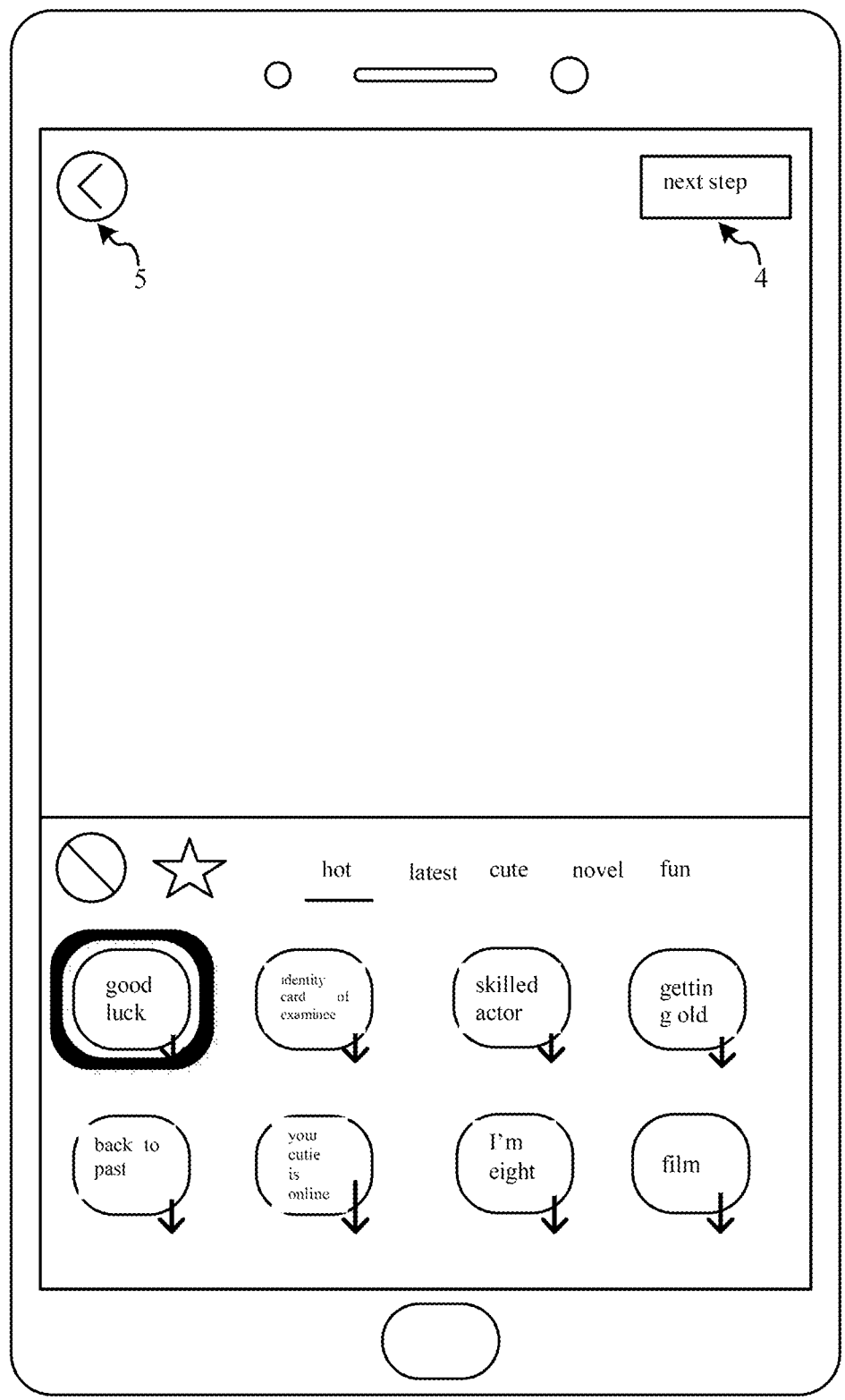
FIG. 12 is a schematic structural view of yet another special effect selection interface according to an embodiment of the present disclosure.

First, the user completes the selection of the shooting mode and the special effect by manipulating relevant controls on the initial target interface. In an embodiment, as shown in FIG. 6, the user selects the fast-lens control 11 through the selection operation on the video shooting mode control 1 on the initial target interface; as shown in FIG. 7, the interface jumps to the beautification interface as shown in FIG. 8 through the user's triggering operation on the beautification control 31 on the initial target interface. At the same time, the beautification interface displays a filter control, a dermabrasion control, and a big-eye thin-face control. The "old time" is selected through a triggering operation on the filter control. The interface jumps to the dermabrasion selection interface as shown in FIG. 9 through a triggering operation on the dermabrasion control, and a value 1 is selected. The interface jumps to the big-eye thin-face selection interface as shown in FIG. 10 through a triggering operation on the big-eye thin-face control, and a value 1 is selected. As shown in FIG. 11, the interface jumps to the prop interface shown in FIG. 12 by the user's triggering operation on the prop control 32 on the initial target interface, and "Good luck for the college entrance examination" is selected. In addition, since the countdown control 33 is not triggered, no countdown operation is performed. Hitherto, the selection of the video shooting mode and the special effect is completed.

Figure 13:
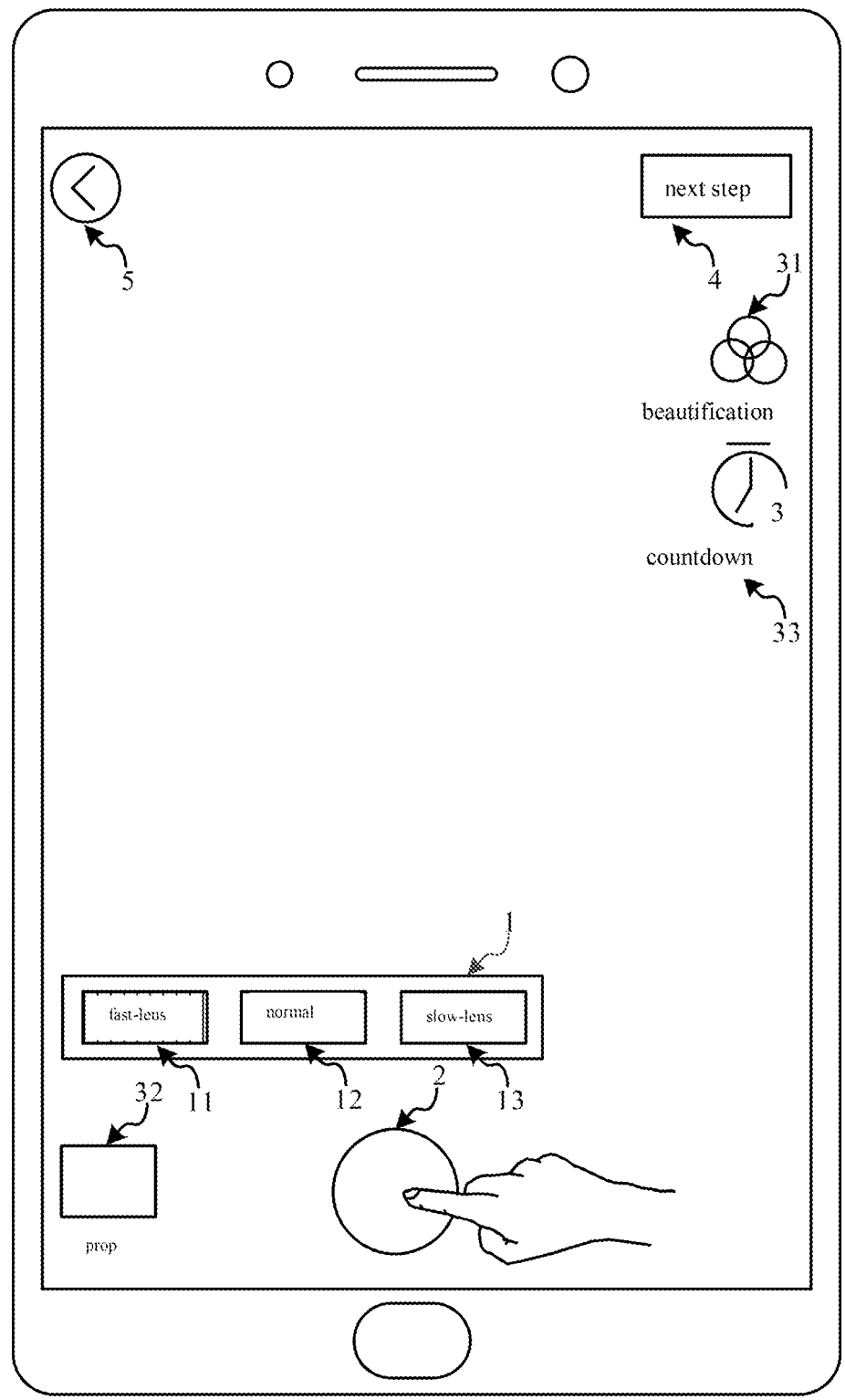
FIG. 13 is a schematic structural view of a shooting interface according to an embodiment of the present disclosure.
Figure 14:
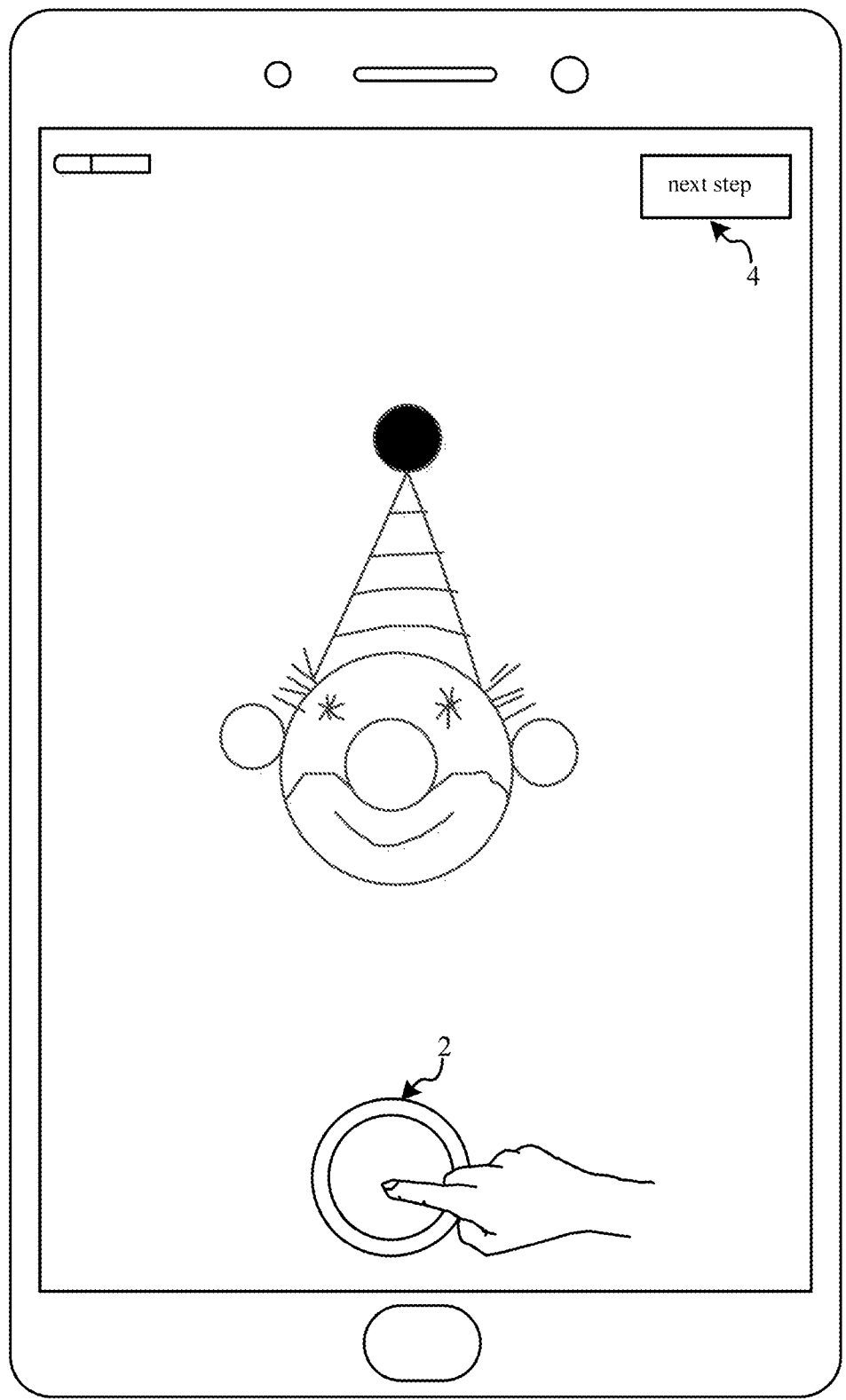
FIG. 14 is a schematic structural view of another shooting interface according to an embodiment of the present disclosure.
Figure 15:
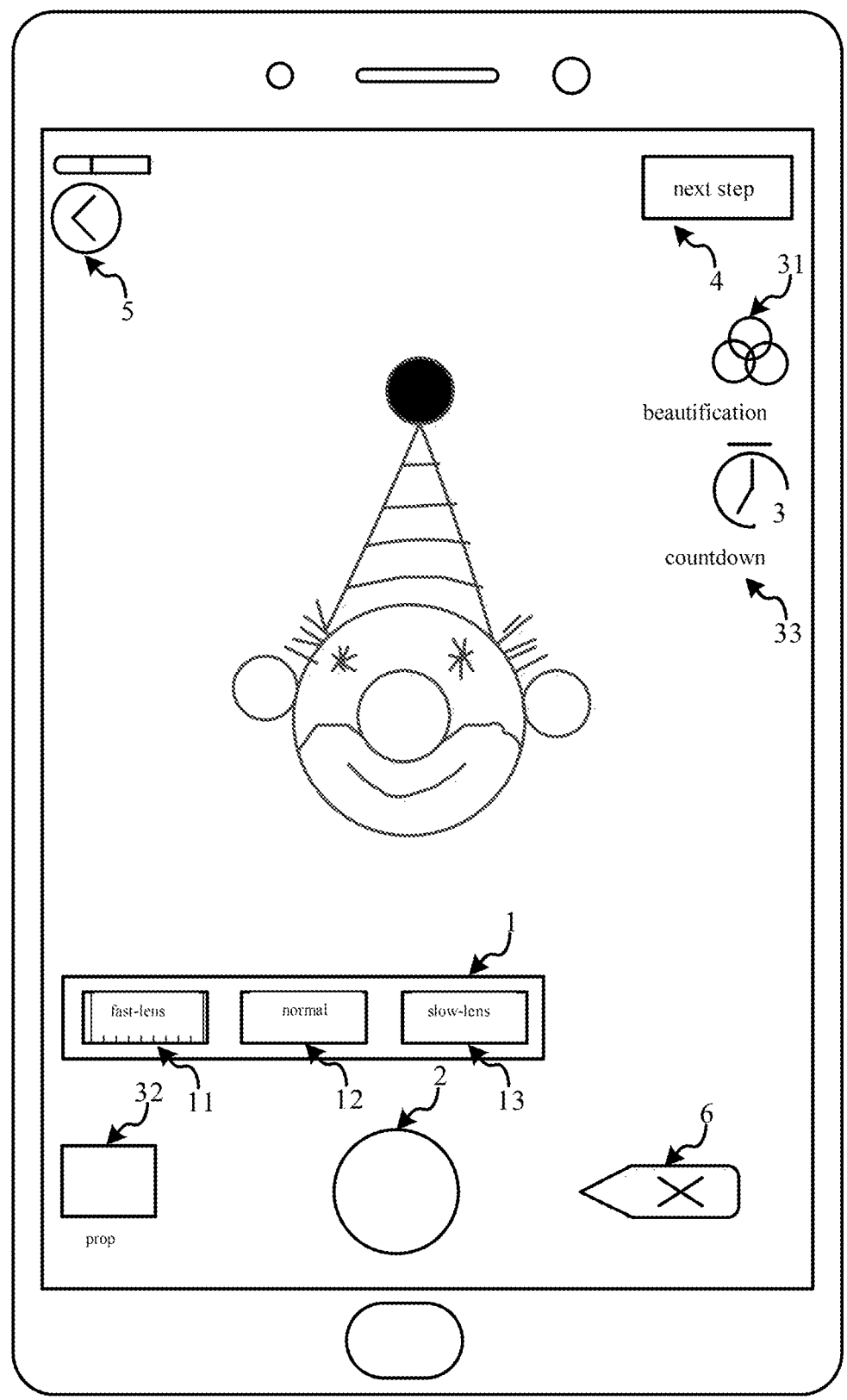
FIG. 15 is a schematic structural view of a deletion interface according to an embodiment of the present disclosure.
Figure 16:
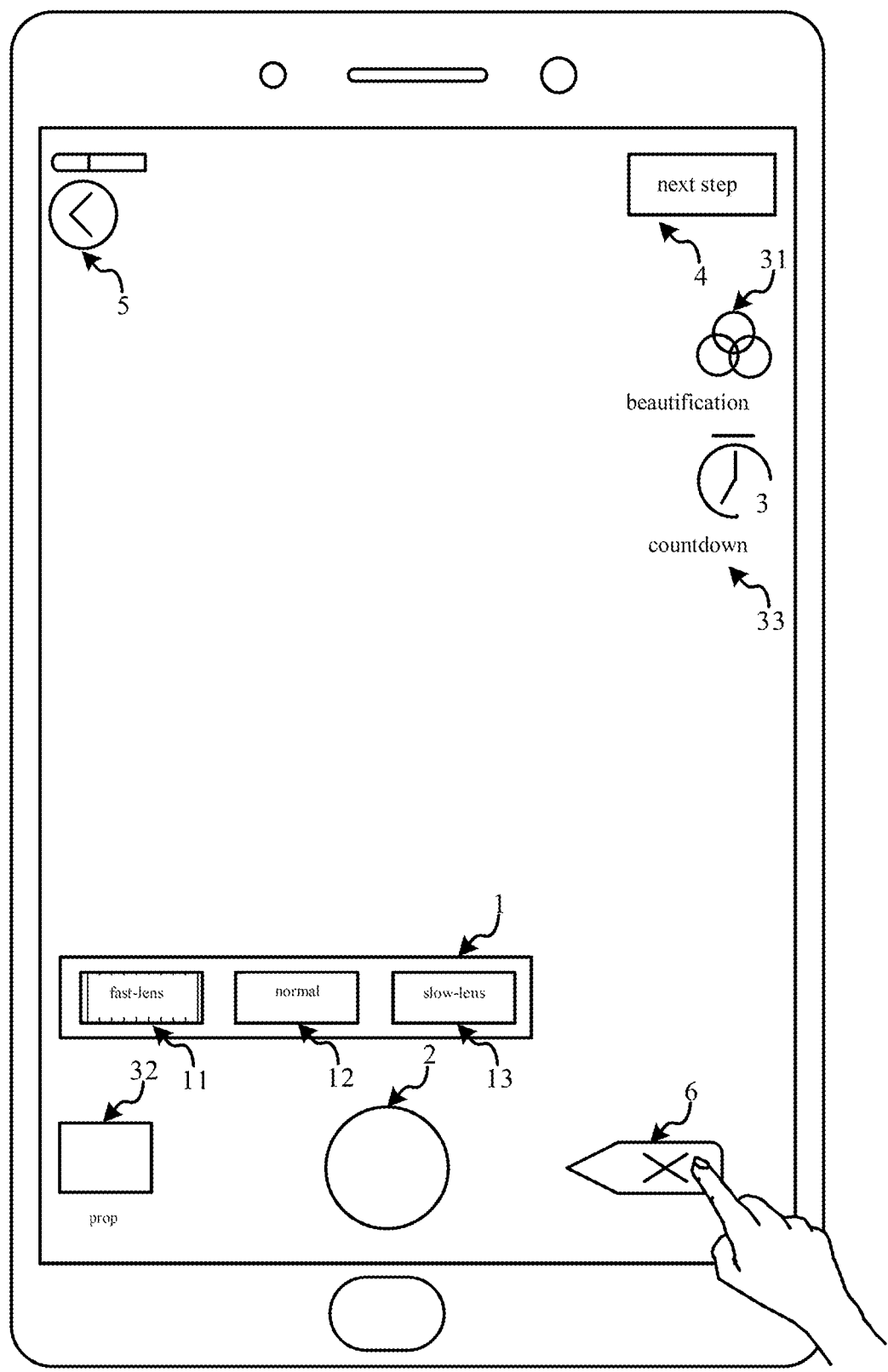
FIG. 16 is a schematic structural view of another deletion interface according to an embodiment of the present disclosure.
Figure 17:
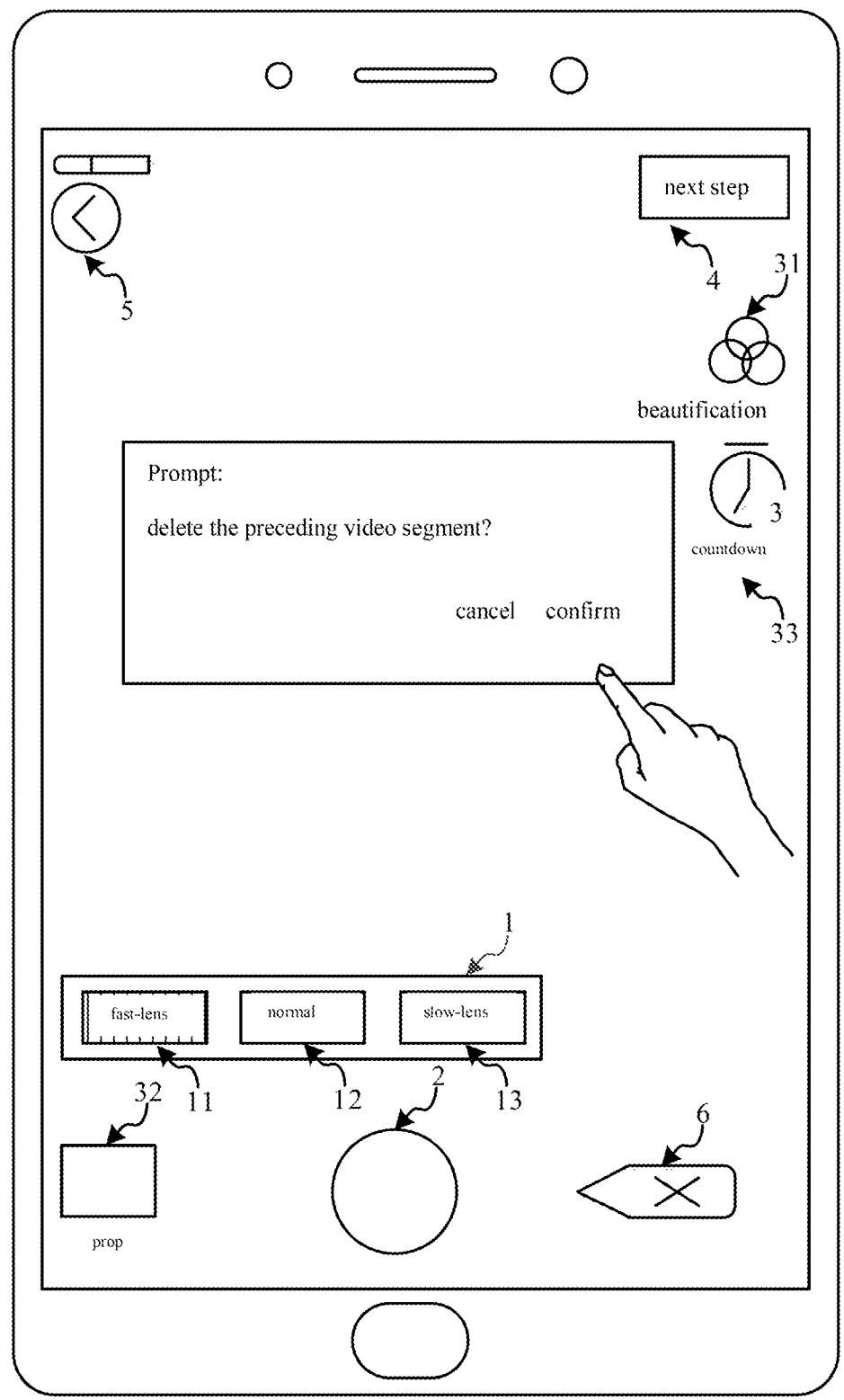
FIG. 17 is a schematic structural view of still another shooting interface according to an embodiment of the present disclosure.
Figure 18:
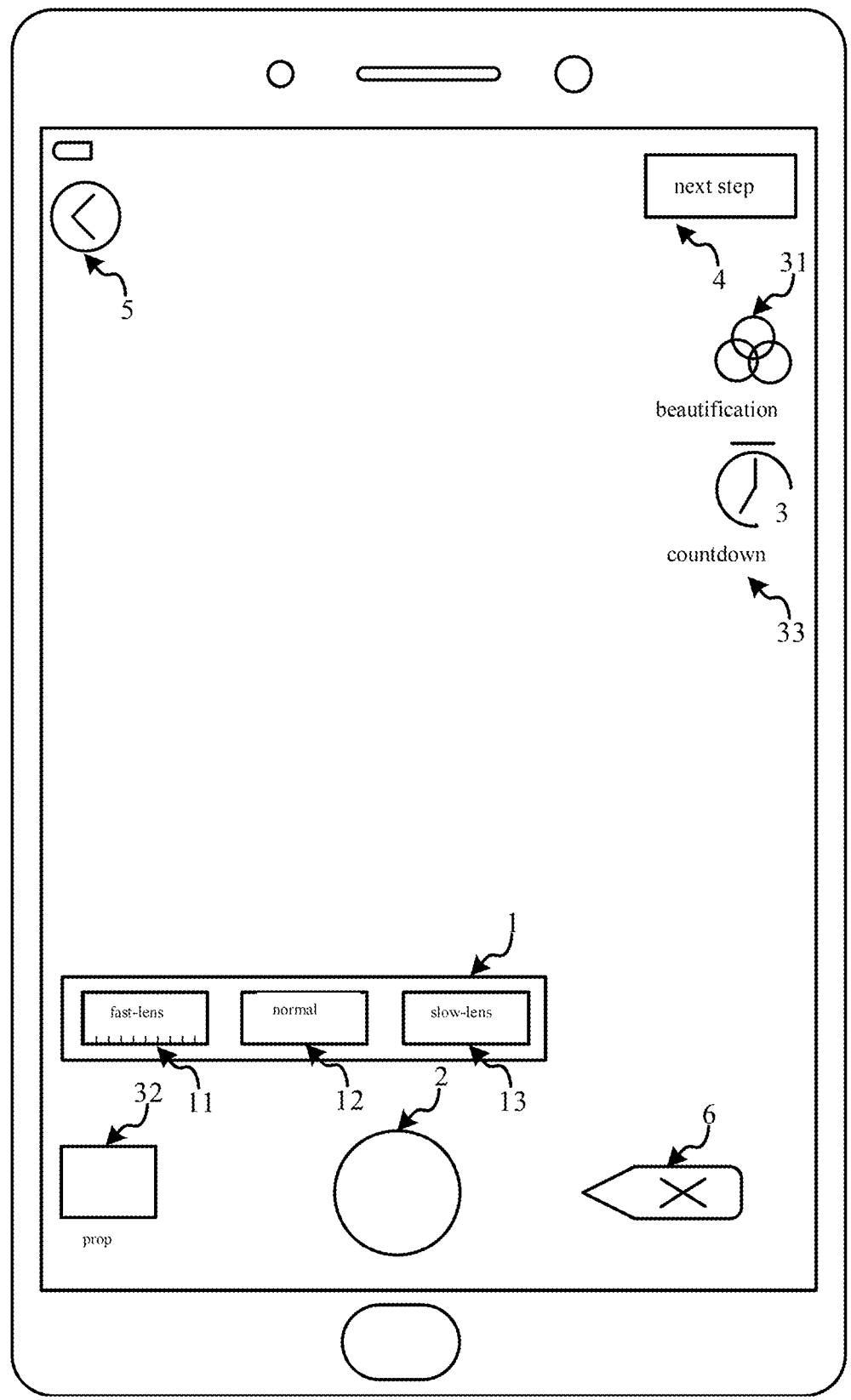
FIG. 18 is a schematic structural view of a target interface according to an embodiment of the present disclosure.

As shown in FIG. 13, the interface jumps to the shooting interface shown in FIG. 14 by the user triggering the video shooting control 2. At this point, the user may long-press the shooting control 2 to shoot a video on the target scene, and a progress bar is displayed in the upper left corner of the shooting interface. When the user releases the shooting control 2, the shooting of the current video segment is completed, the corresponding current video segment is obtained, and the interface jumps to the target interface shown in FIG. 15. The target interface also includes an undo control 6, which can be set to delete the last stored video segment when it is triggered. As shown in FIG. 16, the interface jumps to the undo interface as shown in FIG. 17 through the user's triggering operation on the undo control 6 on the target interface, and a dialog box is displayed on the undo interface. As show, the interface jumps to the target interface shown in FIG. 18 through a triggering operation on a confirmation control on the undo interface. The difference of this interface from the target interface before undoing is the progress bar located in the upper left corner of the figure. After the corresponding video segment is deleted, the length of the corresponding position of the progress bar will also be deleted. In addition, in order to obtain the next video segment, the user may repeatedly perform the above-mentioned selection operation on the video shooting mode control 1 and the first special effect control 3, the triggering operation on the video shooting control 2, and subsequent shooting operations. In an embodiment, when the progress bar is not completely displayed, the user ends the shooting of each video segment through a release operation on the video shooting control 2.

Figure 19:
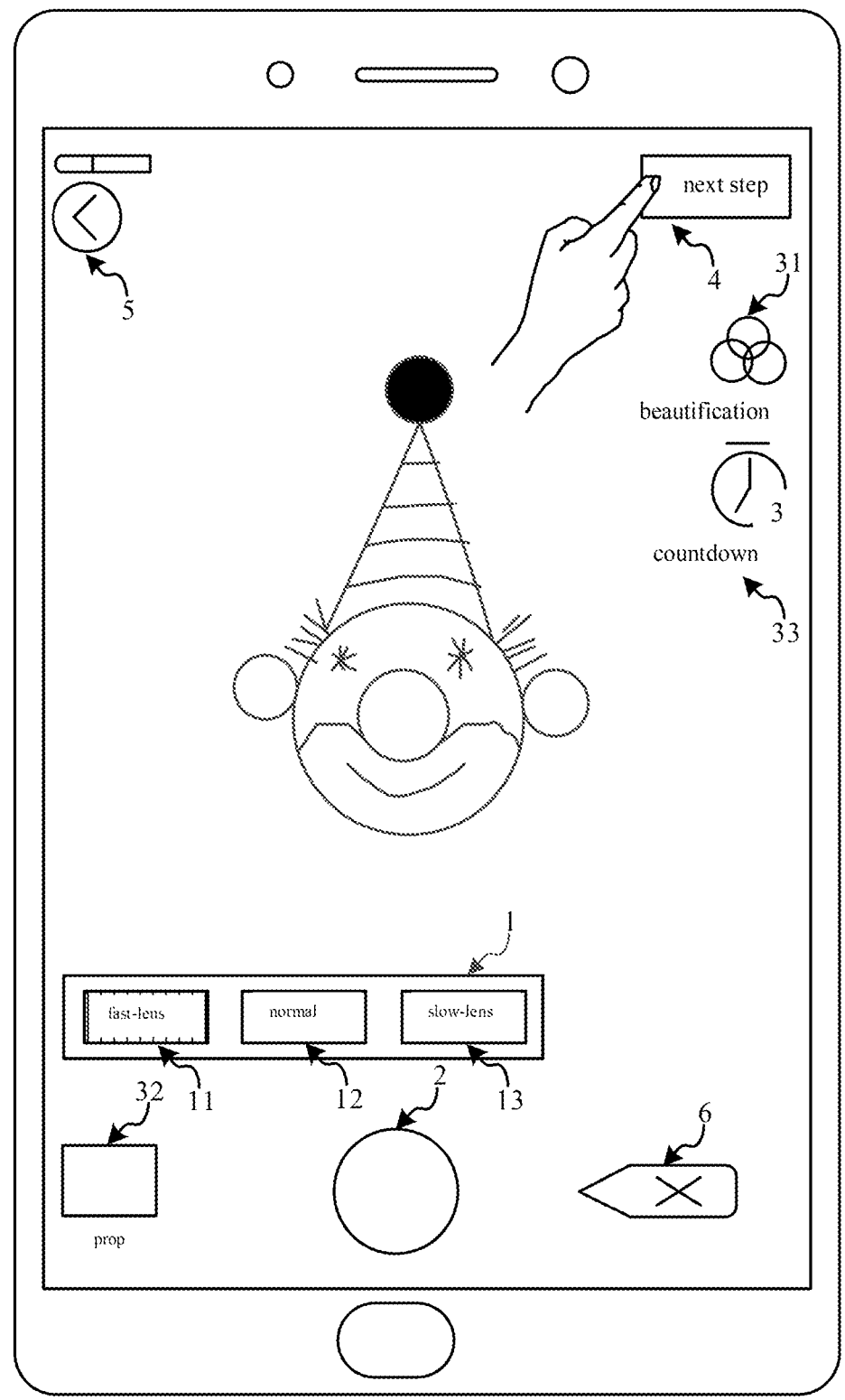
FIG. 19 is a schematic structural view of another target interface according to an embodiment of the present disclosure.
Figure 20:
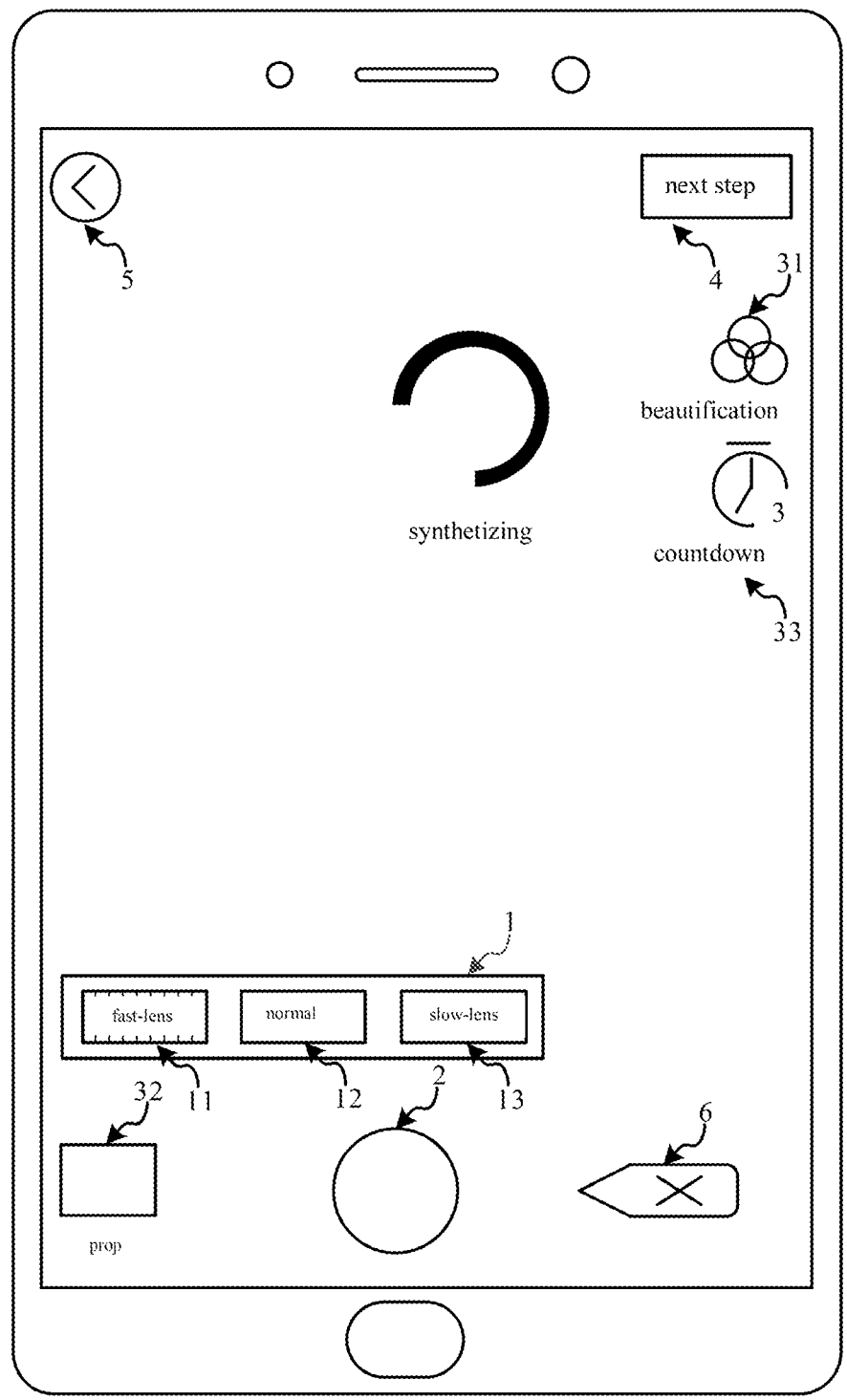
FIG. 20 is a schematic structural view of a video storage interface according to an embodiment of the present disclosure.
Figure 21:
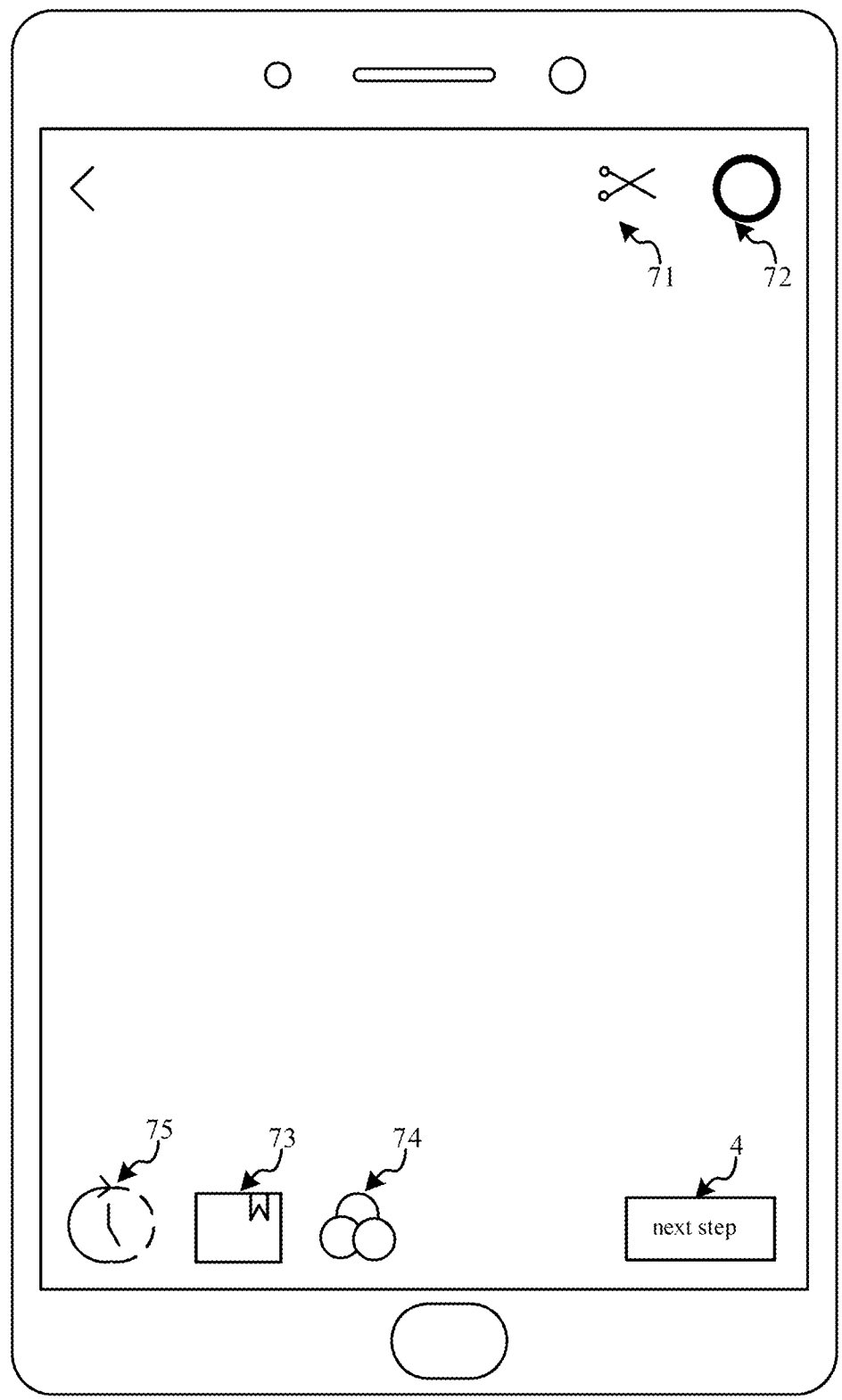
FIG. 21 is a schematic structural view of another video editing interface according to an embodiment of the present disclosure.

As shown in FIG. 19, the interface jumps to the video storage interface shown in FIG. 20 by the user triggering the next step control 4 on the target interface to synthetize the obtained video segments to obtain the target video. After the target video is obtained through synthetizing, the interface jumps to the video editing interface as shown in FIG. 21.

Figure 22:
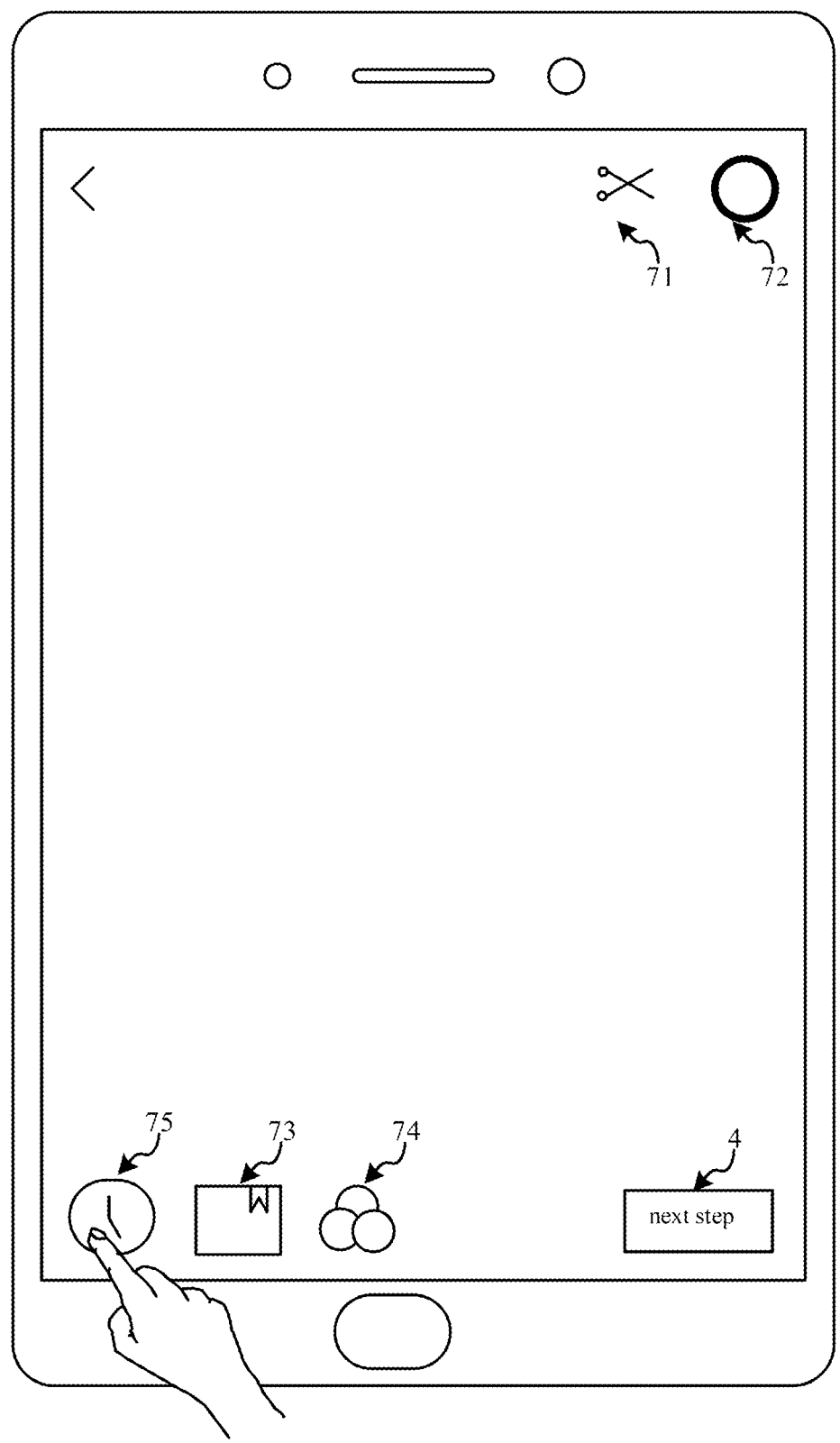
FIG. 22 is a schematic structural view of still another video editing interface according to an embodiment of the present disclosure.
Figure 23:
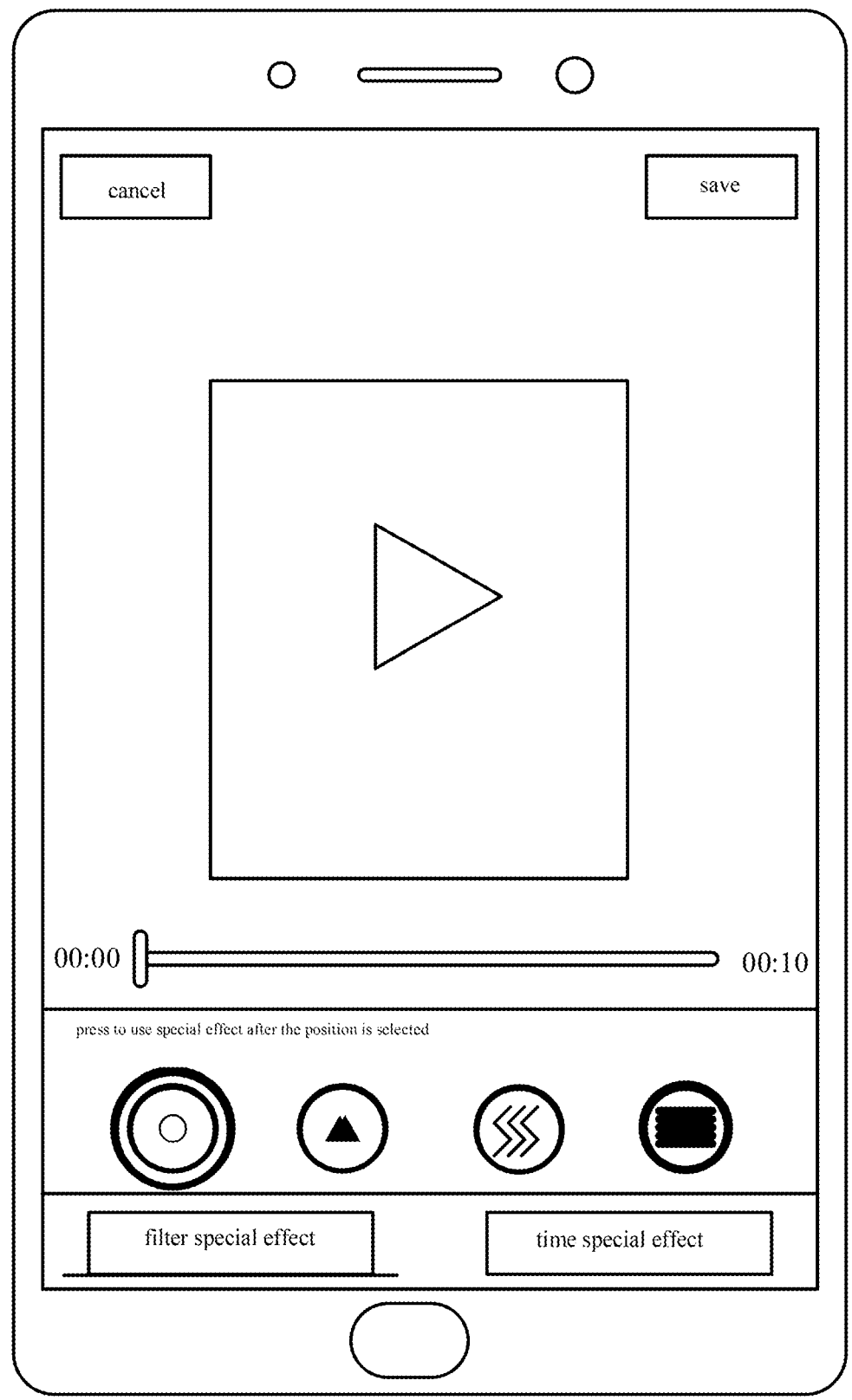
FIG. 23 is a schematic structural view of further another video editing interface according to an embodiment of the present disclosure.
Figure 24:
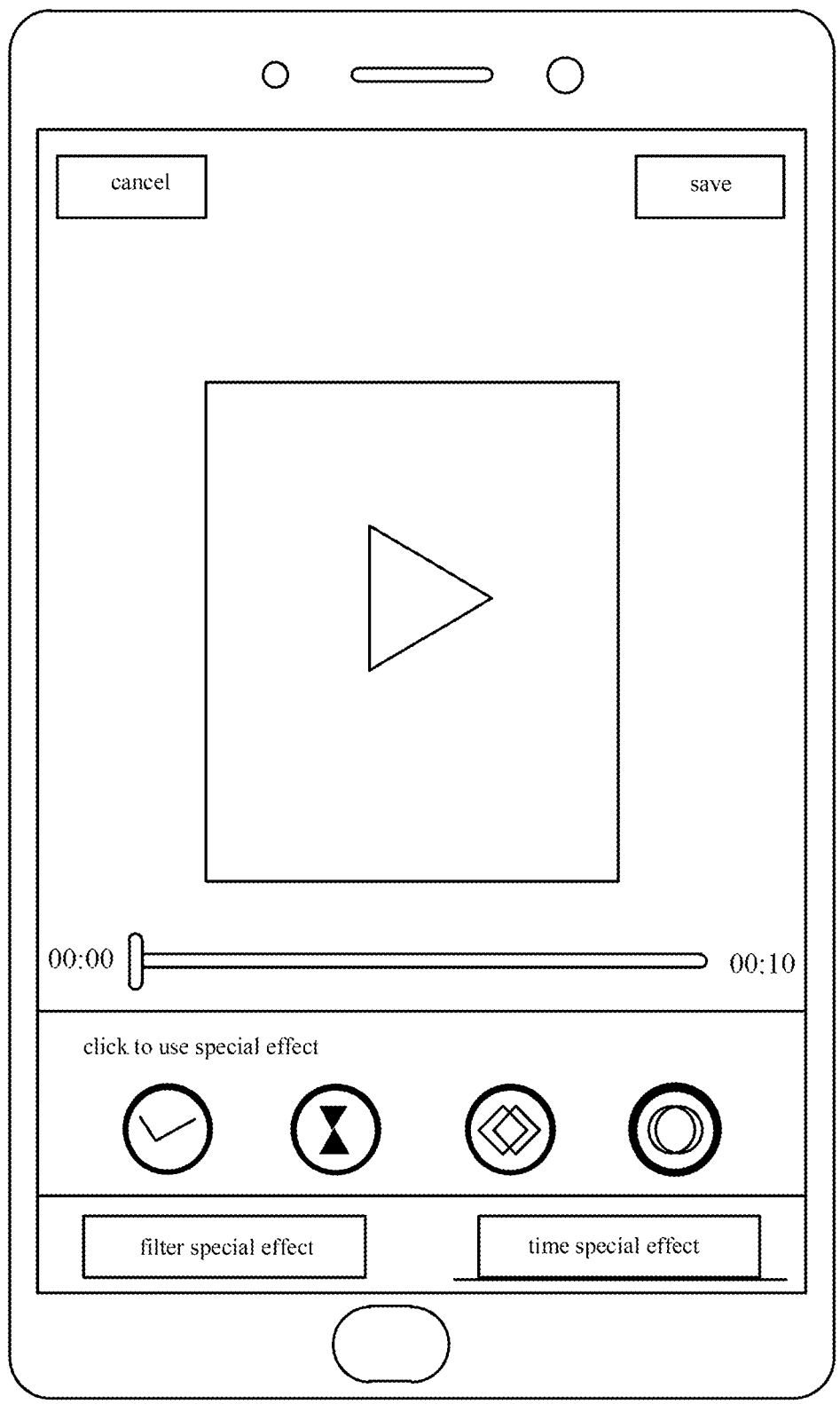
FIG. 24 is a schematic structural view of yet another video editing interface according to an embodiment of the present disclosure.
Figure 25:
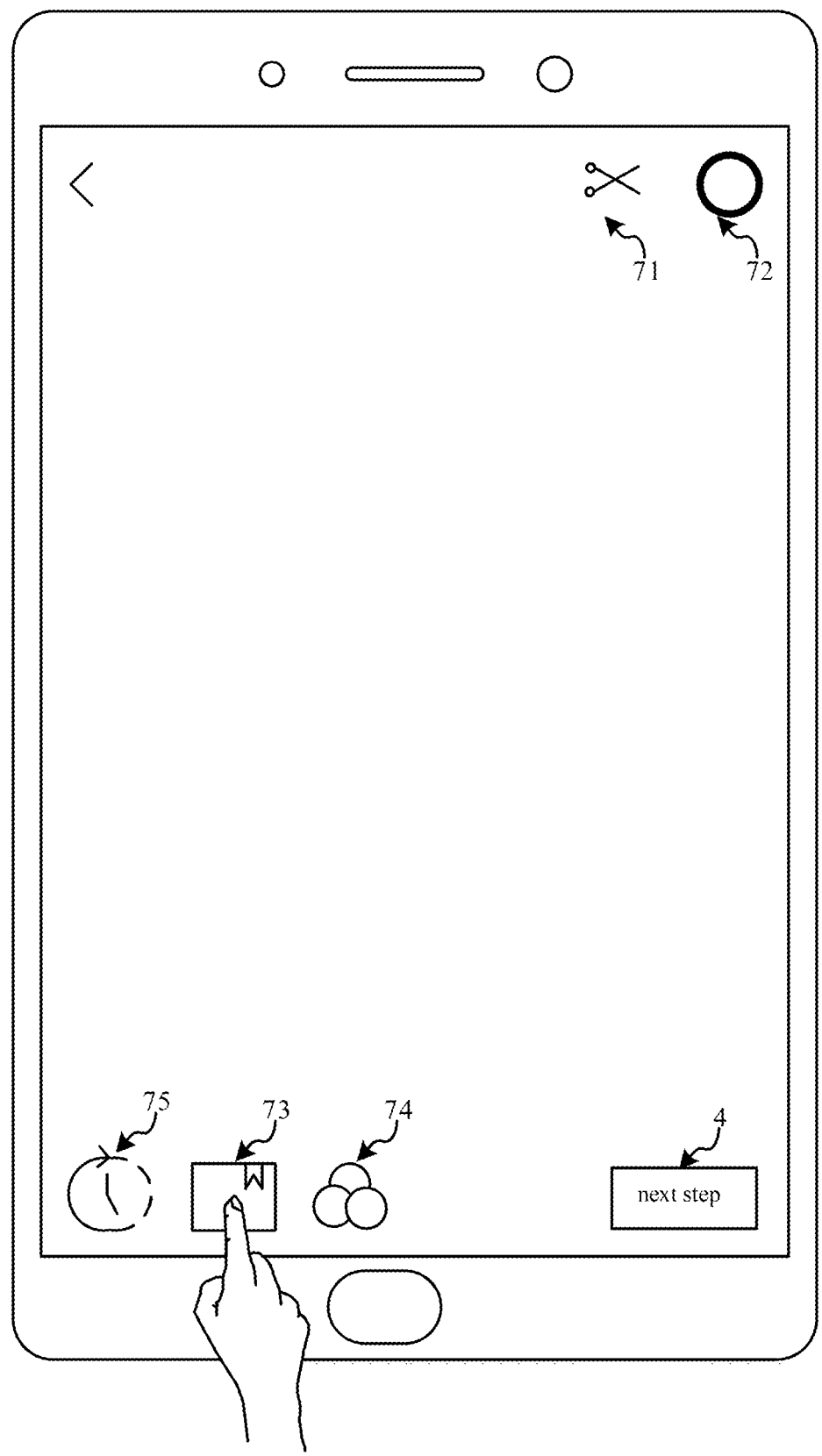
FIG. 25 is a schematic structural view of yet another video editing interface according to an embodiment of the present disclosure.
Figure 26:
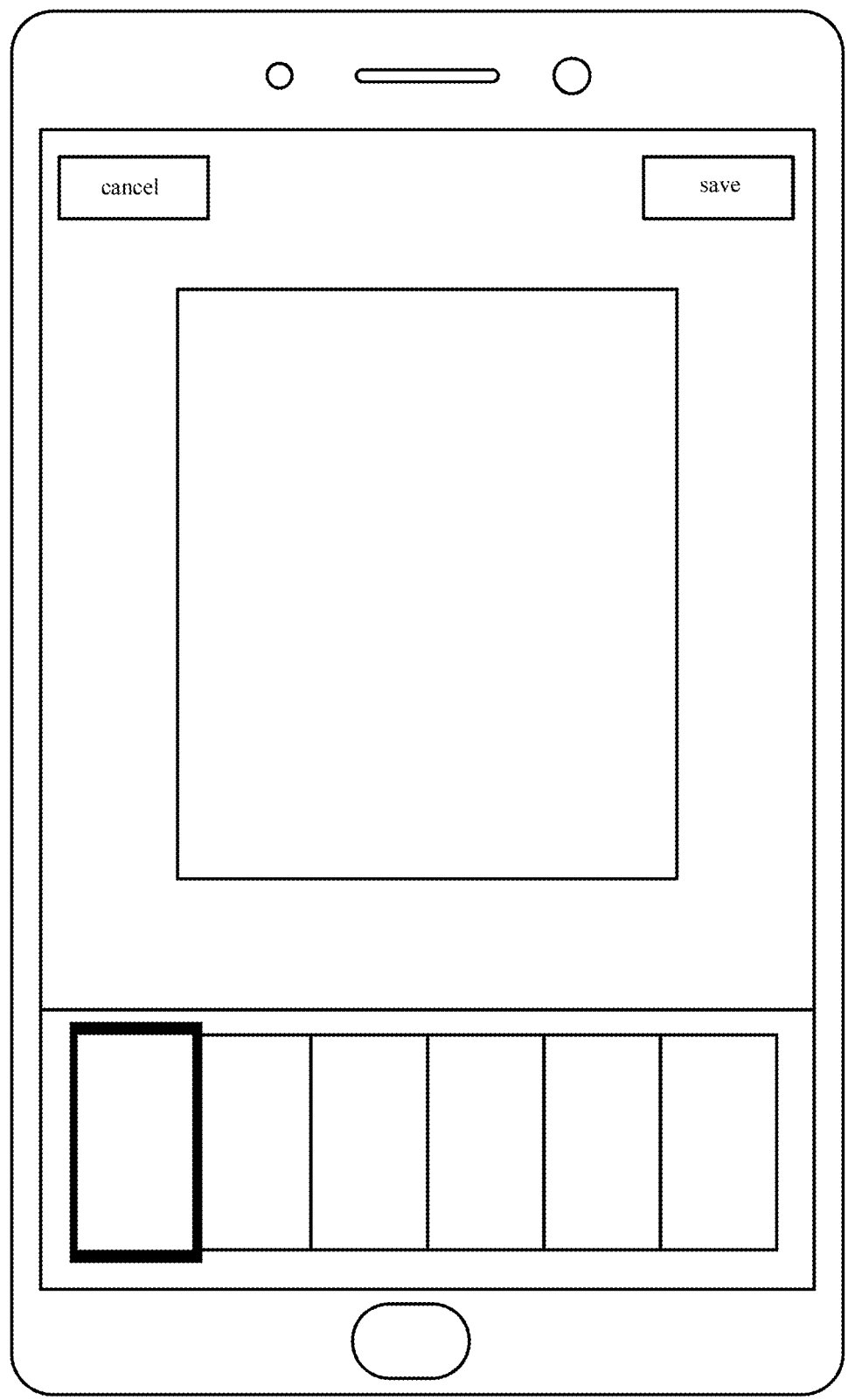
FIG. 26 is a schematic structural view of yet another video editing interface according to an embodiment of the present disclosure.
Figure 27:
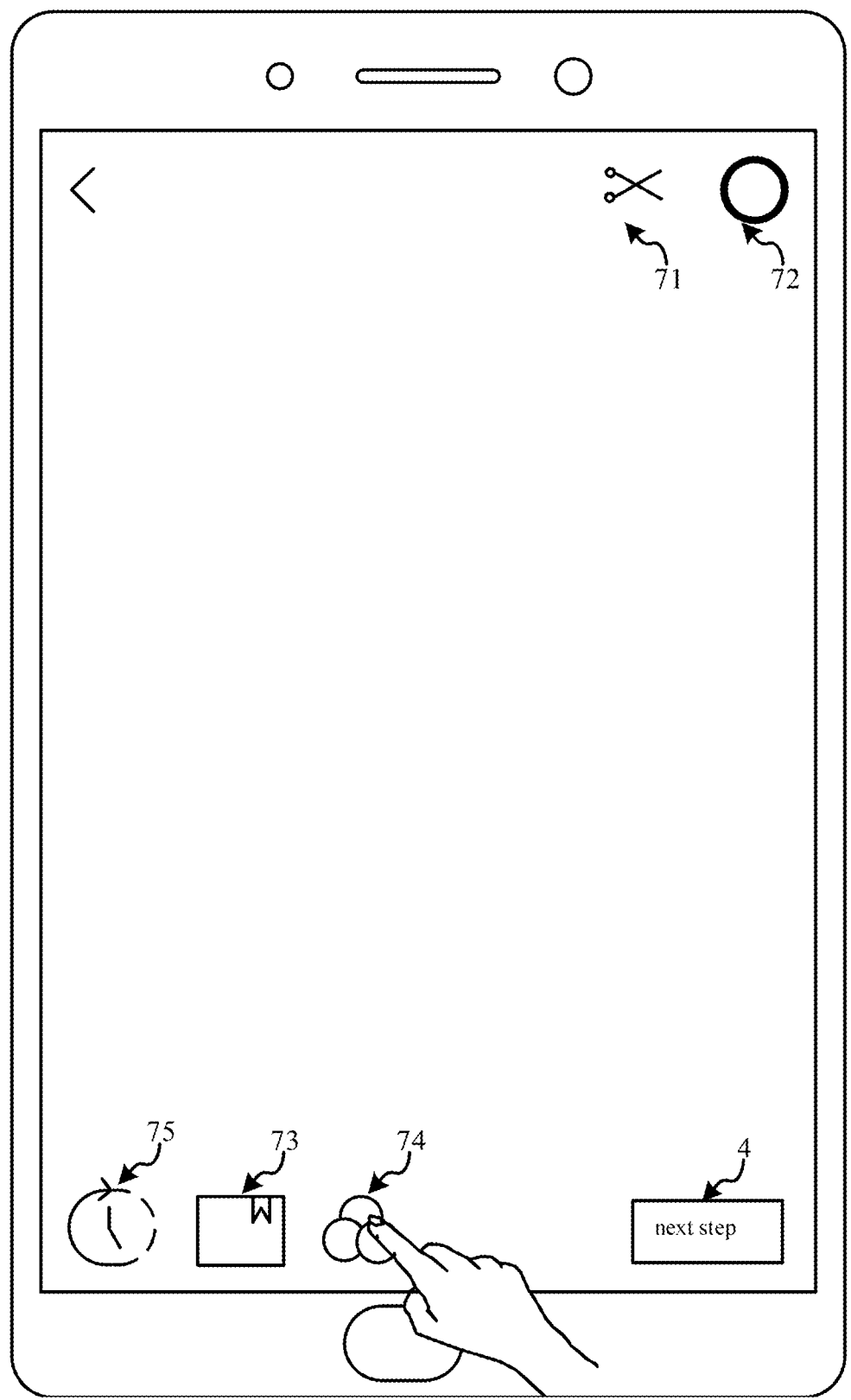
FIG. 27 is a schematic structural view of yet another video editing interface according to an embodiment of the present disclosure.
Figure 28:
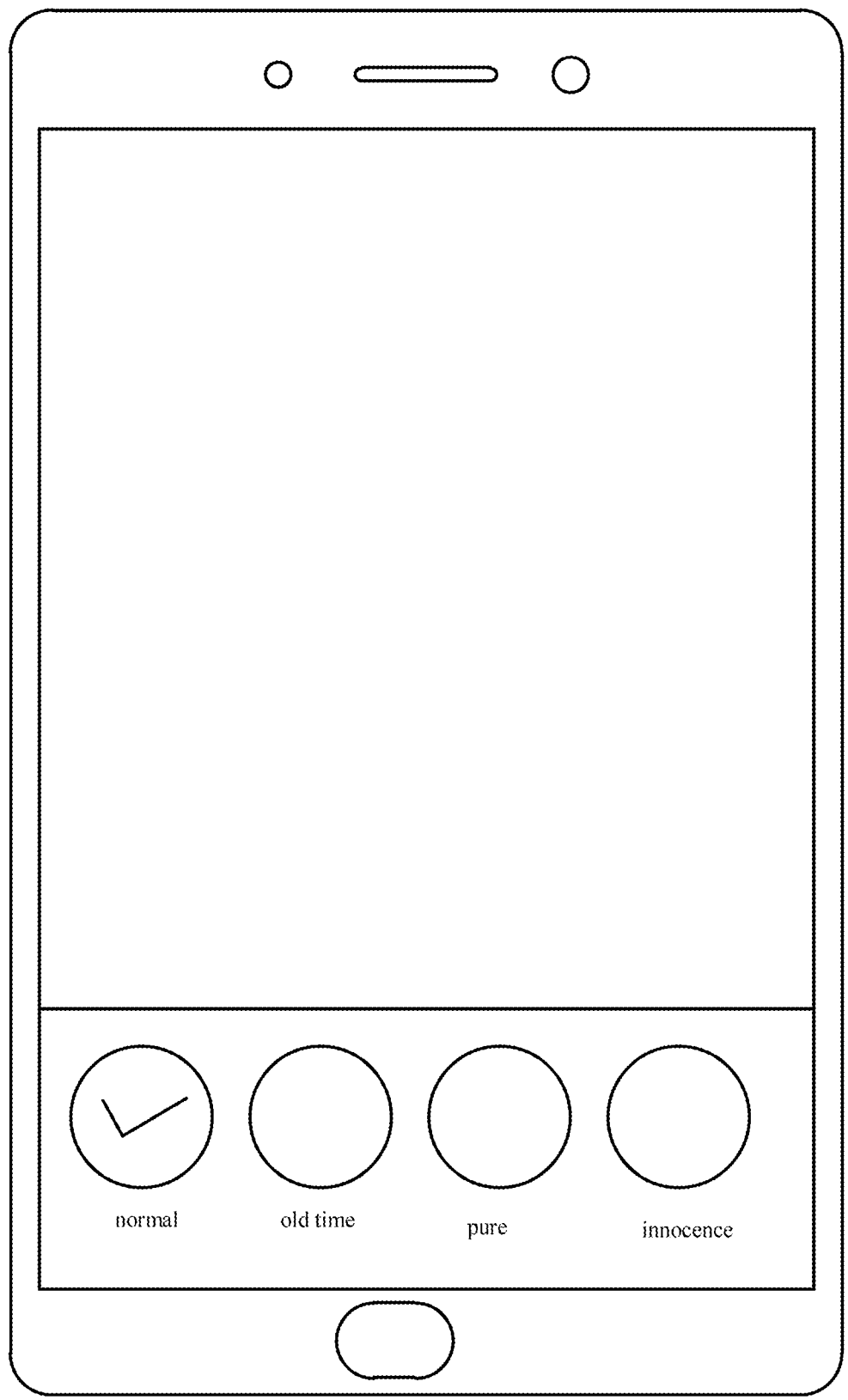
FIG. 28 is a schematic structural view of yet another video editing interface according to an embodiment of the present disclosure.

The video editing interface may include an editing control 7 (not shown in the figure). The editing control 7 may include: a music cutting control 71, a music selection control 72, a cover selection control 73 and a filter control 74. In an embodiment, the filter control 74 described herein is the same as the filter in the beautification control described above. The editing control 7 may further include a second special effect control 75. As shown in FIG. 22, by triggering the second special effect control 75 on the video editing interface, the interface jumps to the second special effect control selection interface shown in FIG. 23. The second special effect control selection interface includes a filter special effect control and a time special effect control. Through the selection operation on the filter special effect control, a first filter special effects is selected. Through the triggering operation on the time special effect control, the interface jumps to the time effect selection interface shown in FIG. 24, and a first time effect is selected; as shown in FIG. 25, the interface jumps to the cover selection interface shown in FIG. 26 through the triggering operation on the cover selection control 73 on the video editing interface, and a first cover is selected; as shown in FIG. 27, the interface jumps to the filter selection interface shown in FIG. 28 through the triggering operation on the filter control 74 on the video editing interface, and "normal" is selected. In addition, the music cutting control 71 and the music selection control 72 are not triggered, that is, the above-mentioned editing processing is not selected. Hitherto, the operation of synthetizing the video segments and the operation of editing the target video obtained by the synthetizing are completed.

Figure 29:
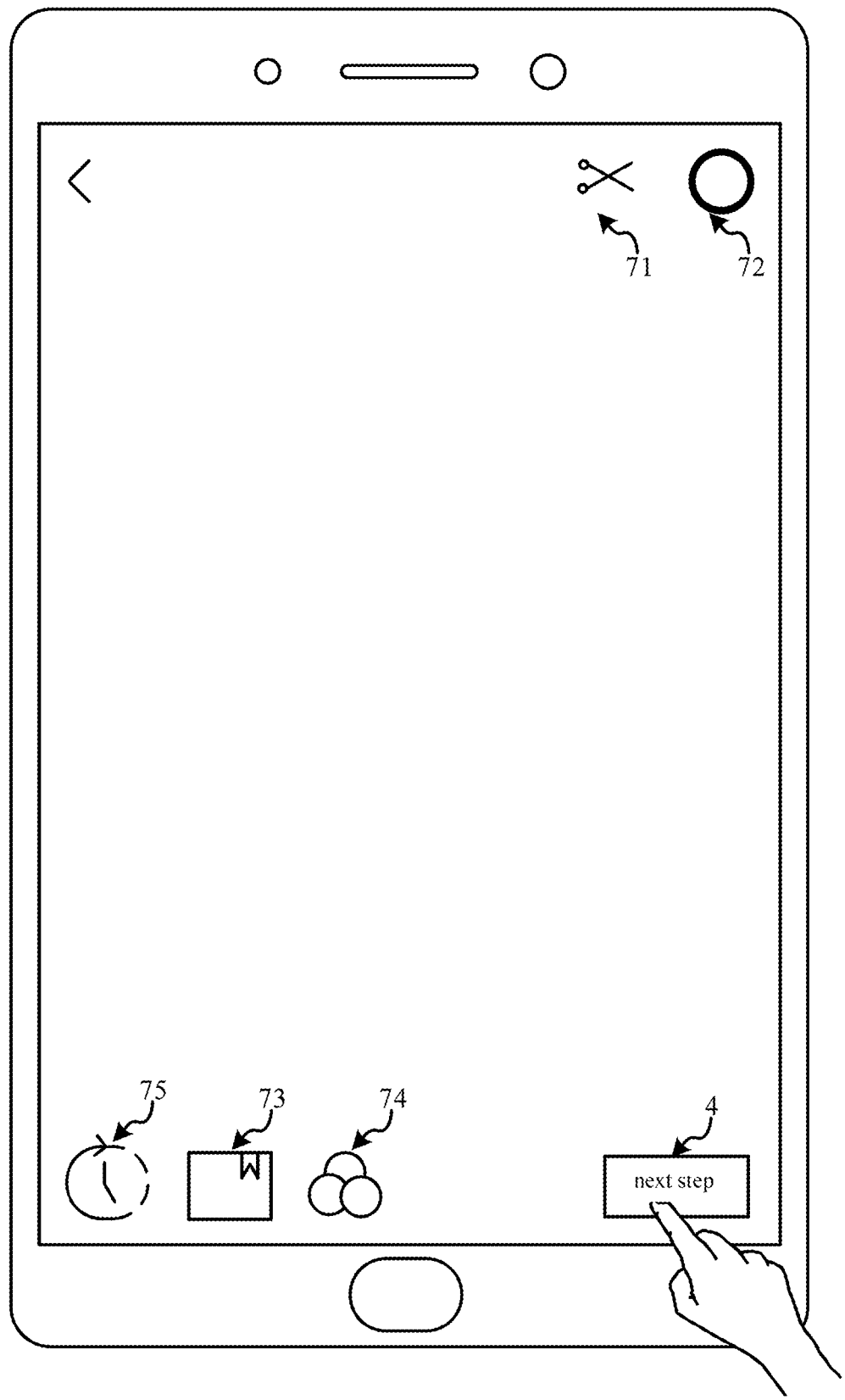
FIG. 29 is a schematic structural view of still another target interface according to an embodiment of the present disclosure.
Figure 30:
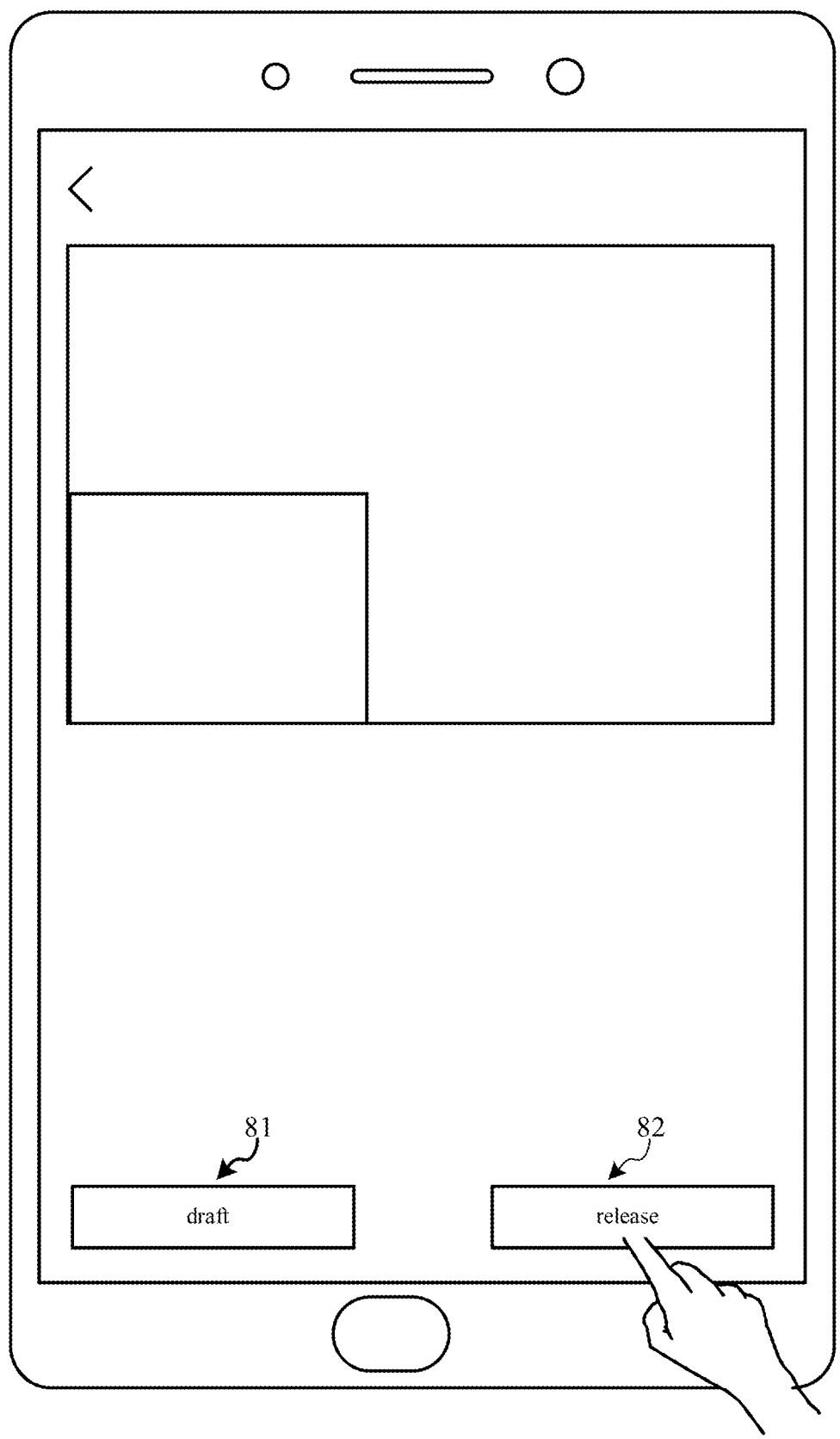
FIG. 30 is a schematic structural view of a video storage mode interface according to an embodiment of the present disclosure.
Figure 31:
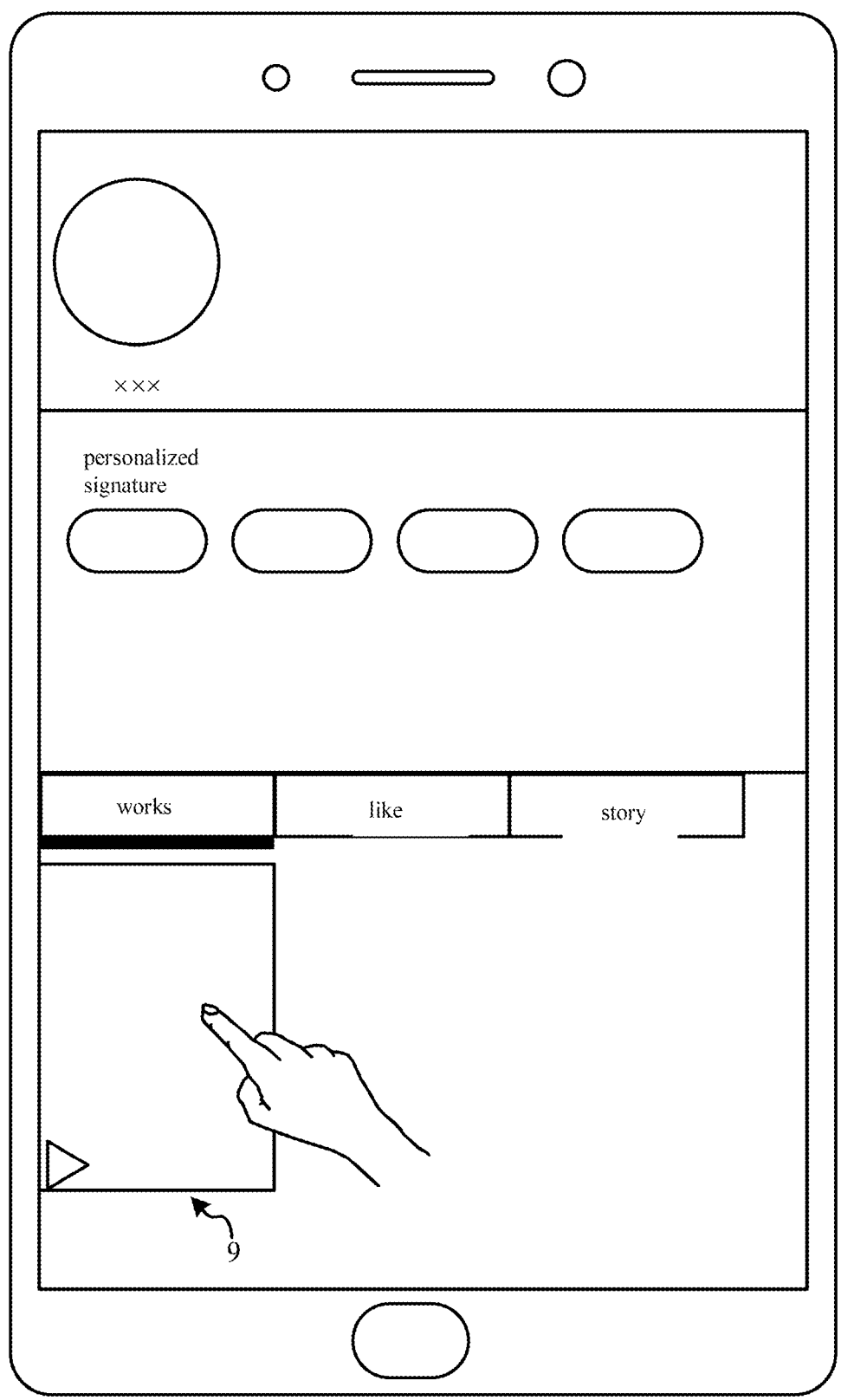
FIG. 31 is a schematic structural view of a user homepage interface according to an embodiment of the present disclosure.
Figure 32:
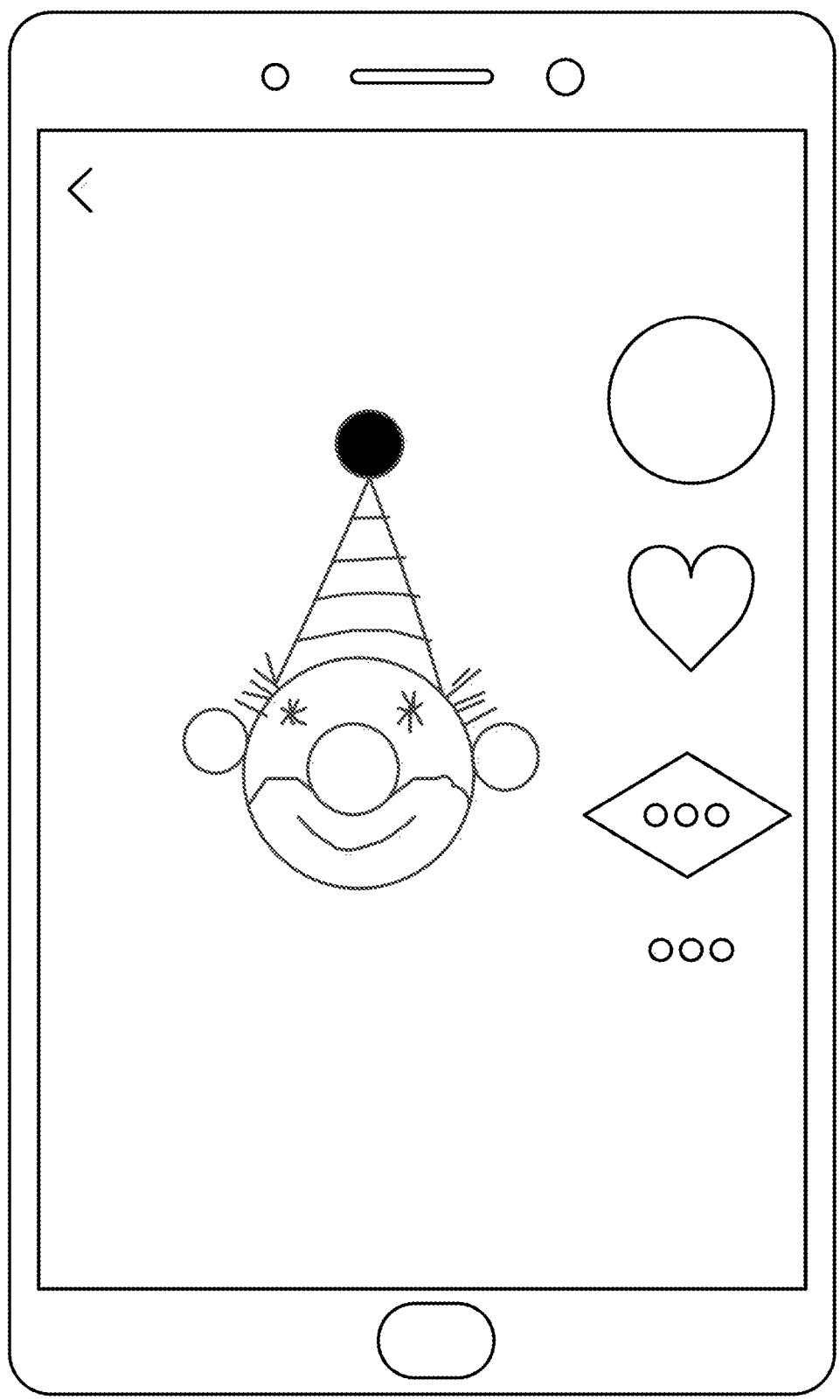
FIG. 32 is a schematic structural view of a video playing interface according to an embodiment of the present disclosure.

As shown in FIG. 29, the interface jumps to the video storage mode interface shown in FIG. 30 by triggering the next step control 4 on the video editing interface. The video storage mode interface may include a storage mode control 8 (not shown in the figure). The storage mode control 8 may include a draft box control 81 and a release control 82. The interface jumps to the user homepage interface shown in FIG. 31 by the user triggering the release control 82. The user homepage interface may include a works control 9. The interface jumps to the video playing interface shown in FIG. 32 through the triggering operation on the works control 9, and the target video is played. The video playing interface may include a sharing control, a like control, and a comment control. In an embodiment, both the first special effect control and the second special effect control in this embodiment can play a role of adding special effects. However, the first special effect control includes a beautification control, a prop control, and a countdown control, and the second special effect control includes a filter special effect control or a time special effect control, so the contents of the two controls are not the same.

Figure 33:
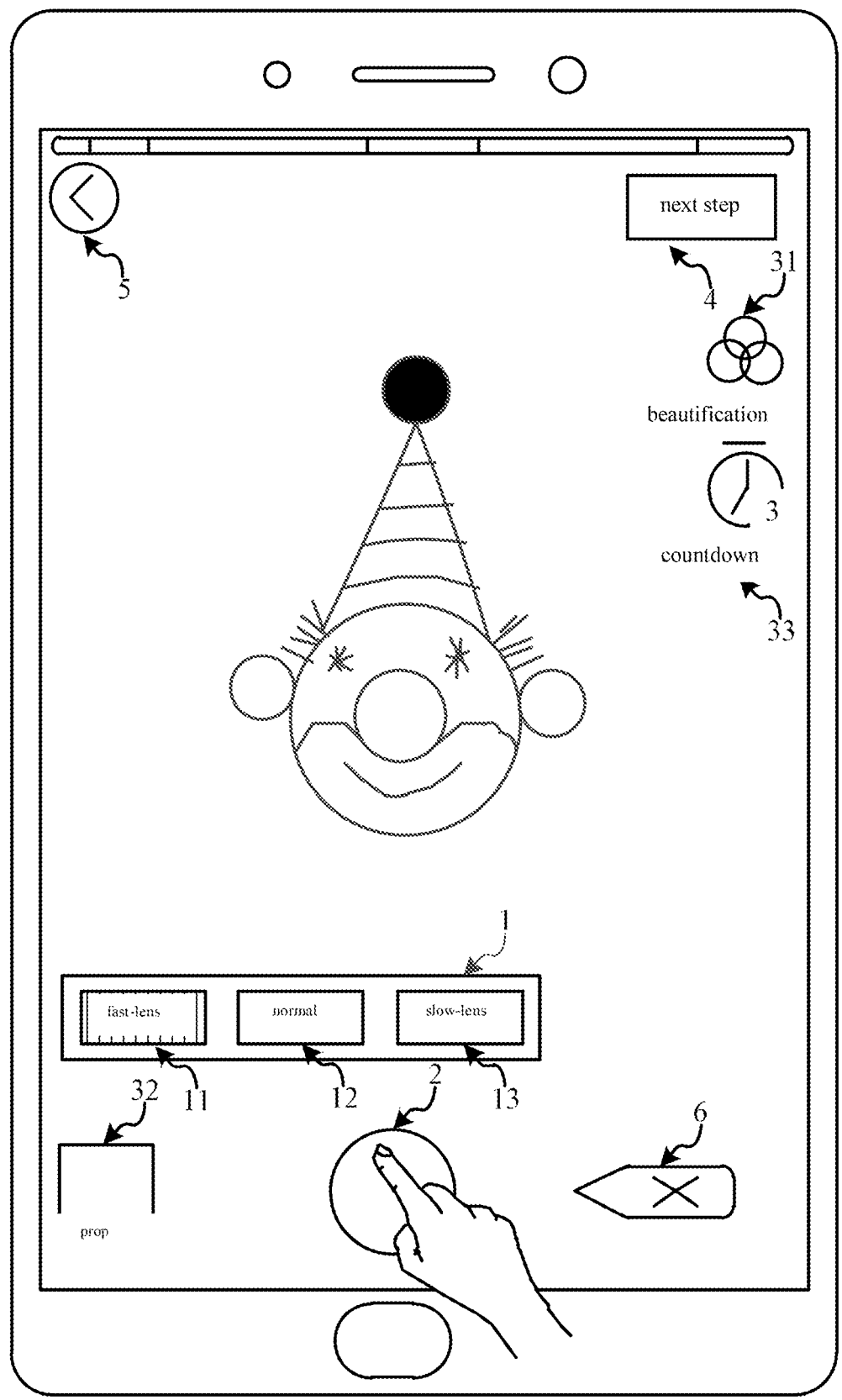
FIG. 33 is a schematic structural view of still another target interface according to an embodiment of the present disclosure.
Figure 34:
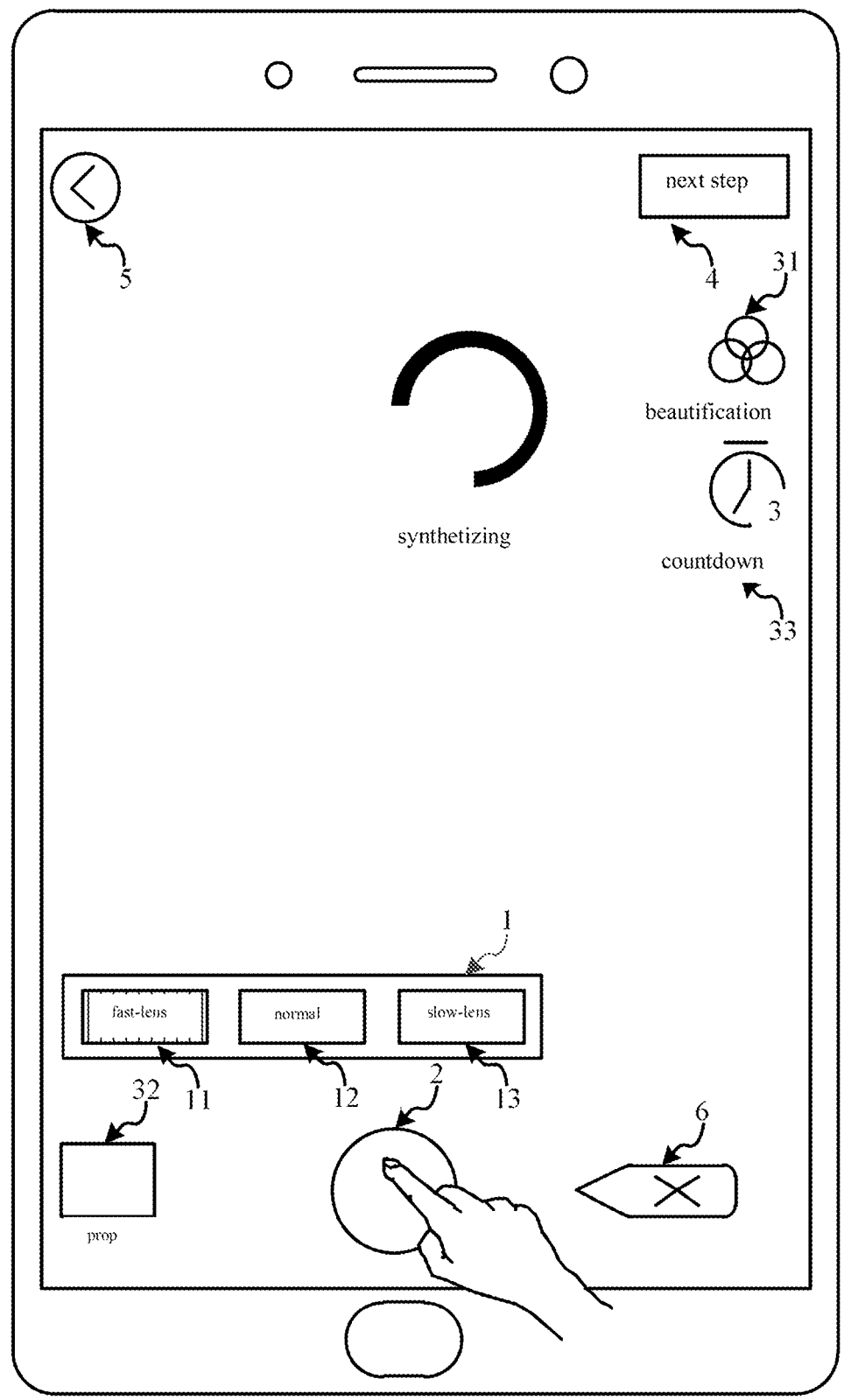
FIG. 34 is a schematic structural view of a video storage interface according to an embodiment of the present disclosure.

In addition, in an embodiment, after the user's last selection operation on the video shooting mode control on the target interface and the triggering operation on the video shooting control are detected, when it is detected that the progress bar is displayed completely, the interface jumps to the video storage interface without detecting the user's triggering operation on the next step control on the target interface. Exemplarily, as shown in FIG. 33, when it is detected that the progress bar is displayed completely, the interface jumps to the video storage interface shown in FIG. 34 to synthetize the obtained video segments to obtain the target video. At this point, the user can still maintain the triggering operation on the video shooting control 2. When the target video is obtained by the synthetizing, the interface jumps to the video editing interface as shown in FIG. 21.

In the technical solution of this embodiment, a video shooting mode instruction is acquired, wherein the video shooting mode instruction includes a shooting speed, and different video shooting modes have different shooting speeds; after a video shooting instruction is obtained, a video is shot on a target scene according to the shooting speed until a video shooting pause instruction is acquired, thereby obtaining a video segment between the video shooting instruction and the video shooting pause instruction; it is determined whether a video generation instruction is obtained; if the video generation instruction is not obtained, acquiring the video shooting mode instruction, the video shooting instruction and the video shooting pause instruction is repeated to obtain corresponding video segments until the video generation instruction is obtained; and a target video is generated according to existing video segments. During the video shooting process, the processing of the fast-speed and/or slow-speed video segments is completed, and the solution is quick and convenient, which improves the flexibility in shooting and processing videos by the user and improves the user experience. In an embodiment, the video shooting pause instruction may be triggered by the user, or may be triggered by determining whether a shooting time length reaches a predetermined shooting time threshold.

Fifth Embodiment

Figure 35:
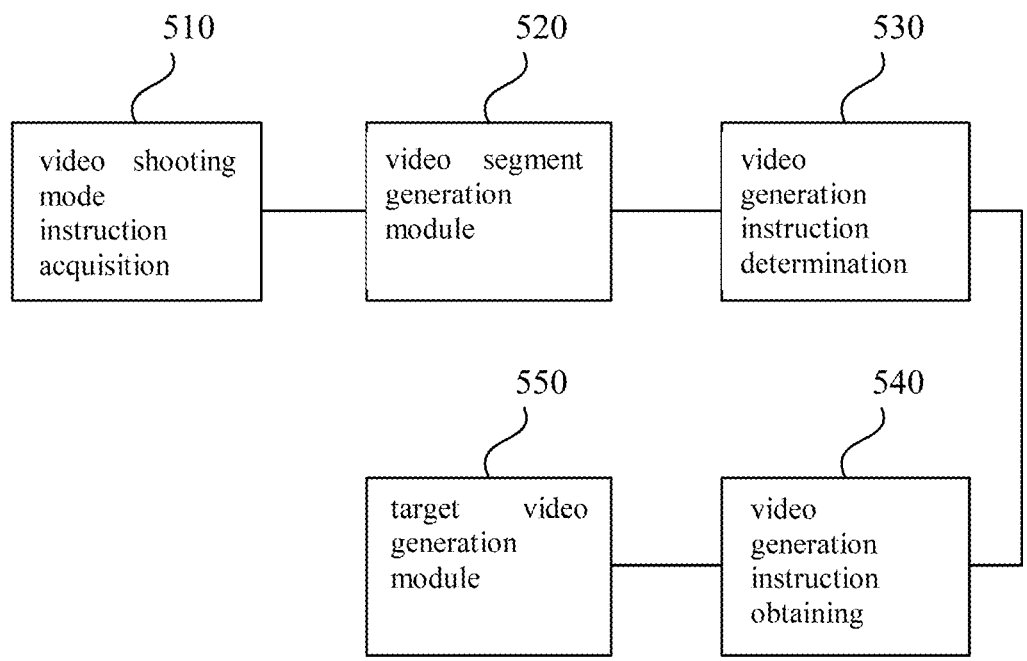
FIG. 35 is a schematic structural view of an apparatus for video shooting according to an embodiment of the present disclosure.

FIG. 35 is a schematic structural view of an apparatus for video shooting according to an embodiment of the present disclosure. The present embodiment is applicable to a situation of reducing the difficulty of video processing. The apparatus may be implemented by software and/or hardware. The apparatus may be configured in a terminal device, which is typically for example a mobile phone and/or a tablet computer, and the like. As shown in FIG. 35, the apparatus includes a video shooting mode instruction acquisition module 510, a video segment generation module 520, a video generation instruction determination module 530, a video generation instruction obtaining module 540 and a target video generation module 550.

The video shooting mode instruction acquisition module 510 is configured to acquire a video shooting mode instruction, wherein the video shooting mode instruction includes a shooting speed, and different video shooting modes have different shooting speeds.

The video segment generation module 520 is configured to, after the video shooting instruction is obtained, shoot a video on a target scene according to the shooting speed until a video shooting pause instruction is obtained, thereby obtaining a video segment between the video shooting instruction and the video shooting pause instruction.

The video generation instruction determination module 530 is configured to determine whether a video generation instruction is obtained;

The video generation instruction obtaining module 540 is configured to, if the video generation instruction is not obtained, repeat acquiring the video shooting mode instruction, the video shooting instruction and the video shooting pause instruction to obtain corresponding video segments until the video generation instruction is obtained.

The target video generation module 550 is configured to generate a target video according to existing video segments based on the video generation instruction.

In the technical solution of this embodiment, a video shooting mode instruction is acquired by the video shooting mode instruction acquisition module 510, wherein the video shooting mode instruction includes a shooting speed, and different video shooting modes have different shooting speeds; after a video shooting instruction is obtained by the video segment generation module 520, a video is shot on a target scene according to the shooting speed until a video shooting pause instruction is acquired, thereby obtaining a video segment between the video shooting instruction and the video shooting pause instruction; it is determined by the video generation instruction determination module 530 whether a video generation instruction is obtained; if the video generation instruction is not obtained, acquiring the video shooting mode instruction, the video shooting instruction and the video shooting pause instruction is repeated by the video generation instruction obtaining module 540 to obtain corresponding video segments until the video generation instruction is obtained; and a target video is generated by the target video generation module 550 according to existing video segments. During the video shooting process, the processing of the fast-speed and/or slow-speed video segments is completed, and the solution is quick and convenient, which improves the flexibility in shooting and processing videos by the user and improves the user experience.

In an embodiment, the video shooting pause instruction may be triggered by a user, or may be triggered by determining whether a shooting time length reaches a predetermined shooting time threshold.

In an embodiment, if the video shooting pause instruction is triggered by determining whether the shooting time length reaches the predetermined shooting time threshold, the shooting time length includes the shooting time length of one piece of shot video or a total shooting time length of several pieces of shot videos.

That is, it is determined whether the shooting time length reaches the predetermined shooting time threshold; if yes, the video shooting pause instruction is triggered, and the shooting time length includes the shooting time length of one piece of shot video or a total shooting time length of several pieces of shot videos.

In an embodiment, the apparatus may further include:
a special effect instruction determination module, configured to determine whether a special effect instruction is obtained.

The video segment generation module 520 may include:
a video segment generation unit configured to: if the special effect instruction is obtained, when the video shooting instruction is obtained, shoot a video on the target scene according to the special effect instruction and the shooting speed until the video shooting pause instruction is obtained, thereby obtaining the video segment between the video shooting instruction and the video shooting pause instruction In an embodiment, the apparatus may further include:
an editing instruction determination module, configured to determine whether an editing instruction is obtained; and
a target video processing module configured to, if the editing instruction is obtained, process the target video according to the editing instruction to obtain a processed target video.

In an embodiment, the apparatus may further include:
a storage mode instruction determination module, configured to determine whether a storage mode instruction is obtained; and a target video storage module configured to, if the storage mode instruction is obtained, store the processed target video according to the storage mode instruction;
wherein the storage mode instruction includes a draft box instruction or a release instruction.

In an embodiment, the apparatus may further include:
a video playing instruction determination module, configured to determine whether a video playing instruction is obtained; and
a target video playing module configured to, if the video playing instruction is obtained, play the processed target video according to the video playing instruction.

The apparatus for shooting a video provided by the embodiment of the present disclosure may perform the method for shooting a video provided by any embodiment of the present disclosure, and has corresponding functional modules for performing the method and an advantageous effect.

Sixth Embodiment

Figure 36:
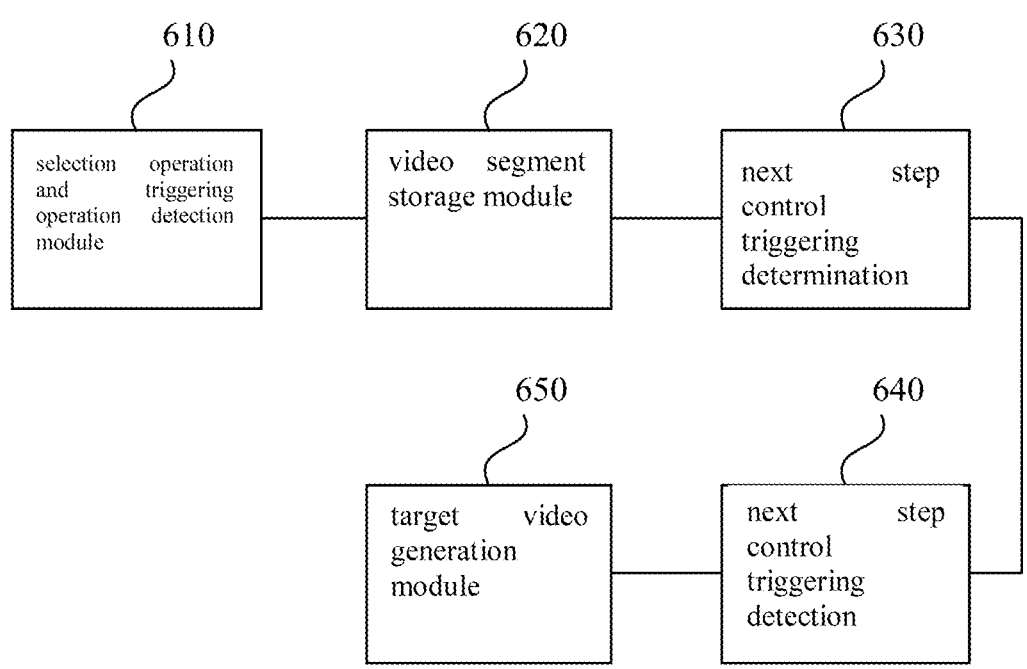
FIG. 36 is a schematic structural view of another apparatus for video shooting according to an embodiment of the present disclosure.

FIG. 36 is a schematic structural view of another apparatus for video shooting according to an embodiment of the present disclosure. The present embodiment is applicable to a situation of reducing the difficulty of video processing. The apparatus may be implemented by software and/or hardware. The apparatus may be configured in a terminal device, which is typically for example a mobile phone and/or a tablet computer, and the like. As shown in FIG. 36, the apparatus includes a selection operation and triggering operation detection module 610, a video segment storage module 620, a next step control triggering determination module 630, a next step control triggering detection module 640 and a target video generation module 650.

The selection operation and triggering operation detection module 610 is configured to detect a user's selection operation on a video shooting mode control on a target interface and a triggering operation on a video shooting control on the target interface.

The video segment storage module 620 is configured to display a shot target scene on the target interface until a release operation on the video shooting control is detected, thereby obtaining a video segment corresponding to the video shooting mode selected by the user, and to display the video shooting mode control and the video shooting control on the target interface;

The next step control triggering determination module 630 is configured to determine whether a user's triggering operation a next step control on the target interface is detected.

The next step control triggering detection module 640 is configured to, if the user's triggering operation on the next step control on the target interface is not detected, repeat detecting the selection operation on the video shooting mode control, the triggering operation on the video shooting control and the release operation on the video shooting control to obtain corresponding video segments until the user's triggering operation on the next step control on the target interface is detected.

The target video generation module 650 is configured to jump from the target interface to a video storage interface according to the triggering operation on the next step control, and display, on the video storage interface, a result of synthetizing existing video segments to obtain a target video.

In the technical solution of this embodiment, a user's selection operation on a video shooting mode control on a target interface and a triggering operation on a video shooting control on the target interface are detected by the selection operation and triggering operation detection module 610; a target scene is displayed on the target interface by the video segment storage module 620 until a user's release operation on the video shooting control is detected, thereby obtaining a corresponding video segment, and the video shooting mode control and the video shooting control are displayed on the target interface; it is determined by the next step control triggering determination module 630 whether a user's triggering operation on a next step control on the target interface is detected; if the user's triggering operation on the next step control on the target interface is not detected by the next step control triggering detection module 640, the detection of the user's selection operation on the video shooting mode control, the triggering operation on the video shooting control and the release operation on the video shooting control are repeated to obtain corresponding video segments until the user's triggering operation on the next step control on the target interface is detected; the target video generation module 650 jumps to a video storage interface and displays a result of synthetizing existing video segments to obtain the target video. During the video shooting process, the processing of the fast-speed and/or slow-speed video segments is completed, and the solution is quick and convenient, which improves the flexibility in shooting and processing videos by the user and improves the user experience In an embodiment, the video segment storage module 620 is configured to:

display a progress bar at the same time the shot target scene is displayed on the target interface.

If the progress bar is detected to be displayed completely, the interface jumps from the target interface to the video storage interface and displays a result of synthetizing existing video segments to obtain the target video on the video storage interface.

In an embodiment, the apparatus may further include:

a special effect control selection operation detection module, configured to detect a selection operation on the special effect control on the target interface.

The video segment storage module 620 is configured to:

display the target scene superimposed with the special effect control selected by the user on the target interface.

In an embodiment, the apparatus may further include:

a video editing interface jumping module, configured to jump to a video editing interface, wherein the video editing interface may include an editing control and a next step control; and a video storage mode interface jumping module configured to: if a user's selection operation on the editing control is detected and a triggering operation on the next step control on the video editing interface are detected, jump from the video editing interface to the video storage mode interface; wherein the video storage mode interface may include a storage mode control.

In an embodiment, the apparatus may further include:

a video presentation mode interface jumping module configured to: if the user's selection operation on the storage mode control is detected, jump from the video storage mode interface to a video presentation mode interface and display a storage result of the target video corresponding to the selection operation on the storage mode control on the video presentation mode interface; wherein the storage mode control includes a draft box control and a release control.

In an embodiment, the apparatus may further include:

a target video playing module configured to: if a triggering operation on a works control on a user homepage interface is detected, jump to a video playing interface and play the target video on the video playing interface.

The apparatus for shooting a video provided by the embodiment of the present disclosure may perform the method for shooting a video provided by any embodiment of the present disclosure, and has corresponding functional modules for performing the method and an advantageous effect.

Seventh Embodiment

Figure 37:
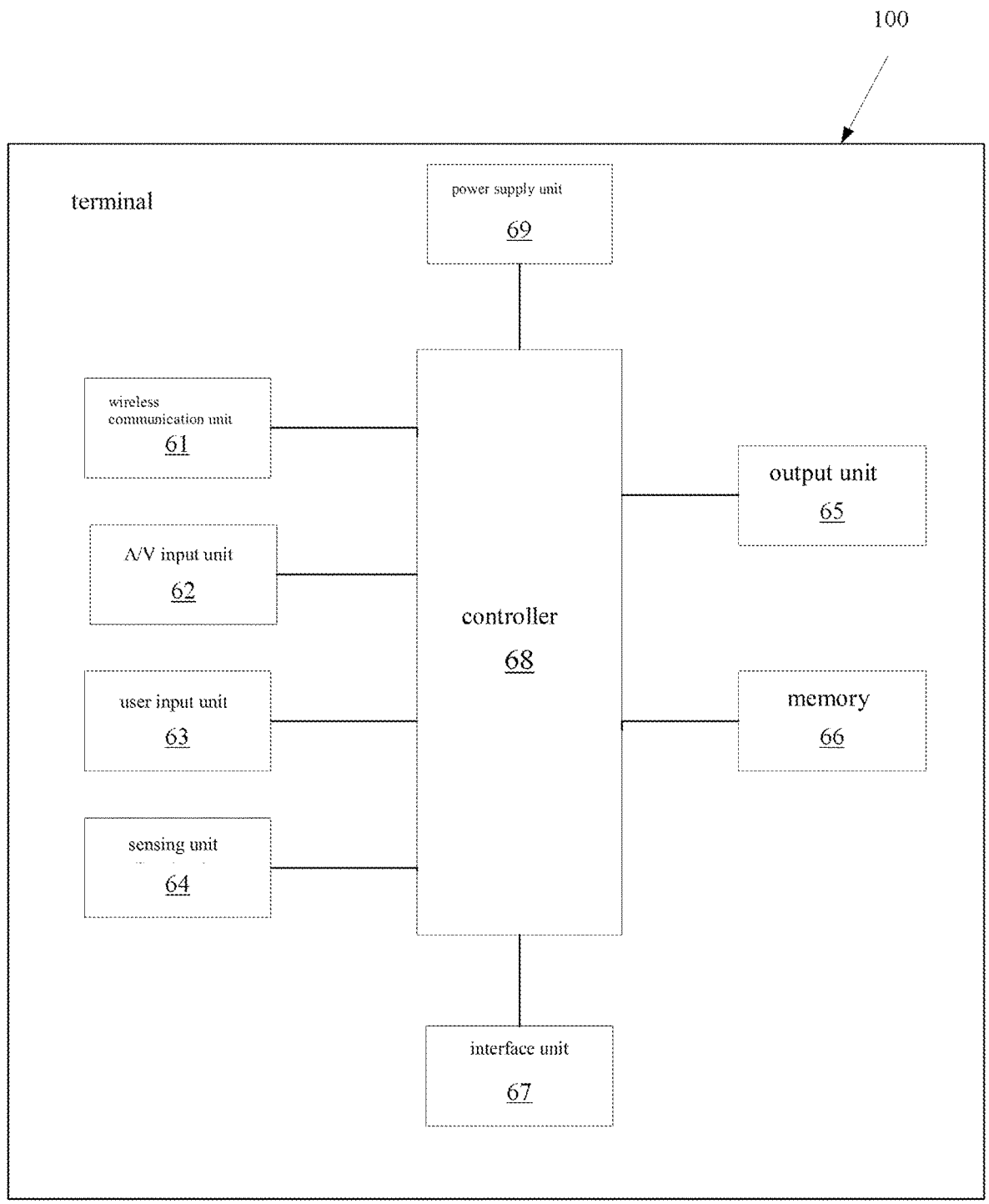
FIG. 37 is a schematic structural view of a terminal device according to an embodiment of the present disclosure.

FIG. 37 is a schematic structural view of a terminal device according to an embodiment of the present disclosure. The terminal device may be implemented in various forms, and the terminal device of the present disclosure may for example include, but is not limited to, mobile terminal devices such as a mobile phone, a smart phone, a notebook computer, a digital broadcast receiver, a personal digital assistant (PDA), a tablet computer (Portable Android Device (PAD), a portable multimedia player (PMP), a navigation device, an in-vehicle terminal device, an in-vehicle display terminal, an in-vehicle electronic rearview mirror and the like, as well as fixed terminal devices such as a digital television (TV), a desktop computer and the like.

As shown in FIG. 7, a terminal device 100 may include a wireless communication unit 61, an audio/video (A/V) input unit 62, a user input unit 63, a sensing unit 64, an output unit 65, a memory 66, an interface unit 67, a processor 68, a power supply unit 69, and the like. FIG. 7 shows a terminal device having a variety of components, but it should be understood that it is not required to implement all of the illustrated components. Instead, more or fewer components may be implemented.

In an embodiment, the wireless communication unit 61 allows for radio communication between the terminal device 100 and a wireless communication system or network. The A/V input unit 62 is configured to receive an audio or video signal. The user input unit 63 may be configured to generate key input data in accordance with a command input by the user to control various operations of the terminal device. The sensing unit 64 is configured to detect the current state of the terminal device 100, the position of the terminal device 100, the presence or absence of a user's touch input to the terminal device 100, the orientation of the terminal device 100, acceleration or deceleration movement and direction of the terminal device 100, and the like, and to generate a command or signal for controlling the operation of the terminal device 100. The interface unit 67 serves as an interface through which at least one external device can connect with the terminal device 100. The output unit 65 is configured to provide an output signal in a visual, audio and/or tactile form. The memory 66 may be configured to store a software program executed by the processor 68 for processing and controlling operations, and the like, or may temporarily store data that has been output or is to be output. The memory 66 may include at least one type of storage medium. Moreover, the terminal device 100 may cooperate with a network storage device that performs a storage function of the memory 66 through a network connection. The processor 68 typically controls the overall operation of the terminal device. Additionally, the processor 68 may include a multimedia module configured to reproduce or play back multimedia data. The processor 68 may perform a pattern recognition processing to recognize a handwriting input or a picture drawing input performed on a touch screen as a character or an image. The power supply unit 69 receives external power or internal power under the control of the processor 68, and provides appropriate power required to operate at least one element and component.

The processor 68, by executing a program stored in the memory 66, performs one or more functional applications and data processing, for example, to implement a method for shooting a video provided by an embodiment of the present disclosure. That is, when the program is executed by the processor 68, the processor 68 implements the following:

acquiring a video shooting mode instruction, wherein the video shooting mode instruction includes a shooting speed, and different video shooting modes have different shooting speeds;

after a video shooting instruction is obtained, shooting a video on a target scene according to the shooting speed until a video shooting pause instruction is acquired, thereby obtaining a video segment between the video shooting instruction and the video shooting pause instruction;

determining whether a video generation instruction is obtained;

if the video generation instruction is not obtained, repeating acquiring the video shooting mode instruction, the video shooting instruction and the video shooting pause instruction to obtain corresponding video segments until the video generation instruction is obtained; and generating a target video according to existing video segments based on the video generation instruction.

A method for video shooting provided by an embodiment of the present disclosure may also be implemented. That is, when the program is executed by the processor 68, the processor 68 implements the following:

detecting a user's selection operation on a video shooting mode control on a target interface and a triggering operation on a video shooting control on the target interface;

displaying a shot target scene on the target interface until a release operation on the video shooting control is detected, thereby obtaining a video segment corresponding to the video shooting mode selected by the user and displaying the video shooting mode control and the video shooting control on the target interface;

determining whether a user's triggering operation on a next step control on the target interface is detected;

if the user's triggering operation on the next step control on the target interface is not detected, repeating detecting the selection operation on the video shooting mode control, the triggering operation on the video shooting control and the release operation on the video shooting control to obtain corresponding video segments until the user's triggering operation on the next step control on the target interface is detected; and jumping from the target interface to a video storage interface according to the triggering operation on the next step control, and displaying, on the video storage interface, a result of synthetizing existing video segments to obtain a target video.

An embodiment of the present disclosure further provides a computer readable storage medium having a computer program stored thereon, wherein when the program is executed by a processor, a method for shooting a video provided by an embodiment of the present disclosure is implemented. That is, when the program is executed by the processor, the processor implements the following:

acquiring a video shooting mode instruction, wherein the video shooting mode instruction includes a shooting speed, and different video shooting modes have different shooting speeds;

after a video shooting instruction is obtained, shooting a video on a target scene according to the shooting speed until a video shooting pause instruction is acquired, thereby obtaining a video segment between the video shooting instruction and the video shooting pause instruction;

determining whether a video generation instruction is obtained;

if the video generation instruction is not obtained, repeating acquiring the video shooting mode instruction, the video shooting instruction and the video shooting pause instruction to obtain corresponding video segments until the video generation instruction is obtained; and generating a target video according to existing video segments based on the video generation instruction.

A method for shooting a video provided by an embodiment of the present disclosure may also be implemented. That is, when the method is performed, the following is implemented:

detecting a user's selection operation on a video shooting mode control on a target interface and a triggering operation on a video shooting control on the target interface;

displaying a shot target scene on the target interface until a release operation on the video shooting control is detected, thereby obtaining a video segment corresponding to the video shooting mode selected by the user and displaying the video shooting mode control and the video shooting control on the target interface;

determining whether a user's triggering operation on a next step control on the target interface is detected;

if the user's triggering operation on the next step control on the target interface is not detected, repeating detecting the selection operation on the video shooting mode control, the triggering operation on the video shooting control and the release operation on the video shooting control to obtain corresponding video segments until the user's triggering operation on the next step control on the target interface is detected; and jumping from the target interface to a video storage interface according to the triggering operation on the next step control, and displaying, on the video storage interface, a result of synthetizing existing video segments to obtain a target video.

The computer storage medium of the embodiment of the present disclosure may be any combination of one or more computer readable mediums. The computer readable medium may be a computer readable signal medium or a computer readable storage medium. The computer readable storage medium may for example be, but not limited to, an electrical, magnetic, optical, electromagnetic, infrared, or semiconductor system, apparatus, or device, or any combination of the above. More specific examples (a non-exhaustive list) of the computer readable storage medium include: an electrical connection having one or more wires, a portable computer disk, a hard disk, a Random Access Memory (RAM), a Read-Only Memory (ROM), an Erasable Programmable Read-Only Memory (EPROM or Flash), an optical fiber, a Compact Disc Read-Only Memory (CD-ROM), an optical storage device, a magnetic storage device, or any suitable combination of the above. In the present disclosure, the computer readable storage medium may be any tangible medium that contains or stores a program which can be used by or used in combination with an instruction execution system, apparatus, or device.

The computer readable signal medium may include data signals propagated in a baseband or as part of a carrier, and a computer readable program code is carried in the computer readable signal medium. Such propagated data signals can take a variety of forms including, but not limited to, electromagnetic signals, optical signals, or any suitable combination of them. The computer readable signal medium may also be any computer readable medium other than a computer readable storage medium, and the computer readable medium may send, propagate or transmit a program used by or used in combination with an instruction execution system, apparatus, or device.

The program code contained in the computer readable medium may be transmitted by any suitable medium including but not limited to, wireless means, wire, optical cable, radio frequency (RF), and the like, or any suitable combination of the above.

The computer program code for performing the operations of the present disclosure may be written in one or more programming languages or combinations thereof, including an object-oriented programming language such as Java, Smalltalk, C++, Ruby, Go, and conventional procedural programming languages such as the "C" language or similar programming languages. The program code may be executed entirely on the user's computer, partly on the user's computer, as a stand-alone software package, partly on the user's computer and partly on a remote computer, or entirely on a remote computer or a server. In the case of executing the program code on a remote computer, the remote computer may be connected to the user's computer via any kind of network, including a Local Area Network (LAN) or a Wide Area Network (WAN), or may be connected to an external computer (for example, by means of an Internet service provider via the Internet).

What is claimed is:

1. A method for video shooting, comprising:
   detecting a user's selection operation on a video shooting mode control on a target interface and a triggering operation on a video shooting control on the target interface;
   displaying a shot target scene on the target interface until a release operation on the video shooting control is detected, thereby obtaining a video segment corresponding to the video shooting mode selected by the user and displaying the video shooting mode control and the video shooting control on the target interface;
   determining whether a user's triggering operation on a next step control on the target interface is detected;
   in response to a determination result that the user's triggering operation on the next step control on the target interface is not detected, repeatedly detecting the selection operation on the video shooting mode control, the triggering operation on the video shooting control and the release operation on the video shooting control to obtain corresponding video segments until the user's triggering operation on the next step control on the target interface is detected;
   jumping from the target interface to a video storage interface according to the triggering operation on the next step control, and displaying, on the video storage interface, a result of synthesizing existing video segments to obtain a target video;
   wherein after the jumping from the target interface to a video storage interface according to the triggering operation on the next step control, and displaying, on the video storage interface, a result of synthesizing existing video segments to obtain a target video, the method further comprises:
   jumping to a video editing interface, wherein the video editing interface comprises an editing control and a next step control; and
   in response to a result that a selection operation on the editing control is detected and a triggering operation on the next step control on the video editing interface are detected, jumping from the video editing interface to a video storage mode interface, wherein the video storage mode interface comprises a storage mode control.

2. The method of claim 1, further comprising:
   displaying a progress bar at the same time the shot target scene is displayed on the target interface; and
   in response to a determination result that the progress bar is detected to be displayed completely, jumping from the target interface to the video storage interface and displaying a result of synthesizing existing video segments to obtain the target video on the video storage interface.

3. The method of claim 1, wherein before the detecting a user's triggering operation on a video shooting control on the target interface, the method further comprises:
   detecting a selection operation on a special effect control on the target interface; and
   the displaying the shot target scene on the target interface comprises:
   displaying the target scene superimposed with the special effect control selected by the user on the target interface.

4. The method of claim 1, wherein after the jumping from the target interface to a video storage interface, the method further comprises:
   in response to a result that a user's selection operation on the storage mode control is detected, jumping from the video storage mode interface to a video presentation mode interface and displaying a storage result of the target video corresponding to the selection operation on the storage mode control on the video presentation mode interface; wherein the storage mode control comprises a draft box control and a release control.

5. The method of claim 4, further comprising:
   in response to a result that a triggering operation on a works control on a user homepage interface is detected, jumping to a video playing interface and playing the target video on the video playing interface.

6. A non-transitory computer readable storage medium, storing computer-readable instructions that upon execution by a processor cause the processor to implement operations comprising:
   detecting a user's selection operation on a video shooting mode control on a target interface and a triggering operation on a video shooting control on the target interface;
   displaying a shot target scene on the target interface until a release operation on the video shooting control is detected, thereby obtaining a video segment corresponding to the video shooting mode selected by the user and displaying the video shooting mode control and the video shooting control on the target interface;
   determining whether a user's triggering operation on a next step control on the target interface is detected;
   in response to a determination result that the user's triggering operation on the next step control on the target interface is not detected, repeatedly detecting the selection operation on the video shooting mode control, the triggering operation on the video shooting control and the release operation on the video shooting control to obtain corresponding video segments until the user's triggering operation on the next step control on the target interface is detected;
   jumping from the target interface to a video storage interface according to the triggering operation on the next step control, and displaying, on the video storage interface, a result of synthesizing existing video segments to obtain a target video;

wherein after the jumping from the target interface to a video storage interface according to the triggering operation on the next step control, and displaying, on the video storage interface, a result of synthetizing existing video segments to obtain a target video, the operations further comprise:
    jumping to a video editing interface, wherein the video editing interface comprises an editing control and a next step control; and
    in response to a result that a selection operation on the editing control is detected and a triggering operation on the next step control on the video editing interface are detected, jumping from the video editing interface to a video storage mode interface; wherein the video storage mode interface comprises a storage mode control.

7. The non-transitory computer-readable storage medium of claim 6, the operations further comprising:
    displaying a progress bar at the same time the shot target scene is displayed on the target interface; and
    in response to a determination result that the progress bar is detected to be displayed completely, jumping from the target interface to the video storage interface and displaying a result of synthetizing existing video segments to obtain the target video on the video storage interface.

8. The non-transitory computer-readable storage medium of claim 6, wherein before the detecting a user's triggering operation on a video shooting control on the target interface, the operations further comprise:
    detecting a selection operation on a special effect control on the target interface; and
    the displaying the shot target scene on the target interface comprises:
    displaying the target scene superimposed with the special effect control selected by the user on the target interface.

9. The non-transitory computer-readable storage medium of claim 6, wherein after the jumping from the target interface to a video storage interface, the operations further comprise:
    in response to a result that a user's selection operation on the storage mode control is detected, jumping from the video storage mode interface to a video presentation mode interface and displaying a storage result of the target video corresponding to the selection operation on the storage mode control on the video presentation mode interface; wherein the storage mode control comprises a draft box control and a release control.

10. The non-transitory computer-readable storage medium of claim 9, the operations further comprising:
    in response to a result that a triggering operation on a works control on a user homepage interface is detected, jumping to a video playing interface and playing the target video on the video playing interface.

11. A terminal device for video shooting, comprising:
    at least one processor; and
    at least one memory communicatively coupled to the at least one processor and storing instructions that upon execution by the at least one processor cause the system to perform operations, the operations comprising:
    detecting a user's selection operation on a video shooting mode control on a target interface and a triggering operation on a video shooting control on the target interface;
    displaying a shot target scene on the target interface until a release operation on the video shooting control is detected, thereby obtaining a video segment corresponding to the video shooting mode selected by the user and displaying the video shooting mode control and the video shooting control on the target interface;
    determining whether a user's triggering operation on a next step control on the target interface is detected;
    in response to a determination result that the user's triggering operation on the next step control on the target interface is not detected, repeatedly detecting the selection operation on the video shooting mode control, the triggering operation on the video shooting control and the release operation on the video shooting control to obtain corresponding video segments until the user's triggering operation on the next step control on the target interface is detected;
    jumping from the target interface to a video storage interface according to the triggering operation on the next step control, and displaying, on the video storage interface, a result of synthetizing existing video segments to obtain a target video;
    wherein after the jumping from the target interface to a video storage interface according to the triggering operation on the next step control, and displaying, on the video storage interface, a result of synthetizing existing video segments to obtain a target video, the operations further comprise:
    jumping to a video editing interface, wherein the video editing interface comprises an editing control and a next step control; and
    in response to a result that a selection operation on the editing control is detected and a triggering operation on the next step control on the video editing interface are detected, jumping from the video editing interface to a video storage mode interface; wherein the video storage mode interface comprises a storage mode control.

12. The terminal device of claim 11, the operations further comprising:
    displaying a progress bar at the same time the shot target scene is displayed on the target interface; and
    in response to a determination result that the progress bar is detected to be displayed completely, jumping from the target interface to the video storage interface and displaying a result of synthetizing existing video segments to obtain the target video on the video storage interface.

13. The terminal device of claim 11, wherein before the detecting a user's triggering operation on a video shooting control on the target interface, the operations further comprise:
    detecting a selection operation on a special effect control on the target interface; and
    the displaying the shot target scene on the target interface comprises:
    displaying the target scene superimposed with the special effect control selected by the user on the target interface.

14. The terminal device of claim 11, wherein after the jumping from the target interface to a video storage interface, the operations further comprise:
    in response to a result that a user's selection operation on the storage mode control is detected, jumping from the video storage mode interface to a video presentation mode interface and displaying a storage result of the target video corresponding to the selection operation on the storage mode control on the video presentation mode interface; wherein the storage mode control comprises a draft box control and a release control.

15. The terminal device of claim 14, the operations further comprising:

in response to a result that a triggering operation on a works control on a user homepage interface is detected, jumping to a video playing interface and playing the target video on the video playing interface.

* * * * *